(12) United States Patent
Tanaka et al.

(10) Patent No.: US 11,436,538 B2
(45) Date of Patent: Sep. 6, 2022

(54) LEARNING BY GRADIENT BOOSTING USING A CLASSIFICATION METHOD WITH THE THRESHOLD FOR THE FEATURE AMOUNT

(71) Applicant: Ricoh Company, Ltd., Tokyo (JP)

(72) Inventors: Takuya Tanaka, Tokyo (JP); Ryosuke Kasahara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 770 days.

(21) Appl. No.: 16/424,637

(22) Filed: May 29, 2019

(65) Prior Publication Data
US 2019/0378046 A1 Dec. 12, 2019

(30) Foreign Application Priority Data
Jun. 8, 2018 (JP) .............................. JP2018-110712

(51) Int. Cl.
| | |
|---|---|
| *G06N 20/00* | (2019.01) |
| *G06N 20/20* | (2019.01) |
| *G06N 3/08* | (2006.01) |
| *G06K 9/62* | (2022.01) |

(52) U.S. Cl.
CPC ........... *G06N 20/20* (2019.01); *G06K 9/6256* (2013.01); *G06N 3/08* (2013.01)

(58) Field of Classification Search
CPC ......... G06N 20/20; G06N 3/08; G06K 9/6256
See application file for complete search history.

(56) References Cited

U.S. PATENT DOCUMENTS

| | | | | |
|---|---|---|---|---|
| 8,503,770 B2* | 8/2013 | Suzuki | ................... | G06V 20/40 382/160 |
| 2015/0363667 A1* | 12/2015 | Nakai | ................... | G06V 10/758 382/159 |
| 2017/0039451 A1* | 2/2017 | Hosoi | ................... | G06K 9/6255 |
| 2021/0150372 A1* | 5/2021 | Jiang | ..................... | G06N 20/20 |
| 2021/0192280 A1* | 6/2021 | Zhang | ................... | G06N 20/20 |

OTHER PUBLICATIONS

Chen, Tianqi, and Carlos Guestrin. "Xgboost: A Scalable Tree Boosting System." Proceedings of the 22nd ACM SIGKDD International Conference on Knowledge Discovery and Data Mining. ACM, 2016. 10 pages.

* cited by examiner

*Primary Examiner* — Pakee Fang
(74) *Attorney, Agent, or Firm* — Xsensus LLP

(57) ABSTRACT

A learning and discrimination device configured to perform learning by gradient boosting, including: a histogram memory unit configured to store, for each value of a feature amount, a histogram obtained by integrating gradient information corresponding to the value in sample data; a category accumulated gradient calculator configured to calculate a histogram corresponding to a value of the feature amount corresponding to a threshold for the feature amount as a cumulative sum of the gradient information; a non-category accumulated gradient calculator configured to calculate, as a cumulative sum of the gradient information, a sum of a histogram corresponding to a value of the feature amount that is classified using a classification method with the threshold different from the category accumulated gradient calculator; and a cumulative sum selector configured to output the cumulative sum calculated by the category accumulated gradient calculator or the non-category accumulated gradient calculator.

11 Claims, 30 Drawing Sheets

| FEATURE AMOUNT NUMBER | CATEGORY FLAG |
|---|---|
| 1 | 0 |
| 2 | 1 |
| ⋮ | ⋮ |
| M | 1 |

LEARNING BY GRADIENT BOOSTING USING A CLASSIFICATION METHOD WITH THE THRESHOLD FOR THE FEATURE AMOUNT

CROSS-REFERENCE TO RELATED APPLICATIONS

The present application claims priority under 35 U.S.C. § 119 to Japanese Patent Application No. 2018-110712, filed on Jun. 8, 2018. The contents of which are incorporated herein by reference in their entirety.

BACKGROUND OF THE INVENTION

1. Field of the Invention

The present invention relates to a learning and discrimination device, and a learning and discrimination method.

2. Description of the Related Art

In recent years, an attempt to replace a function of human beings with a large amount of data has been made in various fields by using machine learning that is generally known in relation to artificial intelligence (AI). This field is still greatly developing day by day, but there are some problems under present circumstances. Representative examples thereof include a limit of accuracy including generalization performance for retrieving versatile knowledge from data, and a limit of processing speed due to a large calculation load thereof. As a well-known algorithm for high-performance machine learning, there are known Deep learning (DL), a convolutional neural network (CNN) in which an input vector is limited to the periphery, and the like. As compared with these methods, under present circumstances, gradient boosting (for example, Gradient Boosting Decision Tree (GBDT)) is known to have poor accuracy for input data such as an image, a voice, and a language because it is difficult to extract a feature amount, but give higher performance for other structured data. As a matter of fact, in Kaggle as a competition of data scientists, the GBDT is the most standard algorithm. In the real world, 70% of problems that are desired to be solved by machine learning is said to be structured data other than an image, a voice, and a language, so that there is no doubt that the GBDT is an important algorithm to solve the problems in the real world. Additionally, in recent years, there has been developed a method of extracting a feature from data such as an image and a voice using a decision tree.

In the gradient boosting, learning processing is performed at higher speed than deep learning such as CCN. However, it is fairly common to perform learning several hundreds of times or more for adjustment of hyperparameter and feature selection as required work in a practical use, and for work such as model ensemble and stacking for improving performance by combining a plurality of models for the purpose of evaluating generalization performance and improving performance. Thus, a calculation time becomes a problem even in the gradient boosting the processing of which is performed at relatively high speed. Thus, in recent years, there have been reported a large number of researches for increasing a processing speed of learning processing by gradient boosting.

Learning data used for the GBDT may include, as the feature amount, a category feature amount having meaning as an identifier indicating a specific category instead of numerical value data in which magnitude of a numerical value itself has meaning. In a case of performing learning processing, the category feature amount is treated differently from a case of using the feature amount as numerical value data in which magnitude of a numerical value has meaning (hereinafter, referred to as a non-category feature amount in some cases). Thus, the GBDT has relatively higher accuracy than other learning algorithms for the learning data including the category feature amount, so that, even when hard logic is implemented, learning processing needs to be performed with learning data including the category feature amount.

There is disclosed a technique of performing learning processing while treating such a category feature amount in the same way as a feature amount (non-category feature amount) as numerical value data by performing encoding that is called One Hot Encoding (for example, refer to Chen, Tianqi, and Carlos Guestrin. "Xgboost: A Scalable Tree Boosting System." Proceedings of the 22nd ACM SIGKDD International Conference on Knowledge Discovery and Data Mining. ACM, 2016). Herein, One Hot Encoding is an encoding system of converting a category feature amount representing N types of categories into an N-dimensional binary feature amount.

However, as in the technique described in Chen, Tianqi, and Carlos Guestrin. "Xgboost: A Scalable Tree Boosting System." Proceedings of the 22nd ACM SIGKDD International Conference on Knowledge Discovery and Data Mining. ACM, 2016, in a case of encoding the category feature amount by One Hot Encoding, the feature amount is increased corresponding to the number of types of categories. The category feature amount may include 100 or more types of categories in some cases. In this case, with hard logic that performs learning by the GBDT, learning processing needs to be performed in parallel on the feature amount, and in a case of performing encoding by One Hot Encoding, there is a problem such that learning modules corresponding to the number of dimensions of the increased feature amount are required, which increases a circuit scale.

SUMMARY OF THE INVENTION

According to an aspect of the present invention, a learning and discrimination device is configured to perform learning by gradient boosting. The learning and discrimination device includes a histogram memory unit, a category accumulated gradient calculator, a non-category accumulated gradient calculator, and a cumulative sum selector. The histogram memory unit is configured to store, for each value of a feature amount, a histogram obtained by integrating gradient information corresponding to the value of the feature amount in sample data. The category accumulated gradient calculator is configured to receive an input of a histogram corresponding to each value of the feature amount among histograms stored in the histogram memory unit, and calculate a histogram corresponding to a value of the feature amount corresponding to a threshold for the feature amount as a cumulative sum of the gradient information for the feature amount. The non-category accumulated gradient calculator is configured to receive an input of a histogram corresponding to each value of the feature amount among the histograms stored in the histogram memory unit, and calculate, as a cumulative sum of the gradient information for the feature amount, a sum of a histogram corresponding to a value of the feature amount that is classified using a classification method with the threshold for the feature amount, the classification method being different from a classification method by the category accumulated gradient calculator using the threshold. The cumulative sum selector is configured to output the cumulative sum calculated by the category accumulated gradient calculator or the cumulative sum calculated by the non-category accumulated gradient calculator.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
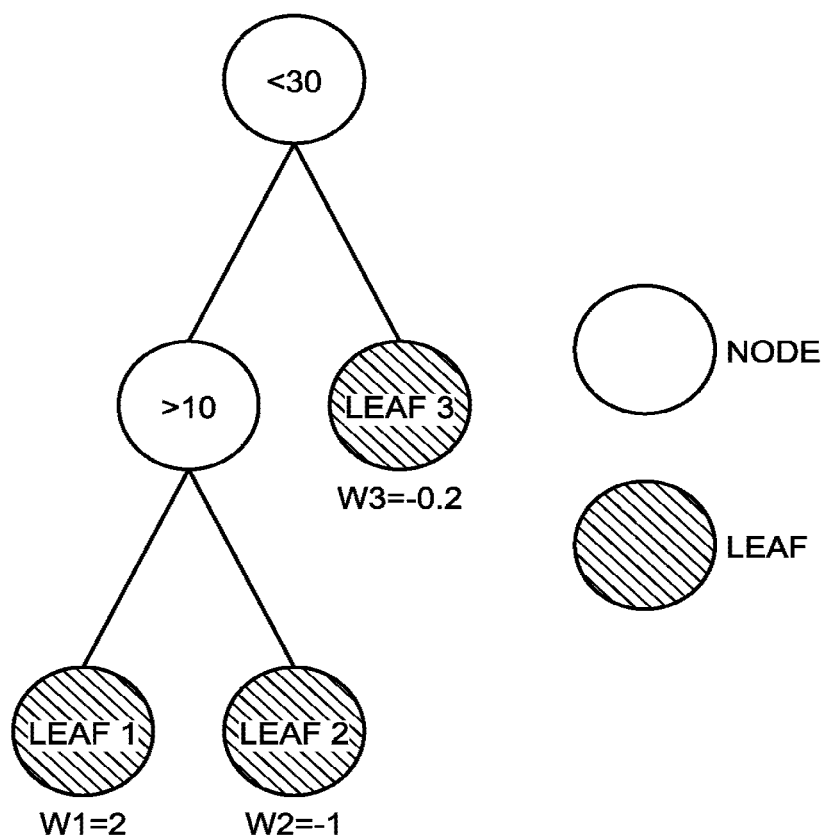
FIG. 1 is a diagram illustrating an example of a decision tree model.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide a learning and discrimination device and a learning and discrimination method that prevent a circuit scale from being increased in a case in which learning is performed by gradient boosting using learning data including a category feature amount.

The following describes embodiments of a learning and discrimination device and a learning and discrimination method according to the present invention in detail with reference to FIG. 1 to FIG. 34. The present invention is not limited to the following embodiments. Components in the following embodiments encompass a component that is easily conceivable by those skilled in the art, substantially the same component, and what is called an equivalent. Additionally, the components can be variously omitted, replaced, modified, and combined without departing from the gist of the embodiments described below.

First Embodiment

Regarding Logic of GBDT

In DL as an algorithm of high-performance machine learning, a discriminator is attempted to be implemented by various kinds of hard logic, which has been found to have higher power efficiency as compared with processing using a graphics processing unit (GPU). However, an architecture of the GPU closely matches to especially a CNN in the field of DL, so that, in view of speed, speed of discrimination performed by a field-programmable gate array (FPGA) implemented with logic is not higher than that of the GPU. On the other hand, hard logic has been attempted to be implemented by FPGA on a decision tree-based algorithm such as a GBDT, and a result of higher speed than the GPU has been reported. This is because, as described later, the decision tree-based algorithm is not appropriate for the architecture of the GPU in view of a feature of data arrangement thereof.

Examination as to learning falls behind examination as to discrimination in the world. There is almost no report about present circumstances of DL, and the number of reports about a decision tree system is small. Particularly, there is no report about learning by the GBDT under present circumstances, which can be currently considered to be an undeveloped field. To obtain an accurate discrimination model, selection and design of a feature amount, and selection of a hyperparameter of a learning algorithm are performed at the time of learning, so that an enormous number of trials are required. Especially in a case in which there is a large amount of learning data, speed of learning processing considerably affects accuracy of a final model practically. Additionally, in a field in which real-time performance for following environmental change is required such as robotics, High Frequency Trading (HFT), and Real-Time Bidding (RTB), speed is directly connected with performance. Thus, in a case in which high-speed learning processing is achieved by the GBDT with high accuracy, it can be considered to be able to largely improve performance of a system using the GBDT eventually.

Affinity of GBDT for FPGA

The following describes, in view of affinity of the GBDT for the FPGA, why the processing speed of the decision tree or the GBDT by the GPU is not high, and why the processing speed thereof by the FPGA is high.

First, description is made from a viewpoint that the GBDT is an algorithm using boosting. In a case of Random Forest (RF) using ensemble learning in the field of decision tree, trees are not dependent on each other, so that parallelization is easily performed by the GPU. However, the GBDT is a method of connecting a large number of trees using boosting, so that learning of a subsequent tree cannot be started until a result of a previous tree is obtained. Thus, the processing is serial processing, and it is important to learn each tree at high speed as much as possible. On the other hand, in the RF, an option of increasing the entire learning speed may be employed by increasing learning speed for a large number of trees in parallel even if the learning speed for each tree is low. Thus, also in a case of using the GPU, it can be considered that a problem of access latency of a Dynamic Random Access Memory (DRAM) (described later) can be concealed in some degree.

Next, description is made from a viewpoint of a limit of access speed (especially in random access) of a GPU device to a random access memory (RAM). A static random access memory (SRAM) built into the FPGA can greatly increase a bus width of a RAM in the FPGA, so that 3.2 [TB/sec] is achieved as follows even in a case of using XC7k325T manufactured by Xilinx Inc. as a middle-range FPGA, for example. Capacity of a built-in RAM is 16 [Mb].

$$445 \text{ BRAMs} \times 36 \text{ bit} \times 100 \text{ MHz} \times 2 \text{ ports} = 445*36*2*100*10^6/10^{12} = 3.2 \text{ TB/sec}$$

In a case of using VU9P manufactured by Xilinx Inc. as a high-end FPGA, 6.9 [TB/sec] is achieved. The capacity of the built-in RAM is 270 [Mb].

$$960 \text{ URAMs} \times 36 \text{ bit} \times 100 \text{ MHz} \times 2 \text{ ports} = 960*36*2*100*10^6/10^{12} = 6.9 \text{ TB/sec}$$

These values are obtained in a case of causing a clock frequency to be 100 [MHz], but actually, operation may be performed at about 200 to 500 [MHz] by devising a circuit configuration, and a limit band is raised several-fold. On the other hand, a RAM of a current generation connected to a central processing unit (CPU) is Double-Data-Rate4 (DDR4), but a band generated with one Dual Inline Memory Module (DIMM) remains at 25.6 [GB/sec] as described below. Even with an interleave configuration (256 bit width) of four DIMMs, the band reaches about 100 [GB/sec]. In a case in which a chip standard of the DDR4 is DDR4-3200 (bus width of 64 bit, 1 DIMM), the following expression is satisfied.

$$200 \text{ MHz} \times 2(\text{DDR}) \times 64 = 200*10^6*2*64/10^9 = 25.6 \text{ GB/sec}$$

A band of a Graphics Double-Data-Rate 5 (GDDR5) mounted on the GPU is about four times larger than the band of the DDR4, but is about 400 [GB/sec] at the maximum.

In this way, the bands are greatly different from each other between the RAM in the FPGA and an external memory of the GPU and the CPU. Although the case of sequential access to an address has been described above, access time at the time of random access works more greatly. The built-in RAM of the FPGA is an SRAM, so that the access latency is 1 clock both in the sequential access and the random access. However, each of the DDR4 and the GDDR5 is a DRAM, so that latency is increased in a case of accessing different columns due to a sense amplifier. For example, typical Column Address Strobe latency (CAS latency) is 16 clock in the RAM of the DDR4, and throughput is calculated to be $\frac{1}{16}$ of that of the sequential access in brief.

In a case of the CNN, pieces of data of adjacent pixels are successively processed, so that latency of the random access is not a big problem. However, in a case of the decision tree, addresses of original data of respective branches become discontinuous as branching proceeds, which becomes random access basically. Thus, in a case of storing the data in the DRAM, the throughput thereof causes a bottleneck, and the speed is greatly lowered. The GPU includes a cache to suppress performance deterioration in such a case, but the decision tree is basically an algorithm of accessing the entire data, so that there is no locality in data access, and an effect of the cache is hardly exhibited. In the structure of the GPU, the GPU includes a shared memory including an SRAM assigned to each arithmetic core (SM), and high-speed processing can be performed by using the shared memory in some cases. However, in a case in which the capacity of each SM is small, that is, 16 to 48 [kB], and access is performed across SMs, large latency is caused. The following represents a test calculation of the capacity of the shared memory in a case of Nvidia K80 as an expensive large-scale GPU at the present time.

K80=2×13 SMX=26 SMX=4992 CUDA core
26×48×8=9 Mb

As described above, even in a large-scale GPU that is worth hundreds of thousands of yen, the capacity of the shared memory is only 9 [Mb], which is too small. Additionally, in a case of the GPU, as described above, because the SM that performs processing cannot directly access the shared memory of the other SM, there is a restriction that high-speed coding is difficult to be performed in a case of being used for learning of the decision tree.

As a described above, assuming that the data is stored in the SRAM on the FPGA, it can be considered that the FPGA can implement a learning algorithm of the GBDT at higher speed as compared with the GPU.

Algorithm of GBDT

FIG. 1 is a diagram illustrating an example of a decision tree model. The following describes basic logic of the GBDT with reference to expressions (1) to (22) and FIG. 1.

The GBDT is a method of supervised learning, and the supervised learning is processing of optimizing an objective function obj(θ) including a loss function L(θ) representing a degree of fitting with respect to learning data and a regularization term Ω(θ) representing complexity of a learned model using some kind of scale as represented by the following expression (1). The regularization term Ω(θ) has a role of preventing a model (decision tree) from being too complicated, that is, improving generalization performance.

$$obj(\theta)=L(\theta)+\Omega(\theta) \quad (1)$$

The loss function of the first term of the expression (1) is, for example, obtained by adding up losses calculated from an error function 1 for respective pieces of sample data (learning data) as represented by the following expression (2). In this case, n is the number of pieces of sample data, i is a sample number, y is a label, and y (hat) of a model is a predicted value.

$$L(\theta) = \sum_{i=1}^{n} l(y_i, \hat{y}_i) \quad (2)$$

In this case, for example, as the error function 1, a square error function or a logistic loss function as represented by the following expression (3) and the expression (4) is used.

$$l(y_i,\hat{y}_i)=(y_i-\hat{y}_i)^2 \quad (3)$$

$$l(y_i,\hat{y}_i)=y_i \ln(1+e^{-\hat{y}_i})+(1-y_i)\ln(1+e^{\hat{y}_i}) \quad (4)$$

As the regularization term Ω(θ) of the second term of the expression (1), for example, a squared norm of a parameter θ as represented by the following expression (5) is used. In this case, λ is a hyperparameter representing weight of regularization.

$$\Omega(\theta)=\lambda\|\theta\|^2 \quad (5)$$

A case of the GBDT is considered herein. First, the predicted value for the i-th sample data $x_i$ of the GBDT can be represented by the following expression (6).

$$\hat{y}_i = \sum_{k=1}^{K} f_k(x_i) \quad (6)$$

In this case, K is the total number of decision trees, k is a number of the decision tree, $f_K(\ )$ is an output of the k-th decision tree, and $x_i$ is a feature amount of sample data to be input. Accordingly, it can be found that a final output is obtained by adding up outputs of the respective decision trees in the GBDT similarly to the RF and the like. The parameter θ is represented as θ={$f_1, f_2, \ldots, f_K$}. According to the above description, the objective function of the GBDT is represented by the following expression (7).

$$obj(\theta) = \sum_{i=1}^{n} l(y_i, \hat{y}_i) + \sum_{k=1}^{K} \Omega(f_k) \quad (7)$$

Learning is performed on the objective function described above, but a method such as Stochastic Gradient Descent (SGD) used for learning of a neural network and the like cannot be used for the decision tree model. Thus, learning is performed by using Additive Training (boosting). In the Additive Training, a predicted value in a certain round (number of times of learning, the number of decision tree models) t is represented by the following expression (8).

$$\hat{y}_i^{(0)} = 0 \quad (8)$$
$$\hat{y}_i^{(1)} = f_1(x_i) = \hat{y}_i^{(0)} + f_1(x_i)$$
$$\hat{y}_i^{(2)} = f_1(x_i) + f_2(x_i) = \hat{y}_i^{(1)} + f_2(x_i)$$

-continued $$\hat{y}_i^{(t)} = \sum_{k=1}^{t} f_k(x_i) = \hat{y}_i^{(t-1)} + f_t(x_i)$$

From the expression (8), it can be found that (an output) of the decision tree $f_t(x_i)$ needs to be obtained in the certain round t. On the other hand, it is not required to consider other rounds in the certain round t. Thus, the following description considers the round t. The objective function in the round t is represented by the following expression (9).

$$obj^{(t)} = \sum_{i=1}^{n} l(y_i, \hat{y}_i^{(t)}) + \sum_{k=1}^{K} \Omega(f_k) \qquad (9)$$

$$= \sum_{i=1}^{n} l(y_i, \hat{y}_i^{(t-1)} + f_t(x_i)) + \Omega(f_k) + \text{constant}$$

In this case, Taylor expansion (truncated at a second-order term) of the objective function in the round t is represented by the following expression (10).

$$obj^{(t)} \cong \sum_{i=1}^{n} \left[ l(y_i, \hat{y}_i^{(t-1)}) + g_i f_t(x_i) + \frac{1}{2} h_i f_t^2(x_i) \right] + \Omega(f_t) + \text{constant} \qquad (10)$$

In this case, in the expression (10), pieces of gradient information $g_i$ and $h_i$ are represented by the following expression (11).

$$g_i = \partial_{\hat{y}_i^{(t-1)}} l(y_i, \hat{y}_i^{(t-1)})$$

$$h_i = \partial_{\hat{y}_i^{(t-1)}}^2 l(y_i, \hat{y}_i^{(t-1)}) \qquad (11)$$

When a constant term is ignored in the expression (10), the objective function in the round t is represented by the following expression (12).

$$obj^{(t)} = \sum_{i=1}^{n} \left[ g_i f_t(x_i) + \frac{1}{2} h_i f_t^2(x_i) \right] + \Omega(f_t) \qquad (12)$$

In the expression (12), the objective function in the round t is represented by the regularization term and a value obtained by performing first-order differentiation and second-order differentiation on the error function by the predicted value in a previous round, so that it can be found that the error function on which first-order differentiation and second-order differentiation can be performed can be applied.

The following considers the decision tree model. FIG. 1 illustrates an example of the decision tree model. The decision tree model includes nodes and leaves. At the node, an input is input to the next node or leaf under a certain branch condition, and the leaf has a leaf weight, which becomes an output corresponding to the input. For example, FIG. 1 illustrates the fact that a leaf weight W2 of a "leaf 2" is "−1".

The decision tree model is formulated as represented by the following expression (13).

$$f_t(x) = w_{q(x)}, w \in \mathbb{R}^T, q: \mathbb{R}^d \to \{1, 2, \ldots T\} \qquad (13)$$

In the expression (13), w represents a leaf weight, and q represents a structure of the tree. That is, an input (sample data x) is assigned to any of the leaves depending on the structure q of the tree, and the leaf weight of the leaf is output.

In this case, complexity of the decision tree model is defined as represented by the following expression (14).

$$\Omega(f_t) = \gamma T + \frac{1}{2} \lambda \sum_{j=1}^{T} w_j^2 \qquad (14)$$

In the expression (14), the first term represents complexity due to the number of leaves, and the second term represents a squared norm of the leaf weight. γ is a hyper-parameter for controlling importance of the regularization term. Based on the above description, the objective function in the round t is organized as represented by the following expression (15).

$$obj^{(t)} \cong \sum_{i=1}^{n} \left[ g_i f_t(x_i) + \frac{1}{2} h_i f_t^2(x_i) \right] + \Omega(f_t) \qquad (15)$$

$$= \sum_{i=1}^{n} \left[ g_i w_{q(x_i)} + \frac{1}{2} h_i w_{q(x_i)}^2 \right] + \gamma T + \frac{1}{2} \lambda \sum_{j=1}^{T} w_j^2$$

$$= \sum_{j=1}^{T} \left[ \left( \sum_{i \in I_j} g_i \right) w_j + \frac{1}{2} \left( \sum_{i \in I_j} h_i + \lambda \right) w_j^2 \right] + \gamma T$$

$$= \sum_{j=1}^{T} \left[ G_j w_j + \frac{1}{2} (H_j + \lambda) w_j^2 \right] + \gamma T$$

However, in the expression (15), $I_j$, $G_j$, and $H_j$ are represented by the following expression (16).

$$I_j = \{i | q(x_i) = j\}$$

$$G_j = \Sigma_{i \in I_j} g_i$$

$$H_j = \Sigma_{i \in I_j} h_i \qquad (16)$$

From the expression (15), the objective function in the certain round t is a quadratic function related to the leaf weight w, and a minimum value of the quadratic function and a condition thereof are typically represented by the following expression (17).

$$\text{argmin}_w Gw + \frac{1}{2} Hw^2 = -\frac{G}{H}, H > 0 \qquad (17)$$

$$\min_w Gw + \frac{1}{2} Hw^2 = -\frac{1}{2} \frac{G^2}{H}$$

That is, when the structure q of the decision tree in the certain round t is determined, the objective function and the leaf weight thereof are represented by the following expression (18).

$$w_j^* = \frac{G_j}{H_j + \lambda} \qquad (18)$$

$$obj = -\frac{1}{2} \sum_{j=1}^{T} \frac{G_j^2}{H_j + \lambda} + \gamma T$$

At this point, the leaf weight is enabled to be calculated at the time when the structure of the decision tree is determined in the certain round. The following describes a procedure of learning the structure of the decision tree.

Methods of learning the structure of the decision tree include a greedy method (Greedy Algorithm). The greedy method is an algorithm of starting the tree structure from depth 0, and learning the structure of the decision tree by calculating a branch score (Gain) at each node to determine whether to branch. The branch score is obtained by the following expression (19).

$$\text{Gain} = \frac{1}{2}\left[\frac{G_L^2}{H_L+\lambda} + \frac{G_R^2}{H_R+\lambda} - \frac{(G_L+G_R)^2}{H_L+H_R+\lambda}\right] - \gamma \quad (19)$$

In this case, each of $G_L$ and $H_L$ is the sum of the gradient information of the sample branching to a left node, each of $G_R$ and $H_R$ is the sum of the gradient information of the sample branching to a right node, and $\gamma$ is the regularization term. The first term in [ ] of the expression (19) is a score (objective function) of the sample data branching to the left node, the second term is a score of the sample data branching to the right node, and the third term is a score in a case in which the sample data does not branch, which represents a degree of improvement of the objective function due to branching.

The branch score represented by the expression (19) described above represents goodness at the time of branching with a certain threshold of a certain feature amount, but an optimum condition cannot be determined based on the single branch score. Thus, in the greedy method, the branch score is obtained for all threshold candidates of all feature amounts to find a condition under which the branch score is the largest. The greedy method is a very simple algorithm as described above, but calculation cost thereof is high because the branch score is obtained for all threshold candidates of all feature amounts. Thus, for library such as XGBoost (described later), a method of reducing the calculation cost while maintaining performance is devised.

Regarding XGBoost

The following describes XGBoost that is well-known as a library of the GBDT. In the learning algorithm of XGBoost, two points are devised, that is, reduction of the threshold candidates and treatment of a missing value.

First, the following describes reduction of the threshold candidates. The greedy method described above has a problem such that the calculation cost is high. In XGBoost, the number of threshold candidates is reduced by a method of Weighted Quantile Sketch. In this method, the sum of the gradient information of the sample data branching to the left and the right is important in calculating the branch score (Gain), and only a threshold with which the sum of the gradient information varies at a constant ratio is caused to be a candidate to be searched for. Specifically, a second-order gradient h of the sample is used. Assuming that the number of dimensions of the feature amount is f, a set of the feature amount and the second-order gradient h of the sample data is represented by the following expression (20).

$$D_f = \{(x_{1f}, h_1), (x_{2f}, h_2), \ldots, (x_{nf}, h_n)\} \quad (20)$$

A RANK function $r_f$ is defined as represented by the following expression (21).

$$r_f(z) = \frac{1}{\sum_{(x,h)\in D_f} h} \sum_{(x,h)\in D_f, x<z} h \quad (21)$$

In this case, z is a threshold candidate. The RANK function $r_f$ in the expression (21) represents a ratio of the sum of second-order gradients of the sample data smaller than a certain threshold candidate to the sum of second-order gradients of all pieces of sample data. In the end, a set of certain threshold candidates $\{s_{f1}, s_{f2}, \ldots s_{fl}\}$ needs to be obtained for a feature amount represented by the dimension f, which is obtained by the following expression (22).

$$|r_f(s_{fj}) - r_f(s_{f,j+1})| < \varepsilon$$

$$s_{f1} = \min(\{x_{1f}, x_{2f}, \ldots, x_{nf}\})$$

$$s_{fl} = \max(\{x_{1f}, x_{2f}, \ldots, x_{nf}\}) \quad (22)$$

In this case, $\varepsilon$ is a parameter for determining a degree of reduction of the threshold candidates, and about $1/\varepsilon$ threshold candidates can be obtained.

As Weighted Quantile Sketch, two patterns can be considered, that is, a global pattern in which Weighted Quantile Sketch is performed at the first node of the decision tree (collectively performed on all pieces of sample data), and a local pattern in which Weighted Quantile Sketch is performed at each node (performed each time on a sample assigned to a corresponding node). It has been found that the local pattern is appropriate in view of generalization performance, so that the local pattern is employed in XGBoost.

Next, the following describes treatment of a missing value. There is no typically effective method of treating the missing value of sample data to be input in the field of machine learning, irrespective of the GBDT and the decision tree. There are a method of complementing the missing value with an average value, a median, a cooperative filter, or the like, and a method of excluding a feature amount including a large number of missing values, for example, but these methods are successfully implemented in not so many cases in view of performance. However, the structured data often includes a missing value, so that some measure is required in a practical use.

In XGBoost, the learning algorithm is devised to directly treat the sample data including the missing value. This is a method of obtaining a score at the time when all pieces of data of the missing value are assigned to any of the left and the right nodes in obtaining the branch score at the node. In a case of performing Weighted Quantile Sketch described above, the threshold candidate may be obtained for a set excluding the sample data including the missing value.

Regarding LightGBM

Next, the following describes LightGBM as a library of the GBDT. LightGBM employs a fast algorithm employing quantization of the feature amount, what is called binning, for preprocessing, and utilizing a GPU for calculating the branch score. Performance of LightGBM is substantially the same as that of XGBoost, and learning speed of LightGBM is several times higher than that of XGBoost. In recent years, users of LightGBM have been increased.

First, the following describes quantization of the feature amount. When a data set is large-scale, the branch score needs to be calculated for a large number of threshold candidates. In LightGBM, the number of threshold candidates is reduced by quantizing the feature amount as preprocessing of learning. Additionally, due to quantization, values and the number of threshold candidates do not vary for each node as in XGBoost, so that LightGBM is indispensable processing in a case of utilizing the GPU.

Various studies have been carried out for quantization of the feature amount under the name of binning. In LightGBM, the feature amount is divided into k bins, and only k threshold candidates are present. k is 255, 63, and 15, for example, and performance or learning speed varies depending on the data set.

Calculation of the branch score is simplified due to quantization of the feature amount. Specifically, the threshold candidate becomes a simple quantized value. Thus, it is sufficient to create a histogram of a first-order gradient and a second-order gradient for each feature amount, and obtain the branch score for each bin (quantized value). This is called a feature amount histogram.

Next, the following describes calculation of the branch score utilizing the GPU. Calculation patterns of the branch score are 256 at the maximum because the feature amount is quantized, but the number of pieces of sample data may exceed tens of thousands depending on the data set, so that creation of the histogram dominates learning time. As described above, the feature amount histogram needs to be obtained in calculating the branch score. In a case of utilizing the GPU, a plurality of threads need to update the same histogram, but the same bin may be updated at this point. Thus, an Atomic operation needs to be used, and performance is deteriorated when a ratio of updating the same bin is high. Thus, in LightGBM, which of the histograms of the first-order gradient and the second-order gradient is used for updating the value is determined for each thread in creating the histogram, which lowers a frequency of updating the same bin.

Configuration of Learning and Discrimination Device

Figure 2:
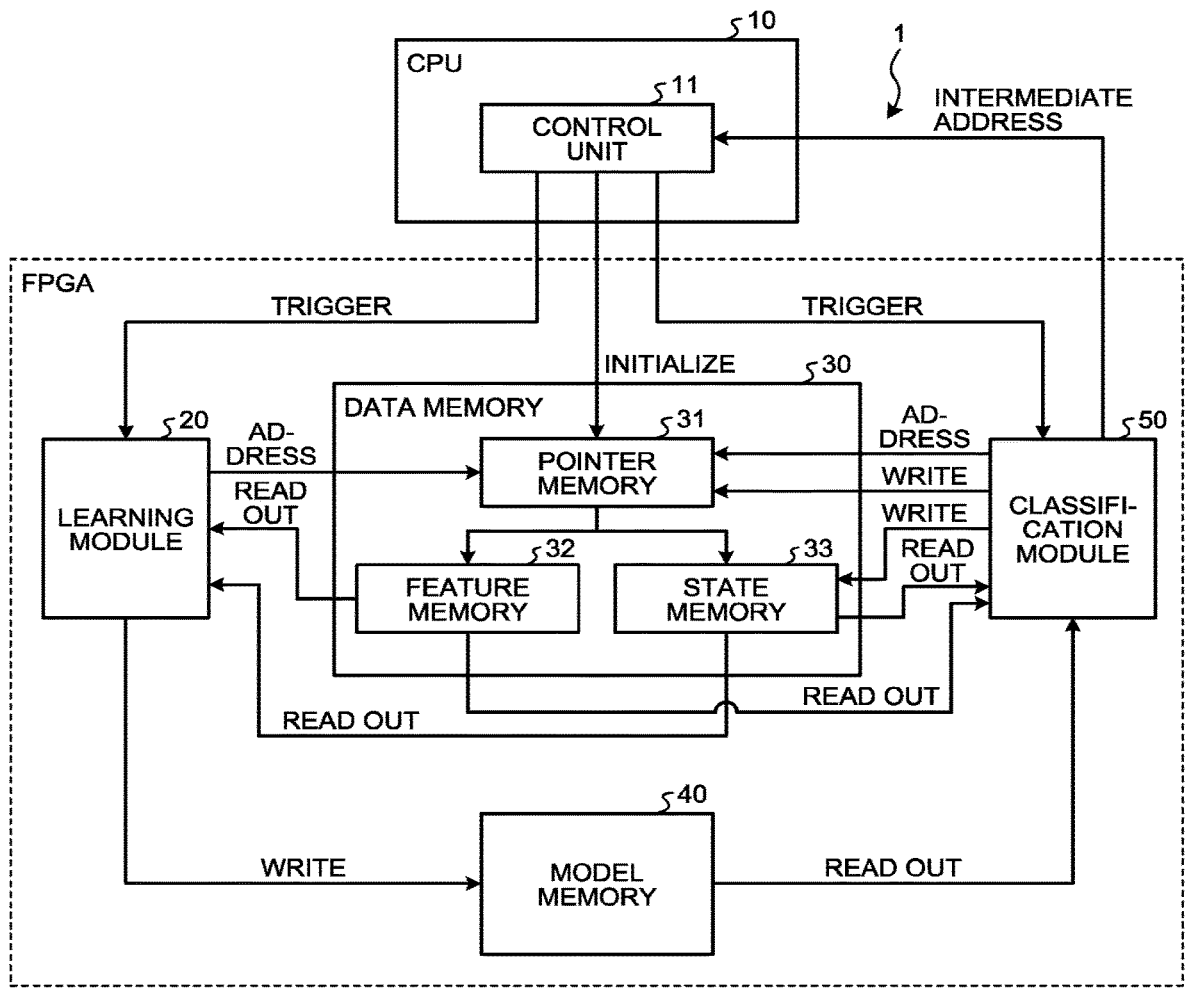
FIG. 2 is a diagram illustrating an example of a module configuration of a learning and discrimination device according to a first embodiment.
Figure 3:
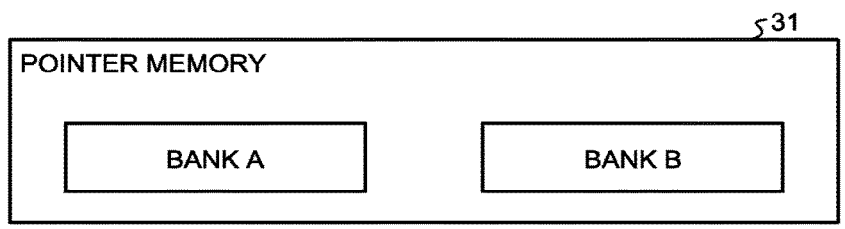
FIG. 3 is a diagram illustrating an example of a configuration of a pointer memory.
Figure 4:
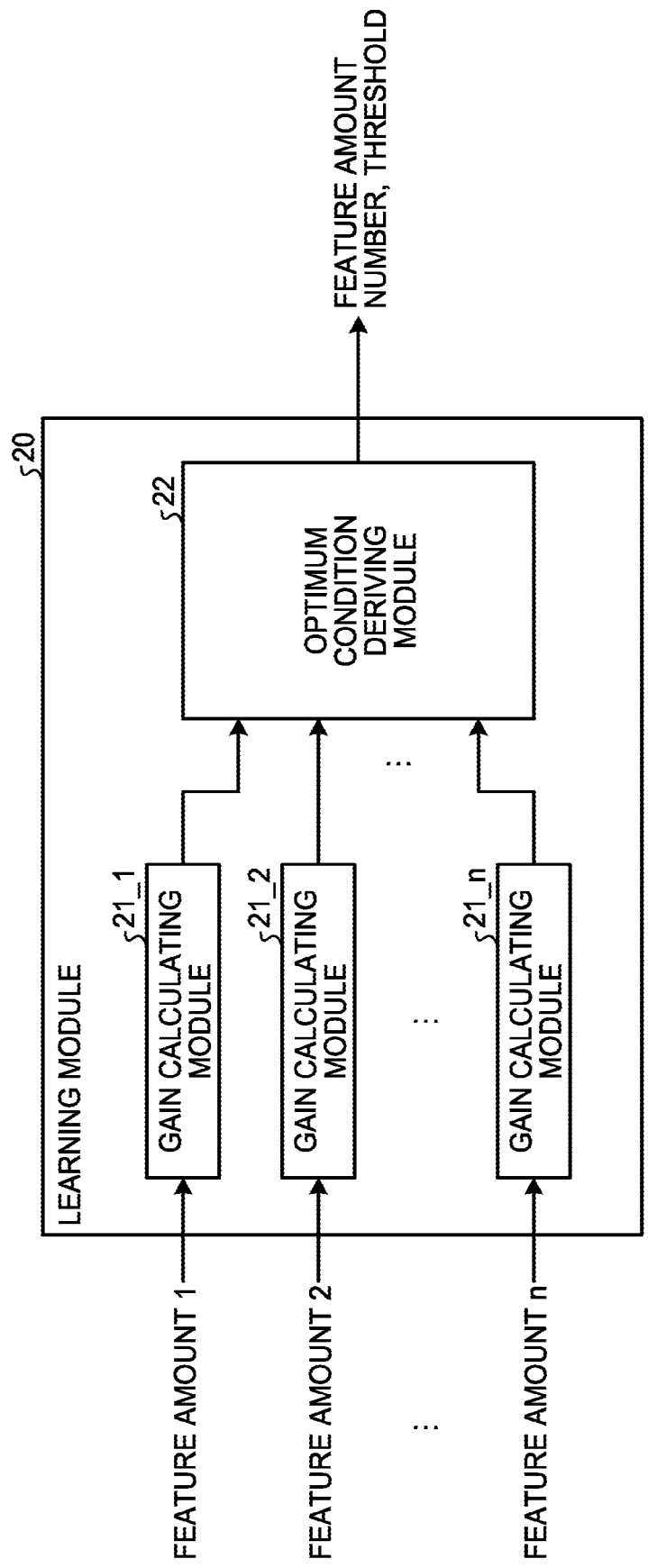
FIG. 4 is a diagram illustrating an example of a module configuration of a learning module.

FIG. 2 is a diagram illustrating an example of a module configuration of the learning and discrimination device according to the embodiment. FIG. 3 is a diagram illustrating an example of a configuration of a pointer memory. FIG. 4 is a diagram illustrating an example of a module configuration of a learning module. The following describes the module configuration of a learning and discrimination device 1 according to the present embodiment with reference to FIG. 2 to FIG. 4.

As illustrated in FIG. 2, the learning and discrimination device 1 according to the present embodiment includes a CPU 10, a learning module 20 (learning unit), a data memory 30, a model memory 40, and a classification module 50 (discriminating unit). Among these, the learning module 20, the data memory 30, the model memory 40, and the classification module 50 are configured by an FPGA. The CPU 10 can perform data communication with the FPGA via a bus. In addition to the components illustrated in FIG. 2, the learning and discrimination device 1 may include other components such as a RAM serving as a work area of the CPU 10, a read only memory (ROM) storing a computer program and the like executed by the CPU 10, an auxiliary storage device storing various kinds of data (a computer program and the like), and a communication I/F for communicating with an external device, for example.

The CPU 10 is an arithmetic device that controls learning of the GBDT as a whole. The CPU 10 includes a control unit 11. The control unit 11 controls respective modules including the learning module 20, the data memory 30, the model memory 40, and the classification module 50. The control unit 11 is implemented by a computer program executed by the CPU 10.

The learning module 20 is a hardware module that calculates a number of an optimum feature amount (hereinafter, also referred to as a "feature amount number" in some cases) for each node included in a decision tree, and a threshold, and in a case in which the node is a leaf, calculates a leaf weight to be written into the model memory 40. As illustrated in FIG. 4, the learning module 20 also includes gain calculating modules 21_1, 21_2, . . . , and 21_n (gain calculators) and an optimum condition deriving module 22 (deriving unit). In this case, n is a number at least equal to or larger than the number of feature amounts of sample data (including both of learning data and discrimination data). In a case of indicating an optional gain calculating module among the gain calculating modules 21_1, 21_2, . . . , and 21_n, or a case in which the gain calculating modules 21_1, 21_2, . . . , and 21_n are collectively called, they are simply referred to as a "gain calculating module 21".

The gain calculating module 21 is a module that calculates a branch score at each threshold using the expression (19) described above for a corresponding feature amount among the feature amounts included in the sample data to be input. In this case, the learning data of the sample data includes a label (true value) in addition to the feature amount, and the discrimination data of the sample data includes the feature amount and does not include the label. Each gain calculating module 21 includes a memory that performs an operation on respective histograms of all feature amounts input at a time (in 1 clock) and stores the histograms, and performs an operation on all of the feature amounts in parallel. Based on results of the histograms, gains of the respective feature amounts are calculated in parallel. Due to this, processing can be performed on all of the feature amounts at a time, or at the same time, so that speed of learning processing can be significantly improved. Such a method of reading out and processing all of the feature amounts in parallel is called Feature Parallel. To implement this method, a data memory needs to be able to read out all of the feature amounts at a time (in 1 clock). Thus, this method cannot be implemented with a memory having a normal data width such as 32-bit or 256-bit width. With software, the number of bits of data that can be treated by the CPU at a time is typically 64 bits at the maximum, and even when the number of the feature amounts is 100 and the number of bits of each feature amount is 8 bits, 8000 bits are required, so that the method cannot be implemented at all. Thus, in the related art, employed is a method of storing a different feature amount for each address of the memory (for example, 64-bit width that can be treated by the CPU), and storing the feature amounts as a whole across a plurality of addresses. On the other hand, the present method includes novel technical content such that all of the feature amounts are stored at one address of the memory, and all of the feature amounts are read out by one access.

As described above, in the GBDT, learning of the decision tree cannot be parallelized. Thus, how quickly each decision tree is learned dominates the speed of learning processing. On the other hand, in the RF for performing ensemble learning, there is no dependence between the decision trees at the time of learning, so that the learning processing for each decision tree can be easily parallelized, but accuracy thereof is typically lower than that of the GBDT. As described above, by applying Feature Parallel as described above to learning of the GBDT having higher accuracy than that of the RF, speed of the learning processing of the decision tree can be improved.

The gain calculating module 21 outputs the calculated branch score to the optimum condition deriving module 22.

The optimum condition deriving module 22 is a module that receives an input of each branch score corresponding to the feature amount output from each gain calculating module 21, and derives a threshold and a number of the feature amount (feature amount number) the branch score of which is the largest. The optimum condition deriving module 22 writes the derived feature amount number and threshold into the model memory 40 as branch condition data of a corresponding node (an example of data of a node).

The data memory 30 is an SRAM that stores various kinds of data. The data memory 30 includes a pointer memory 31, a feature memory 32, and a state memory 33.

The pointer memory 31 is a memory that stores a storage destination address of the sample data stored in the feature memory 32. As illustrated in FIG. 3, the pointer memory 31 includes a bank A (bank region) and a bank B (bank region). An operation of dividing a region into two banks including the bank A and the bank B, and storing the storage destination address of the sample data will be described later in detail with reference to FIG. 5 to FIG. 13. The pointer memory 31 may have three or more banks.

The feature memory 32 is a memory that stores the sample data (including the learning data and the discrimination data).

The state memory 33 is a memory that stores the state information (w, g, and h described above) and label information.

The model memory 40 is an SRAM that stores branch condition data (the feature amount number and the threshold) for each node of the decision tree, a leaf flag (flag information, an example of data of the node) indicating whether the node is a leaf, and a leaf weight in a case in which the node is a leaf.

The classification module 50 is a hardware module that distributes pieces of sample data for each node and each decision tree. The classification module 50 calculates the state information (w, g, h) to be written into the state memory 33.

Not only in discrimination (branching) of the sample data (learning data) in the learning processing described above but also in discrimination processing for the sample data (discrimination data), the classification module 50 can discriminate the discrimination data with the same module configuration. At the time of discrimination processing, processing performed by the classification module 50 can be pipelined by collectively reading all of the feature amounts, and the processing speed can be increased such that one piece of sample data is discriminated for each clock. On the other hand, in a case in which the feature amounts cannot be collectively read as described above, which of the feature amounts is required cannot be found unless branching into the respective node, so that the processing cannot be pipelined in a form of accessing an address of a corresponding feature amount each time.

Assuming that a plurality of classification modules 50 described above are provided, a plurality of pieces of discrimination data may be divided (Data Parallel) to be distributed to the respective classification modules 50, and each of the classification modules 50 may be caused to perform discrimination processing to increase the speed of discrimination processing.

Learning Processing of Learning and Discrimination Device

The following specifically describes learning processing of the learning and discrimination device 1 with reference to FIG. 5 to FIG. 13.

Initialization

Figure 5:
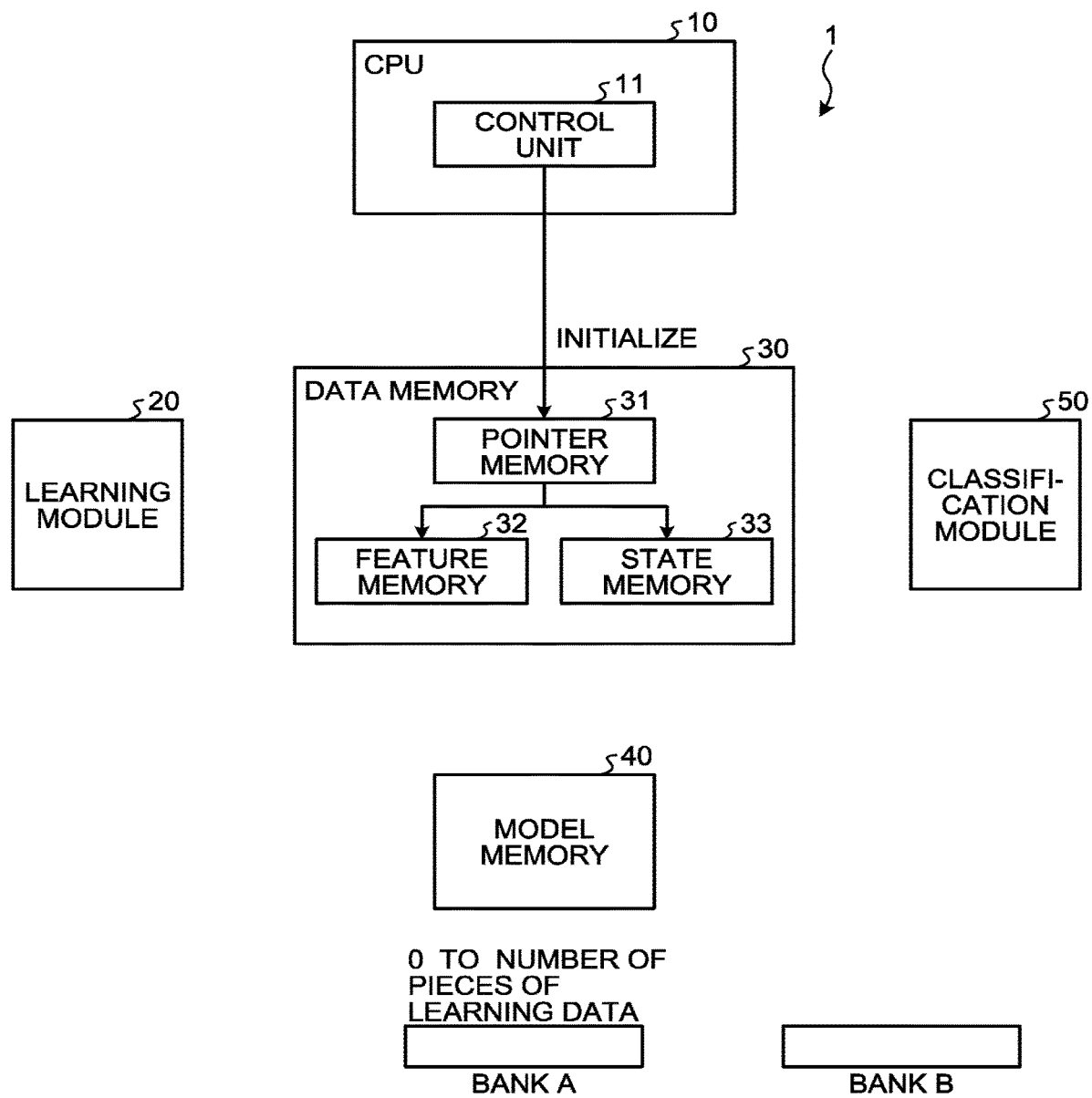
FIG. 5 is a diagram illustrating an operation of a module at the time of initializing the learning and discrimination device according to the first embodiment.

FIG. 5 is a diagram illustrating an operation of a module at the time of initializing the learning and discrimination device according to the embodiment. As illustrated in FIG. 5, first, the control unit 11 initializes the pointer memory 31. For example, as illustrated in FIG. 5, the control unit 11 writes, into the bank A of the pointer memory 31, addresses of the pieces of sample data (learning data) in the feature memory 32 corresponding to the number of pieces of learning data in order (for example, in ascending order of the address).

All pieces of the learning data are not necessarily used (all addresses are not necessarily written), and it may be possible to use pieces of the learning data that are randomly selected (write addresses of the selected pieces of the learning data) based on a probability corresponding to a predetermined random number by what is called data subsampling. For example, in a case in which a result of data subsampling is 0.5, half of all addresses of the pieces of the learning data may be written into the pointer memory 31 (in this case, the bank A) with a half probability corresponding to the random number. To generate a random number, a pseudorandom number created by a Linear Feedback Shift Register (LFSR) can be used.

All of the feature amounts of the pieces of learning data used for learning are not necessarily used, and it may be possible to use only feature amounts that are randomly selected (for example, selected half thereof) based on a probability corresponding to the random number similarly to the above description by what is called feature subsampling. In this case, for example, as data of feature amounts other than the feature amounts selected by feature subsampling, constants may be output from the feature memory 32. Due to this, an effect is exhibited such that generalization performance for unknown data (discrimination data) is improved.

Determination of branch condition data at depth 0, node 0

Figure 6:
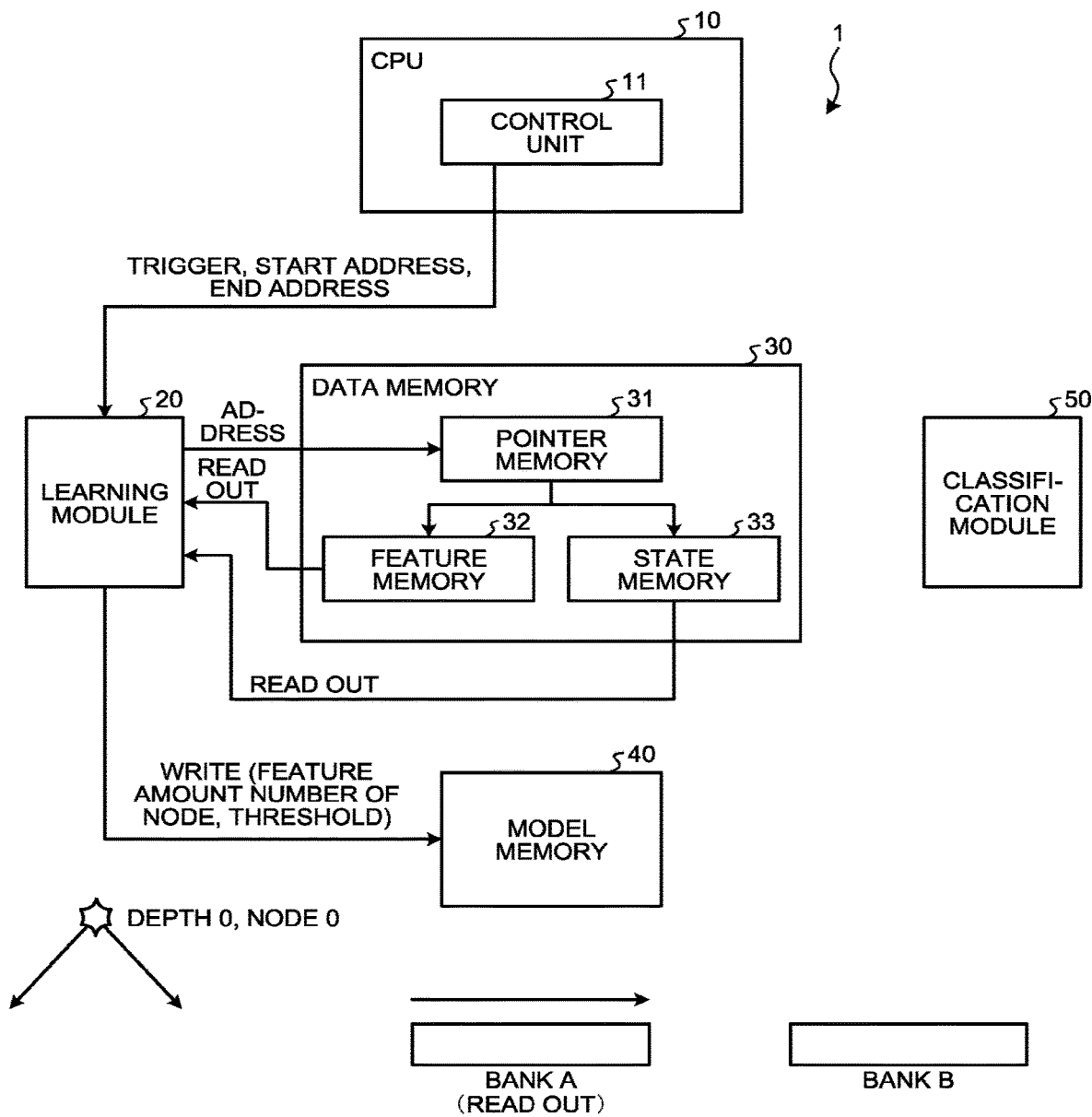
FIG. 6 is a diagram illustrating an operation of a module in a case of determining node parameters at depth 0, node 0 of the learning and discrimination device according to the first embodiment.

FIG. 6 is a diagram illustrating an operation of a module in a case of determining node parameters at depth 0, node 0 of the learning and discrimination device according to the embodiment. It is assumed that the top of a hierarchy of the decision tree is "depth 0", hierarchical levels lower than the top are referred to as "depth 1", "depth 2", . . . in order, the leftmost node at a specific hierarchical level is referred to as "node 0", and nodes on the right side thereof are referred to as "node 1", "node 2", . . . in order.

As illustrated in FIG. 6, first, the control unit 11 transmits a start address and an end address to the learning module 20, and causes the learning module 20 to start processing by a trigger. The learning module 20 designates an address of a target piece of the learning data from the pointer memory 31 (bank A) based on the start address and the end address, reads out the learning data (feature amount) from the feature memory 32, and reads out the state information (w, g, h) from the state memory 33 based on the address.

In this case, as described above, each gain calculating module 21 of the learning module 20 calculates a histogram of a corresponding feature amount, stores the histogram in the SRAM thereof, and calculates a branch score at each threshold based on a result of the histogram. The optimum condition deriving module 22 of the learning module 20 receives an input of the branch score corresponding to each feature amount output from the gain calculating module 21, and derives a threshold and a number of the feature amount (feature amount number) the branch score of which is the largest. The optimum condition deriving module 22 then writes the derived feature amount number and threshold into the model memory 40 as branch condition data of the corresponding node (depth 0, node 0). At this point, the optimum condition deriving module 22 sets the leaf flag to be "0" to indicate that branching is further performed from the node (depth 0, node 0), and writes the data of the node (this may be part of the branch condition data) into the model memory 40.

The learning module 20 performs the operation described above by designating the addresses of the pieces of learning data written into the bank A in order, and reading out the respective pieces of learning data from the feature memory 32 based on the addresses.

Data Branch Processing at Depth 0, Node 0

Figure 7:
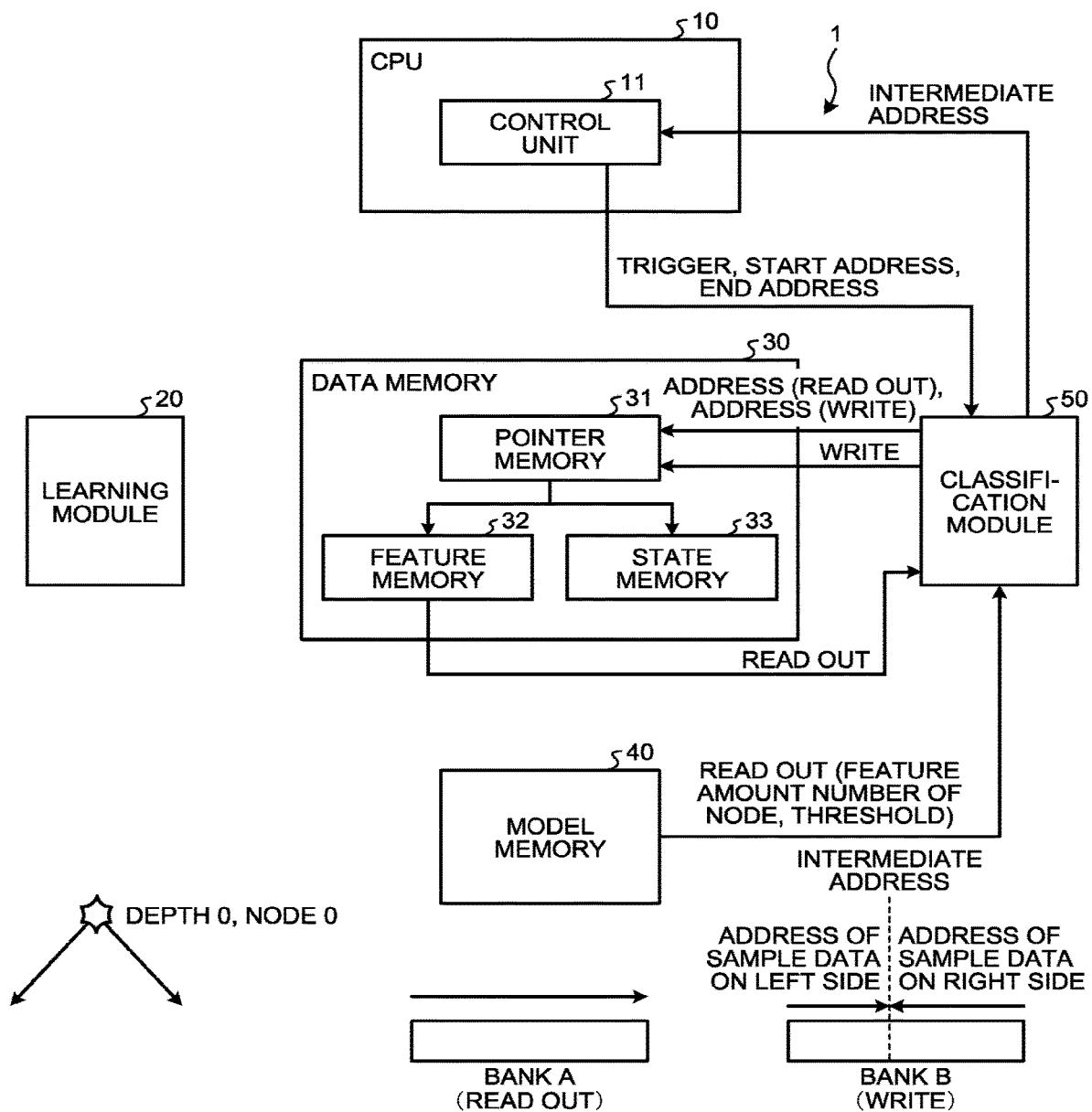
FIG. 7 is a diagram illustrating an operation of a module at the time of branching at depth 0, node 0 of the learning and discrimination device according to the first embodiment.

FIG. 7 is a diagram illustrating an operation of a module at the time of branching at depth 0, node 0 of the learning and discrimination device according to the embodiment.

As illustrated in FIG. 7, the control unit 11 transmits the start address and the end address to the classification module 50, and causes the classification module 50 to start processing by a trigger. The classification module 50 designates the address of the target learning data from the pointer memory 31 (bank A) based on the start address and the end address, and reads out the learning data (feature amount) from the feature memory 32 based on the address. The classification module 50 also reads out the branch condition data (the feature amount number, the threshold) of the corresponding node (depth 0, node 0) from the model memory 40. The classification module 50 determines whether to cause the read-out sample data to branch to the left side or to the right side of the node (depth 0, node 0) in accordance with the branch condition data, and based on a determination result, the classification module 50 writes the address of the learning data in the feature memory 32 into the other bank (writing bank) (in this case, the bank B) (a bank region for writing) different from a read-out bank (in this case, the bank A) (a bank region for reading-out) of the pointer memory 31.

At this point, if it is determined that branching is performed to the left side of the node, the classification module 50 writes the address of the learning data in ascending order of the address in the bank B as illustrated in FIG. 7. If it is determined that branching is performed to the right side of the node, the classification module 50 writes the address of the learning data in descending order of the address in the bank B. Due to this, in the writing bank (bank B), the address of the learning data branched to the left side of the node is written as a lower address, and the address of the learning data branched to the right side of the node is written as a higher address, in a clearly separated manner. Alternatively, in the writing bank, the address of the learning data branched to the left side of the node may be written as a higher address, and the address of the learning data branched to the right side of the node may be written as a lower address, in a separated manner.

In this way, the two banks, that is, the bank A and the bank B are configured in the pointer memory 31 as described above, and the memory can be efficiently used by alternately performing reading and writing thereon although the capacity of the SRAM in the FPGA is limited. As a simplified method, there is a method of configuring each of the feature memory 32 and the state memory 33 to have two banks. However, the data indicating the address in the feature memory 32 is typically smaller than the sample data, so that usage of the memory can be further reduced by a method of preparing the pointer memory 31 to indirectly designate the address as in the present embodiment.

As the operation described above, the classification module 50 performs branch processing on all pieces of the learning data. However, after the branch processing ends, the respective numbers of pieces of learning data separated to the left side and the right side of the node (depth 0, node 0) are not the same, so that the classification module 50 returns, to the control unit 11, an address (intermediate address) in the writing bank (bank B) corresponding to a boundary between the addresses of the learning data branched to the left side and the addresses of the learning data branched to the right side. The intermediate address is used in the next branch processing.

Determination of Branch Condition Data at Depth 1, Node 0

Figure 8:
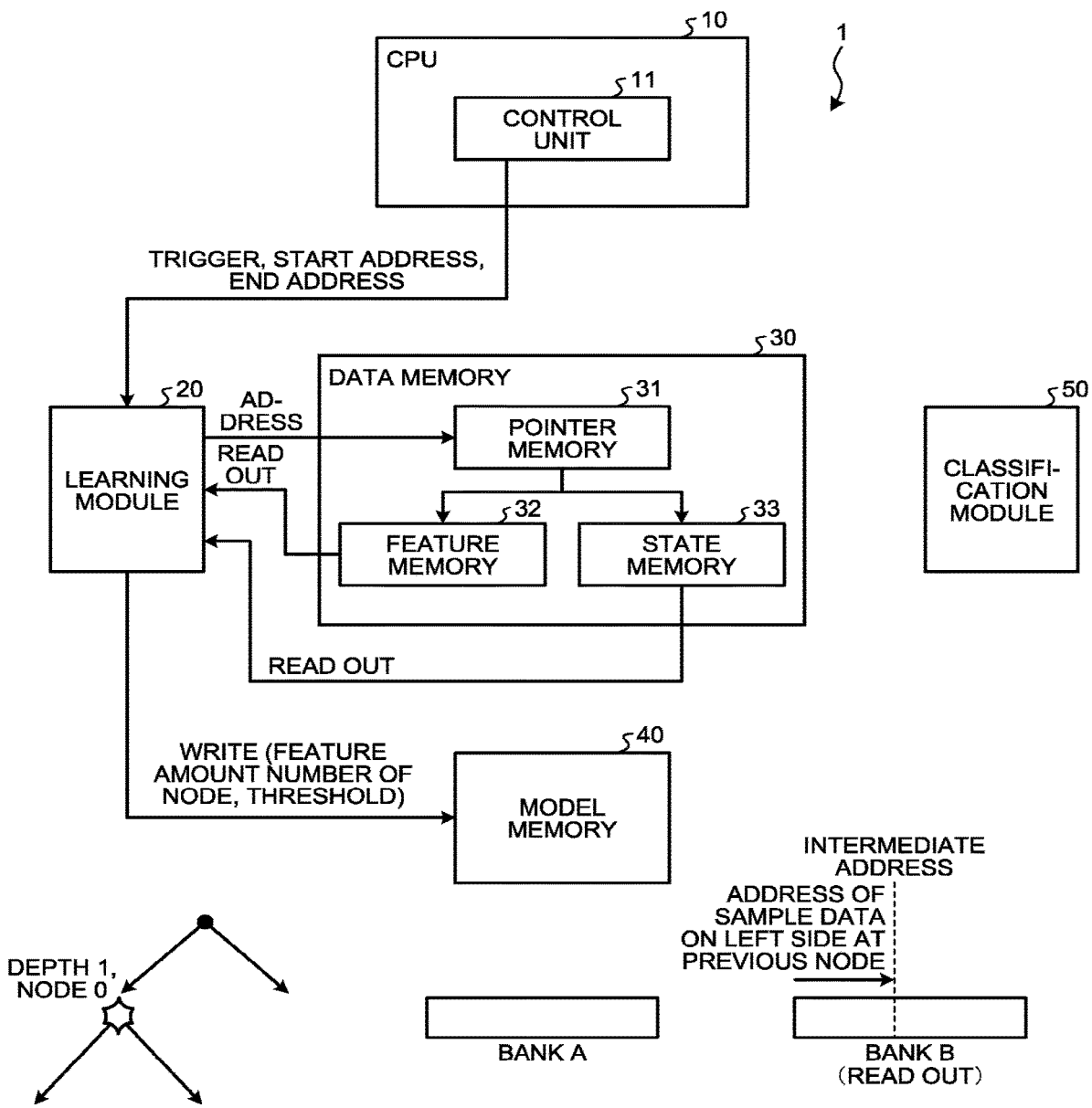
FIG. 8 is a diagram illustrating an operation of a module in a case of determining node parameters at depth 1, node 0 of the learning and discrimination device according to the first embodiment.

FIG. 8 is a diagram illustrating an operation of a module in a case of determining node parameters at depth 1, node 0 of the learning and discrimination device according to the embodiment. The operation is basically the same as that in the processing of determining the branch condition data at depth 0, node 0 illustrated in FIG. 6, but the hierarchical level of a target node is changed (from depth 0 to depth 1), so that roles of the bank A and the bank B in the pointer memory 31 are reversed. Specifically, the bank B serves as the read-out bank, and the bank A serves as the writing bank (refer to FIG. 9).

As illustrated in FIG. 8, the control unit 11 transmits the start address and the end address to the learning module 20 based on the intermediate address received from the classification module 50 through the processing at depth 0, and causes the learning module 20 to start processing by a trigger. The learning module 20 designates the address of the target learning data from the pointer memory 31 (bank B) based on the start address and the end address, reads out the learning data (feature amount) from the feature memory 32 based on the address, and reads out the state information (w, g, h) from the state memory 33. Specifically, as illustrated in FIG. 8, the learning module 20 designates the addresses in order from the left side (lower address) to the intermediate address in the bank B.

In this case, as described above, each gain calculating module 21 of the learning module 20 stores the feature amount of the read-out learning data in the SRAM thereof, and calculates the branch score at each threshold. The optimum condition deriving module 22 of the learning module 20 receives an input of the branch score corresponding to each feature amount output from the gain calculating module 21, and derives a threshold and a number of the feature amount (feature amount number) the branch score of which is the largest. The optimum condition deriving module 22 then writes the derived feature amount number and threshold into the model memory 40 as the branch condition data of the corresponding node (depth 1, node 0). At this point, the optimum condition deriving module 22 sets the leaf flag to be "0" to indicate that branching is further performed from the node (depth 1, node 0), and writes the data of the node (this may be part of the branch condition data) into the model memory 40.

The learning module 20 performs the operation described above by designating the addresses in order from the left side (lower address) to the intermediate address in the bank B, and reading out each piece of the learning data from the feature memory 32 based on the addresses.

Data Branch Processing at Depth 1, Node 0

Figure 9:
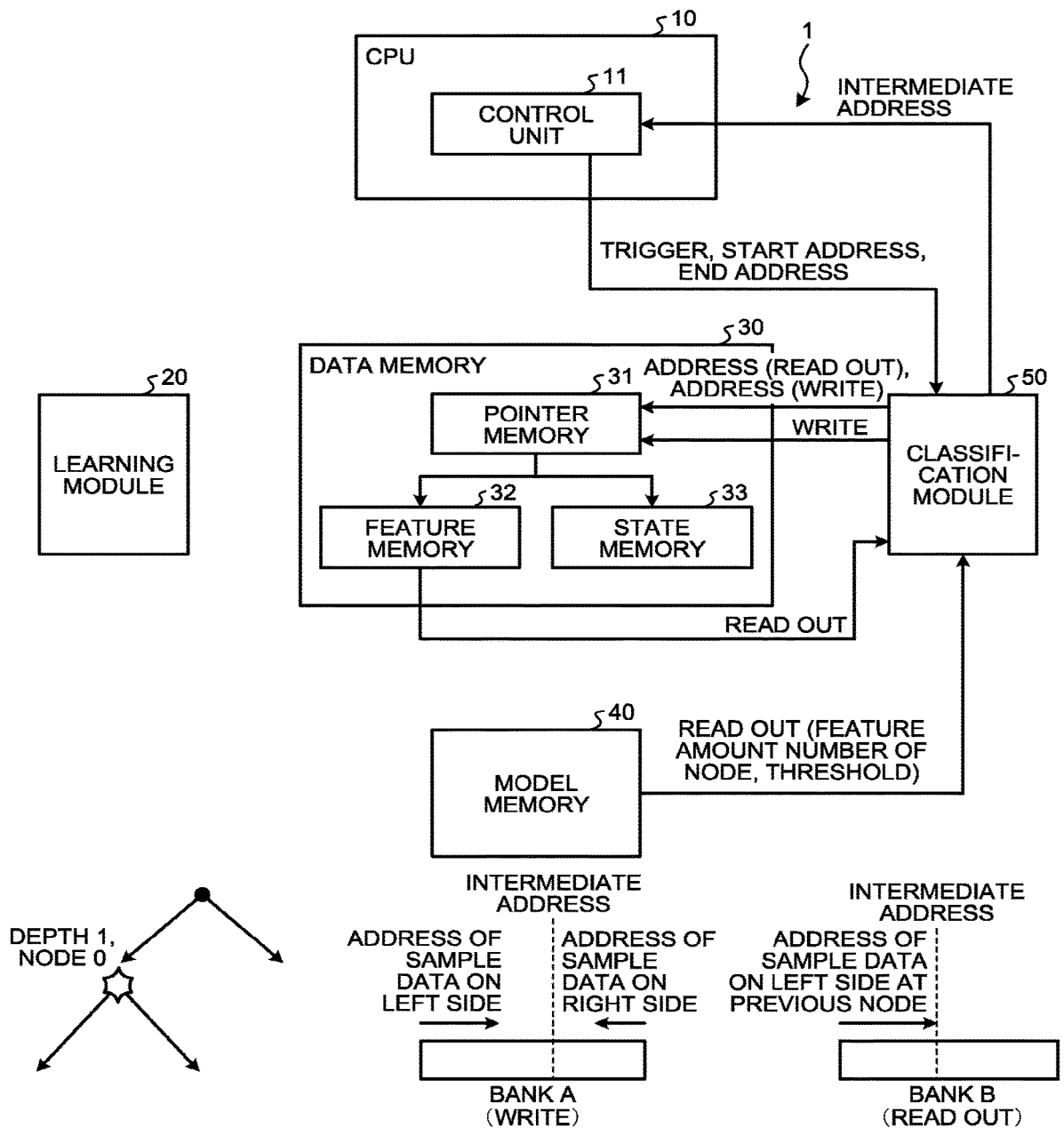
FIG. 9 is a diagram illustrating an operation of a module at the time of branching at depth 1, node 0 of the learning and discrimination device according to the first embodiment.

FIG. 9 is a diagram illustrating an operation of a module at the time of branching at depth 1, node 0 of the learning and discrimination device according to the embodiment.

As illustrated in FIG. 9, the control unit 11 transmits the start address and the end address to the classification module 50 based on the intermediate address received from the classification module 50 through the processing at depth 0, and causes the classification module 50 to start processing by a trigger. The classification module 50 designates the address of the target learning data from the left side of the pointer memory 31 (bank B) based on the start address and the end address, and reads out the learning data (feature amount) from the feature memory 32 based on the address. The classification module 50 also reads out the branch condition data (the feature amount number, the threshold) of the corresponding node (depth 1, node 0) from the model memory 40. The classification module 50 determines whether to cause the read-out sample data to branch to the left side or to the right side of the node (depth 1, node 0) in accordance with the branch condition data, and based on a determination result, the classification module 50 writes the address of the learning data in the feature memory 32 into the other bank (writing bank) (in this case, the bank A) (the bank region for writing) different from the read-out bank (in this case, the bank B) (the bank region for reading-out) of the pointer memory 31.

At this point, if it is determined that branching is performed to the left side of the node, the classification module 50 writes the address of the learning data in ascending order of the address in the bank A as illustrated in FIG. 9. If it is determined that branching is performed to the right side of the node, the classification module 50 writes the address of the learning data in descending order of the address in the bank A. Due to this, in the writing bank (bank A), the address of the learning data branched to the left side of the node is written as a lower address, and the address of the learning data branched to the right side of the node is written as a higher address, in a clearly separated manner. Alternatively, in the writing bank, the address of the learning data branched to the left side of the node may be written as a higher address, and the address of the learning data branched to the right side of the node may be written as a lower address, in a separated manner.

As the operation described above, the classification module 50 performs branch processing on a piece of learning data designated by the address written on the left side of the intermediate address in the bank B among all the pieces of learning data. However, after the branch processing ends, the respective numbers of pieces of learning data separated to the left side and the right side of the node (depth 1, node 0) are not the same, so that the classification module 50 returns, to the control unit 11, an address (intermediate address) in the writing bank (bank A) corresponding to the middle of the addresses of the learning data branched to the left side and the addresses of the learning data branched to the right side. The intermediate address is used in the next branch processing.

Determination of Branch Condition Data at Depth 1, Node 1

Figure 10:
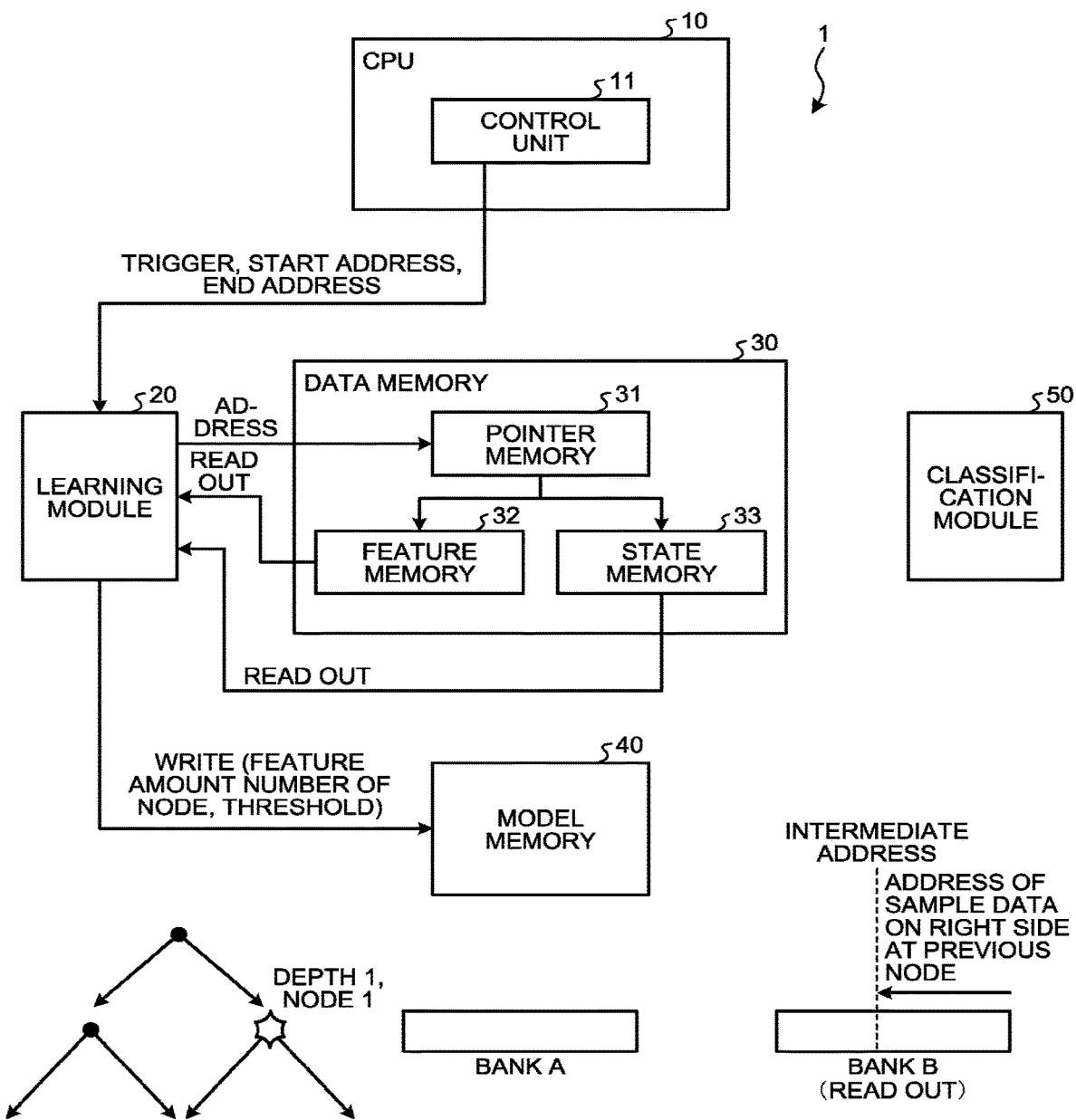
FIG. 10 is a diagram illustrating an operation of a module in a case of determining node parameters at depth 1, node 1 of the learning and discrimination device according to the first embodiment.

FIG. 10 is a diagram illustrating an operation of a module in a case of determining node parameters at depth 1, node 1 of the learning and discrimination device according to the embodiment. Similarly to the case of FIG. 8, the hierarchical level is the same as that of the node at depth 1, node 0, so that the bank B serves as the read-out bank, and the bank A serves as the writing bank (refer to FIG.

As illustrated in FIG. 10, the control unit 11 transmits the start address and the end address to the learning module 20 based on the intermediate address received from the classification module 50 through the processing at depth 0, and causes the learning module 20 to start processing by a trigger. The learning module 20 designates the address of the target learning data from the pointer memory 31 (bank B) based on the start address and the end address, reads out the learning data (feature amount) from the feature memory 32 based on the address, and reads out the state information (w, g, h) from the state memory 33. Specifically, as illustrated in FIG. 10, the learning module 20 designates the addresses in order from the right side (higher address) to the intermediate address in the bank B.

In this case, as described above, each gain calculating module 21 of the learning module 20 stores each feature amount of the read-out learning data in the SRAM thereof, and calculates the branch score at each threshold. The optimum condition deriving module 22 of the learning module 20 receives an input of the branch score corresponding to each feature amount output from the gain calculating module 21, and derives a threshold and a number of the feature amount (feature amount number) the branch score of which is the largest. The optimum condition deriving module 22 then writes the derived feature amount number and threshold into the model memory 40 as the branch condition data of the corresponding node (depth 1, node 1). At this point, the optimum condition deriving module 22 sets the leaf flag to be "0" to indicate that branching is further performed from the node (depth 1, node 1), and writes the data of the node (this may be part of the branch condition data) into the model memory 40.

The learning module 20 performs the operation described above by designating the addresses in order from the right side (higher address) to the intermediate address in the bank B, and reading out each piece of the learning data from the feature memory 32 based on the addresses.

Data Branch Processing at Depth 1, Node 1

Figure 11:
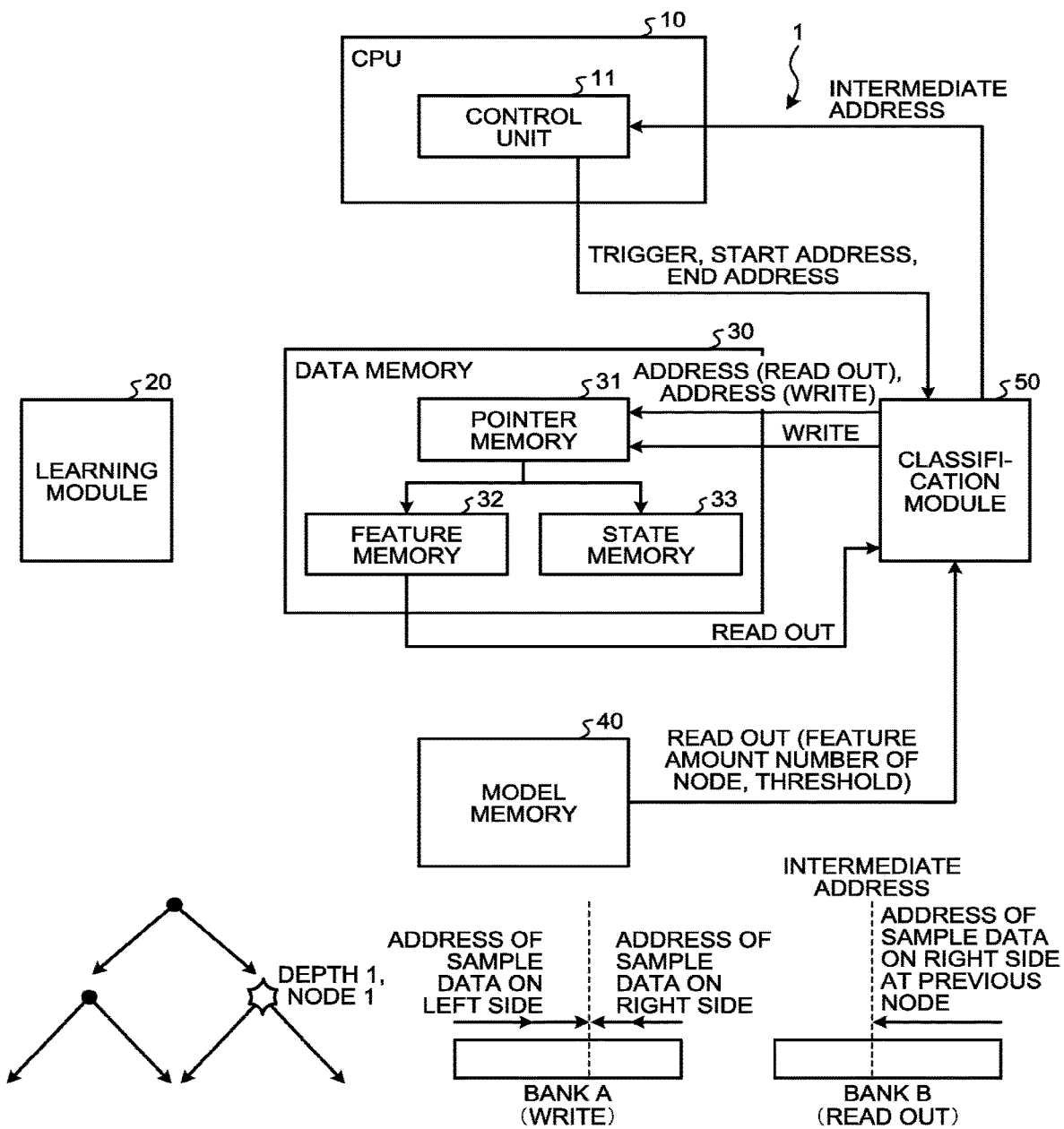
FIG. 11 is a diagram illustrating an operation of a module at the time of branching at depth 1, node 1 of the learning and discrimination device according to the first embodiment.

FIG. 11 is a diagram illustrating an operation of a module at the time of branching at depth 1, node 1 of the learning and discrimination device according to the embodiment.

As illustrated in FIG. 11, the control unit 11 transmits the start address and the end address to the classification module 50 based on the intermediate address received from the classification module 50 through the processing at depth 0, and causes the classification module 50 to start processing by a trigger. The classification module 50 designates the address of the target learning data from the right side of the pointer memory 31 (bank B) based on the start address and the end address, and reads out the learning data (feature amount) from the feature memory 32 based on the address. The classification module 50 reads out the branch condition data (the feature amount number, the threshold) of the corresponding node (depth 1, node 1) from the model memory 40. The classification module 50 then determines whether to cause the read-out sample data to branch to the left side or to the right side of the node (depth 1, node 1) in accordance with the branch condition data, and based on a determination result, the classification module 50 writes the address of the learning data in the feature memory 32 into the other bank (writing bank) (in this case, the bank A) (the bank region for writing) different from the read-out bank (in this case, the bank B) (the bank region for reading-out) of the pointer memory 31.

At this point, if it is determined that branching is performed to the left side of the node, the classification module 50 writes the address of the learning data in ascending order of the address in the bank A as illustrated in FIG. 11. If it is determined that branching is performed to the right side of the node, the classification module 50 writes the address of the learning data in descending order of the address in the bank A. Due to this, in the writing bank (bank A), the address of the learning data branched to the left side of the node is written as a lower address, and the address of the learning data branched to the right side of the node is written as a higher address, in a clearly separated manner. Alternatively, in the writing bank, the address of the learning data branched to the left side of the node may be written as a higher address, and the address of the learning data branched to the right side of the node may be written as a lower address, in a separated manner. In such a case, the operation in FIG. 9 is required to be performed at the same time.

As the operation described above, the classification module 50 performs branch processing on a piece of learning data designated by the address written on the right side of the intermediate address in the bank B among all the pieces of learning data. However, after the branch processing ends, the respective numbers of pieces of learning data separated to the left side and the right side of the node (depth 1, node 1) are not the same, so that the classification module 50 returns, to the control unit 11, an address (intermediate address) in the writing bank (bank A) corresponding to the middle of the addresses of the learning data branched to the left side and the addresses of the learning data branched to the right side. The intermediate address is used in the next branch processing.

Case in which Branching is not Performed at Time of Determining Branch Condition Data at Depth 1, Node 1

Figure 12:
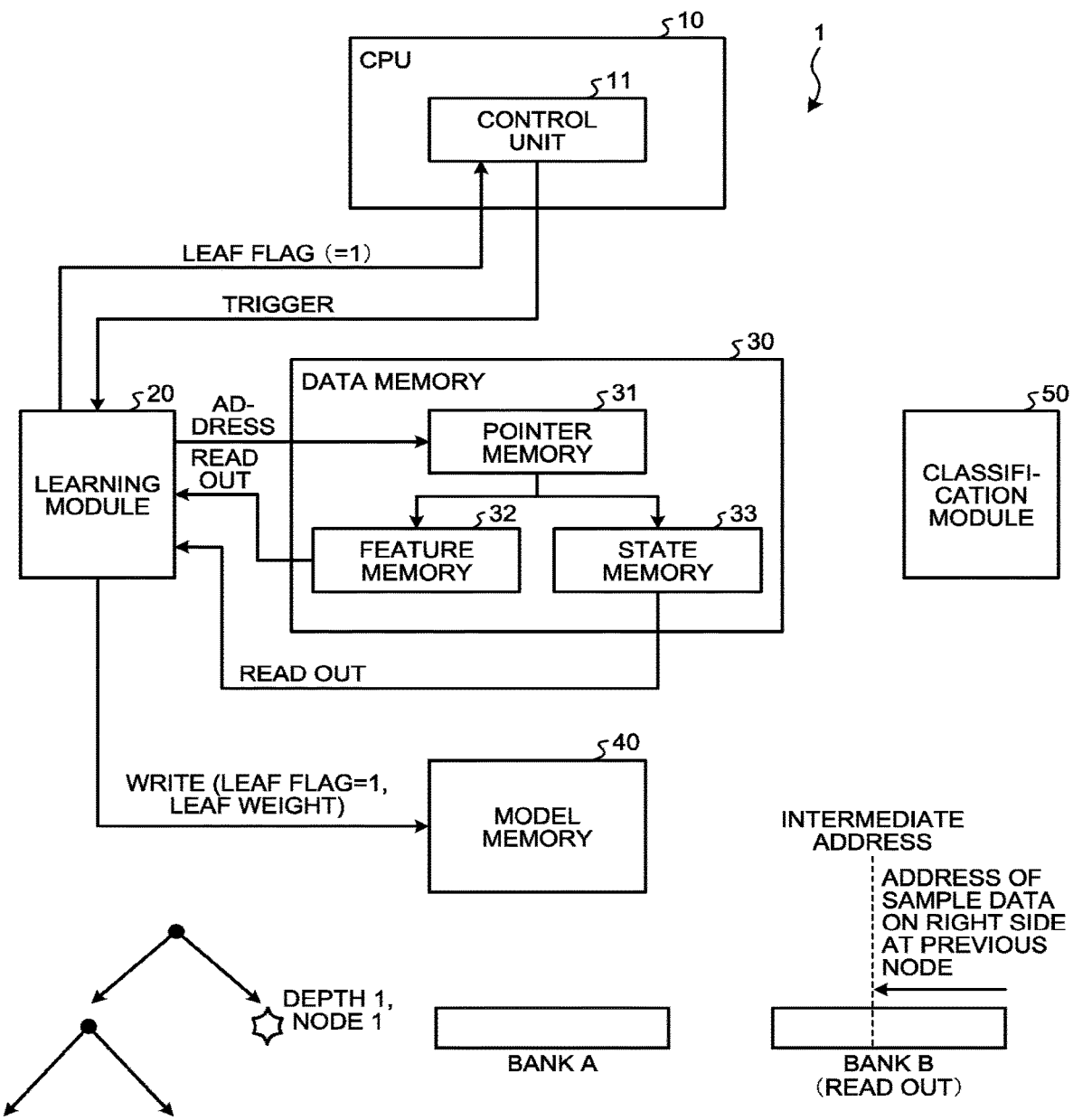
FIG. 12 is a diagram illustrating an operation of a module in a case in which branching is not performed as a result of determining node parameters at depth 1, node 1 of the learning and discrimination device according to the first embodiment.

FIG. 12 is a diagram illustrating an operation of a module in a case in which branching is not performed as a result of determining node parameters at depth 1, node 1 of the learning and discrimination device according to the embodiment. Similarly to the case of FIG. 8, the hierarchical level is the same as that of the node at depth 1, node 0, so that the bank B serves as the read-out bank.

As illustrated in FIG. 12, the control unit 11 transmits the start address and the end address to the learning module 20 based on the intermediate address received from the classification module 50 through the processing at depth 0, and causes the learning module 20 to start processing by a trigger. The learning module 20 designates the address of the target learning data from the pointer memory 31 (bank B) based on the start address and the end address, reads out the learning data (feature amount) from the feature memory 32 based on the address, and reads out the state information (w, g, h) from the state memory 33. Specifically, as illustrated in FIG. 12, the learning module 20 designates the addresses in order from the right side (higher address) to the intermediate address in the bank B.

If it is determined that branching will not be further performed from the node (depth 1, node 1) based on the calculated branch score and the like, the learning module 20 sets the leaf flag to be "1", writes the data of the node (this may be part of the branch condition data) into the model memory 40, and transmits, to the control unit 11, the fact that the leaf flag of the node is "1". Due to this, it is recognized that branching is not performed to a lower hierarchical level than the node (depth 1, node 1). In a case in which the leaf flag of the node (depth 1, node 1) is "1", the learning module 20 writes a leaf weight (w) (this may be part of the branch condition data) into the model memory 40 in place of the feature amount number and the threshold. Due to this, the capacity of the model memory 40 can be reduced as compared with a case where capacities are secured in the model memory 40 separately.

By advancing the above processing illustrated in FIG. 6 to FIG. 12 for each hierarchical level (depth), the entire decision tree is completed (the decision tree is learned).

Case in which Learning of Decision Tree is Completed

Figure 13:
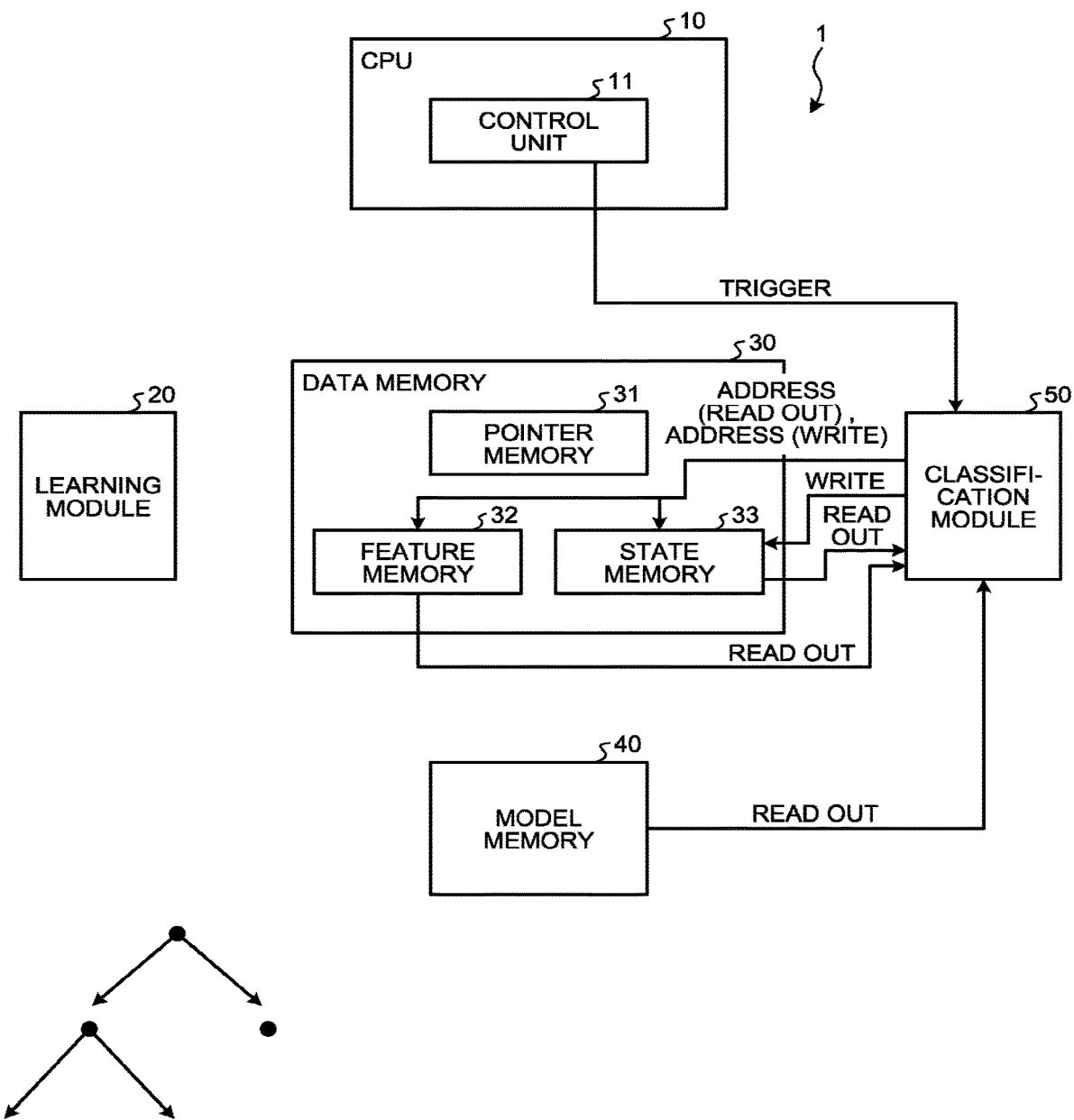
FIG. 13 is a diagram illustrating an operation of a module at the time of updating state information of all pieces of sample data in a case in which learning of a decision tree is completed by the learning and discrimination device according to the first embodiment.

FIG. 13 is a diagram illustrating an operation of a module at the time of updating the state information of all pieces of sample data in a case in which learning of the decision tree is completed by the learning and discrimination device according to the embodiment.

In a case in which learning of one decision tree included in the GBDT is completed, a first-order gradient g and a second-order gradient h corresponding to the error function of each piece of the learning data, and the leaf weight w for each piece of the learning data need to be calculated for being used in boosting (in this case, gradient boosting) to the next decision tree. As illustrated in FIG. 13, the control unit 11 causes the classification module 50 to start calculation described above by a trigger. The classification module 50 performs processing of branch determination for nodes at all depths (hierarchical levels) on all pieces of the learning data, and calculates the leaf weight corresponding to each piece of the learning data. The classification module 50 then calculates the state information (w, g, h) for the calculated leaf weight based on the label information, and writes the state information (w, g, h) back to an original address of the state memory 33. In this way, learning of the next decision tree is performed by utilizing updated state information.

As described above, in the learning and discrimination device 1 according to the present embodiment, the learning module 20 includes memories (for example, SRAMs) for reading respective feature amounts of the input sample data. Due to this, all of the feature amounts of the sample data can be read out by one access, and each gain calculating module 21 can perform processing on all of the feature amounts at a time, so that speed of learning processing for the decision tree can be significantly improved.

In the learning and discrimination device 1 according to the present embodiment, the two banks, that is, the bank A and the bank B are configured in the pointer memory 31, and reading and writing are alternately performed. Due to this, the memory can be efficiently used. As a simplified method, there is a method of configuring each of the feature memory 32 and the state memory 33 to have two banks. However, the data indicating the address in the feature memory 32 is typically smaller than the sample data, so that the memory capacity can be further saved by a method of preparing the pointer memory 31 to indirectly designate the address as in the present embodiment. If it is determined that branching is performed to the left side of the node, the classification module 50 writes the address of the learning data in order from a lower address in the writing bank of the two banks, and if it is determined that branching is performed to the right side of the node, the classification module 50 writes the address of the learning data in order from a higher address in the writing bank. Due to this, in the writing bank, the address of the learning data branched to the left side of the node is written as a lower address, and the address of the learning data branched to the right side of the node is written as a higher address, in a clearly separated manner.

Modification

Figure 14:
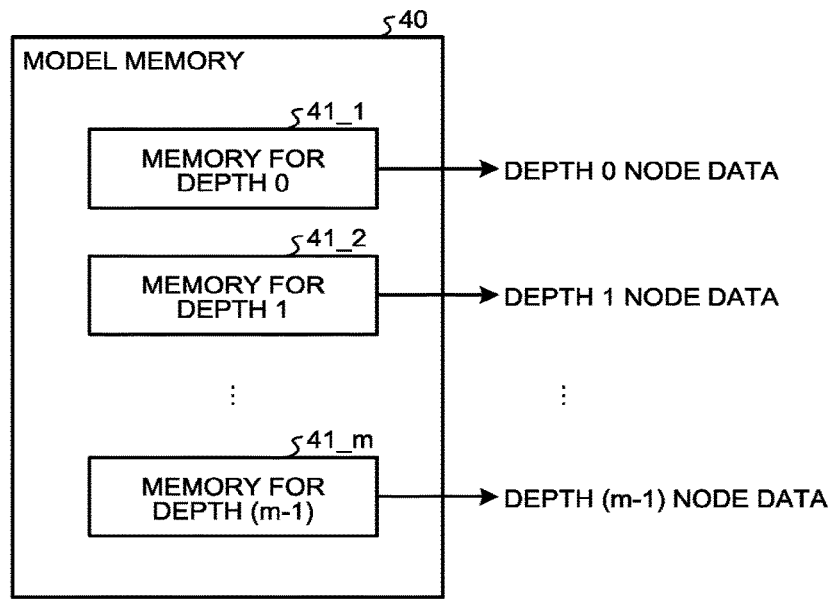
FIG. 14 is a diagram illustrating an example of a configuration of a model memory of a learning and discrimination device according to a modification of the first embodiment.

FIG. 14 is a diagram illustrating an example of a configuration of the model memory of the learning and discrimination device according to a modification. With reference to FIG. 14, the following describes a configuration in which the memory is provided for each depth (hierarchical level) of the decision tree in the model memory 40 of the learning and discrimination device 1 according to the present modification.

As illustrated in FIG. 14, the model memory 40 of the learning and discrimination device 1 according to the present modification includes a memory 41_1 for depth 0, memory 41_2 for depth 1, . . . , and a memory 41_m for depth (m−1) for storing the data (specifically, the branch condition data) for each depth (hierarchical level) of the model data of the learned decision tree. In this case, m is a number at least equal to or larger than a number of the depth (hierarchical level) of the model of the decision tree. That is, the model memory 40 includes an independent port for extracting data (depth 0 node data, depth 1 node data, . . . , depth (m−1) node data) at the same time for each depth (hierarchical level) of the model data of the learned decision tree. Due to this, the classification module 50 can read out the data (branch condition data) corresponding to the next node at all depths (hierarchical levels) in parallel based on a branch result at the first node of the decision tree, and can perform branch processing at the respective depths (hierarchical levels) at the same time in 1 clock (pipeline processing) on a piece of the sample data (discrimination data) without using a memory. Due to this, discrimination processing performed by the classification module 50 takes only time corresponding to the number of pieces of sample data, and speed of discrimination processing can be significantly improved. On the other hand, in the related art, the sample data is copied to a new memory region for each node, which affects the speed due to time for reading and writing performed by the memory, and the time required for discrimination processing is equal to (the number of pieces of sample data×the number of the depth (hierarchical level)), so that the discrimination processing according to the present modification has a great advantage as described above.

Figure 15:
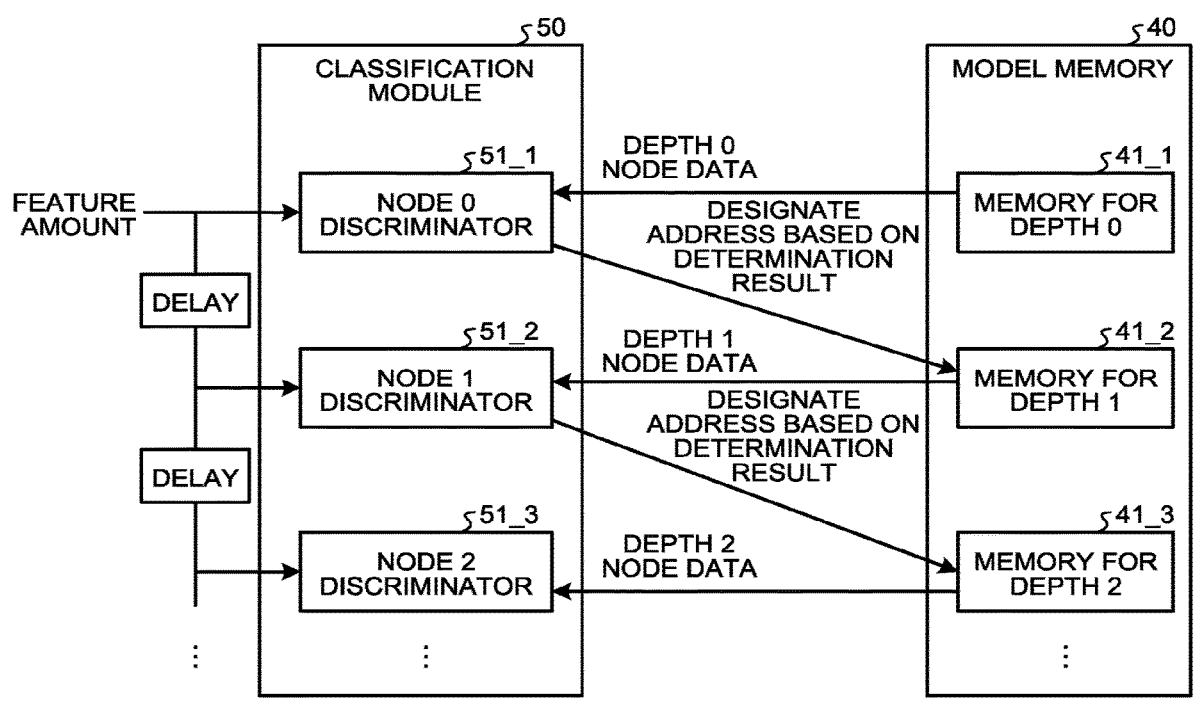
FIG. 15 is a diagram illustrating an example of a configuration of a classification module of the learning and discrimination device according to the modification of the first embodiment.

FIG. 15 is a diagram illustrating an example of a configuration of the classification module of the learning and discrimination device according to the modification. As illustrated in FIG. 15, the classification module 50 includes a node 0 discriminator 51_1, a node 1 discriminator 51_2, a node 2 discriminator 51_3, A piece of the sample data for each clock is supplied from the feature memory 32 as a feature amount. As illustrated in FIG. 15, the feature amount is input to the node 0 discriminator 51_1 first, and the node 0 discriminator 51_1 receives the data of the node (depth 0 node data) (a condition of whether to branch to the right or to the left, and the feature amount number to be used) from the corresponding memory 41_1 for depth 0 of the model memory 40. The node 0 discriminator 51_1 discriminates whether the corresponding sample data branches to the right or to the left in accordance with the condition. In this case, the latency of each memory for depth (the memory 41_1 for depth 0, the memory 41_2 for depth 1, a memory 41_3 for depth 2, . . . ) is assumed to be 1 clock. Based on the result obtained by the node 0 discriminator 51_1, whether the sample data branches to what number of node is designated by an address in the next memory 41_2 for depth 1, and the data of the corresponding node (depth 1 node data) is extracted and input to the node 1 discriminator 51_2.

The latency of the memory 41_1 for depth 0 is 1 clock, so that the feature amount is similarly input to the node 1 discriminator 51_2 with a delay of 1 clock. The feature amount of the next sample data is input to the node 0 discriminator 51_1 with the same clock. In this way, by performing discrimination through the pipeline processing, one decision tree as a whole can discriminate one piece of sample data with 1 clock on the precondition that the memories perform output at the same time for each depth. Only one address is required for the memory 41_1 for depth 0 because there is one node at depth 0, two addresses are required for the memory 41_2 for depth 1 because there are two nodes at depth 1, similarly, four addresses are required for the memory 41_3 for depth 2, and eight addresses are required for a memory for depth 3 (not illustrated). Although the classification module 50 discriminates the entire tree, learning may be performed using only the node 0 discriminator 51_1 at the time of learning the node to reduce a circuit scale by using the same circuit.

Second Embodiment

The following describes the learning and discrimination device according to a second embodiment, mainly about differences from the learning and discrimination device 1 according to the first embodiment. The first embodiment describes the learning processing and the discrimination processing by the GBDT assuming that there is one data memory 30 in which the sample data is stored. The present embodiment describes an operation of performing learning processing by dividing the data memory into a plurality of parts to implement Data Parallel for processing a plurality of pieces of sample data in parallel.

Regarding Data Parallel

Figure 16:
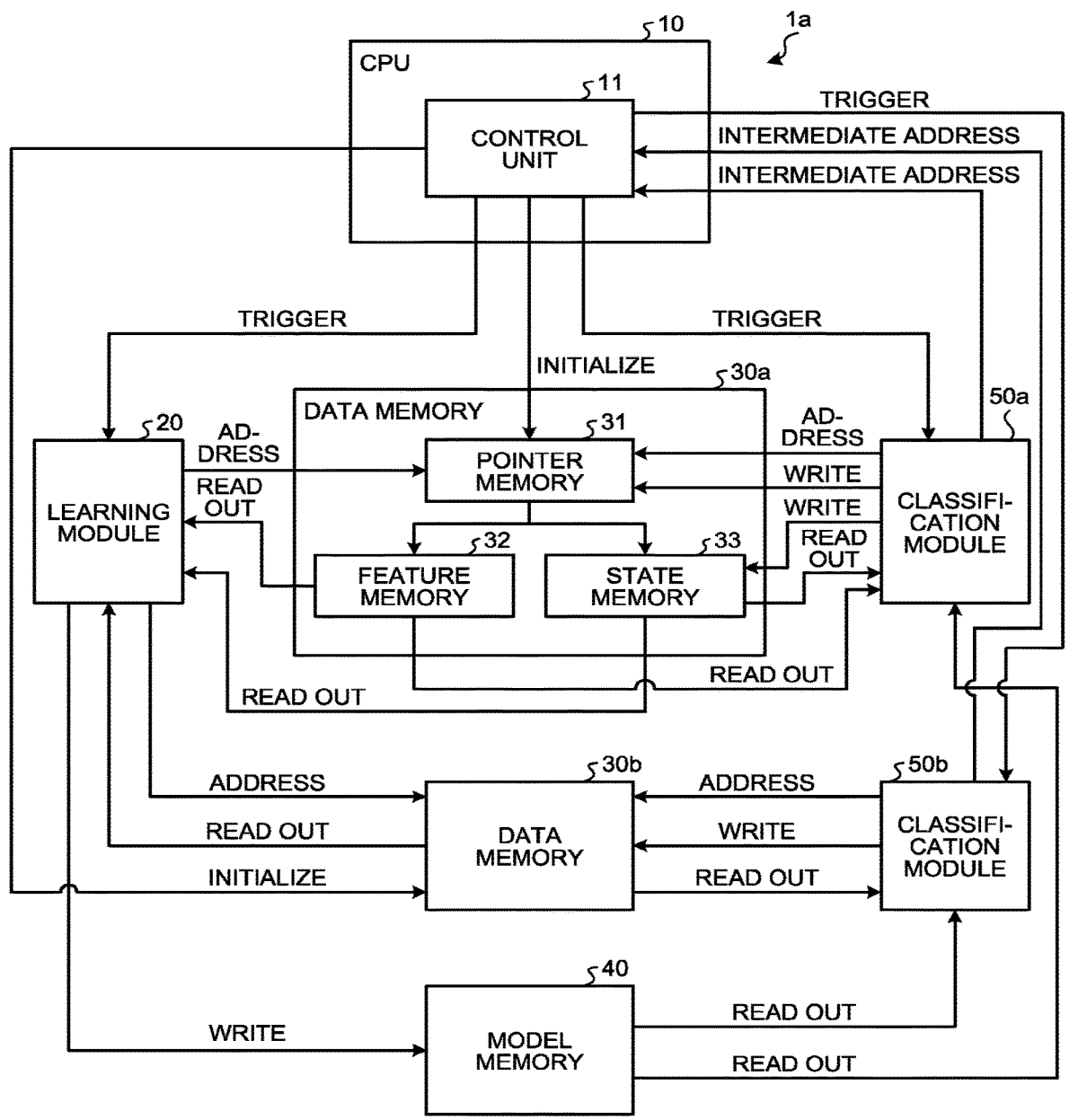
FIG. 16 is a diagram illustrating an example of a module configuration of the learning and discrimination device to which Data Parallel is applied.

FIG. 16 is a diagram illustrating an example of a module configuration of the learning and discrimination device to which Data Parallel is applied. With reference to FIG. 16, the following describes a configuration of a learning and discrimination device 1a as an example of a configuration for implementing Data Parallel.

To implement Data Parallel for the sample data (the learning data or the discrimination data), first, the data memory may be divided into two data memories 30a and 30b to hold divided pieces of sample data as illustrated in FIG. 16. Although not illustrated in the data memory 30b of FIG. 16, the data memory 30b also includes the pointer memory 31, the feature memory 32, and the state memory 33 similarly to the data memory 30a. However, it is not sufficient to simply dividing the memory that holds the sample data, and a mechanism for performing processing (learning processing, discrimination processing, and the like) on the divided pieces of sample data in parallel is required. In the configuration example illustrated in FIG. 16, the number of arranged modules that perform discrimination processing is the same as that of the divided data memories. That is, the learning and discrimination device 1a includes classification modules 50a and 50b for performing discrimination processing on respective pieces of sample data stored in the two data memories 30a and 30b in parallel. Focusing on each individual module, assuming that processing is performed by Feature Parallel, the configuration of the module is changed little for implementing Data Parallel as described above, so that implementation thereof is facilitated.

Data parallel for increasing speed of learning processing, that is, processing performed by the learning module 20 has a problem such that the circuit scale is increased because the data memory is divided into the two data memories 30a and 30b for holding divided pieces of sample data, and the memory that holds the histogram (hereinafter, also referred to as a "gradient histogram" in some cases) of the feature amount calculated in a process of the learning processing and the gradient information (refer to the expression (11)

described above) is increased in proportion to the number of division of the data memory as described above.

Method of Calculating Branch Score Using Gradient Histogram

First, the following describes a method of calculating the branch score by the learning module 20. In this case, the feature amount of the sample data (in this case, the learning data) is assumed to be quantized to have a certain bit width. For example, in a case in which the feature amount is 8 bits (values of 256 patterns) and the number of dimensions of the feature amount is 100, the learning module 20 calculates branch scores of 256×100=25600 patterns. In this case, the number of candidates of the threshold is 256.

To calculate the branch score corresponding to a certain branch condition (one threshold corresponding to one feature amount), it is required to obtain the sum of the gradient information of the learning data having the feature amount equal to or larger than the threshold (corresponding to $G_R$ and $H_R$ in the expression (19) described above), and the sum of the gradient information of the learning data having the feature amount smaller than the threshold (corresponding to $G_L$ and $H_L$ in the expression (19) described above) from the learning data at the present node. In this case, as represented by the following (Table 1), the following specifically describes a case in which the number of pieces of the learning data is 4, the number of dimensions of the feature amount is 1 and values thereof are 3 patterns, and the gradient information is the first-order gradient g.

TABLE 1

| Sample data number | Feature amount | g |
|---|---|---|
| 1 | 0 | 0.1 |
| 2 | 1 | 0.2 |
| 3 | 1 | 0.1 |
| 4 | 2 | −0.3 |

As represented by (Table 1), there are 3 patterns of feature amounts, that is, 0, 1, and 2, so that thresholds are also 0, 1, and 2, the sum of the gradient information at each threshold is a value represented by the following (Table 2), and the branch score corresponding to each of the thresholds of 3 patterns is calculated.

TABLE 2

| Threshold | $G_L$ | $G_R$ |
|---|---|---|
| 0 | 0 | 0.1 + 0.2 + 0.1 − 0.3 = 0.1 |
| 1 | 0.1 | 0.2 + 0.1 − 0.3 = 0 |
| 2 | 0.1 + 0.2 + 0.1 = 0.4 | −0.3 |

To obtain the sum of the gradient information for a specific threshold, it is required to refer to all pieces of the learning data at the present node. If this processing should be performed for all thresholds every time, it takes very long processing time. For example, in a case in which the feature amount is 8 bits (256 patterns), there are also 256 patterns of thresholds, so that the sum of the gradient information needs to be obtained (the number of pieces of learning data at the present node×256) times. It takes very long processing time, so that calculation processing of the branch score is simplified by obtaining the sum of the gradient information for each value of the feature amount (gradient histogram) and the sum total of the gradient information in advance, and taking a cumulative sum of the gradient histogram.

In a case of the sample data represented by (Table 1) described above, the sum of the gradient information for each value of the feature amount (gradient histogram) becomes a value represented by the following (Table 3).

TABLE 3

| Feature amount | Gradient histogram |
|---|---|
| 0 | 0.1 |
| 1 | 0.2 + 0.1 = 0.3 |
| 2 | −0.3 |

The sum total of the gradient information for each value of the feature amount is 0.1+0.2+0.1−0.3=0.1. In this case, the sum $G_L$ of the gradient information is obtained by obtaining the cumulative sum of the gradient histogram, $G_R$ of the gradient information is obtained by subtracting the sum $G_L$ of the gradient information from the sum total of the gradient information, and the sums $G_L$ and $G_R$ of the gradient information for each threshold becomes values represented by the following (Table 4).

TABLE 4

| Threshold | $G_L$ (Cumulative sum of gradient histogram) | $G_R$ (Sum total − $G_L$) |
|---|---|---|
| 0 | 0 | 0.1 |
| 1 | 0.1 | 0 |
| 2 | 0.1 + 0.3 = 0.4 | −0.3 |

With this method, it is sufficient to refer to the learning data at the present node per one time, and thereafter, the branch scores for all branch conditions can be obtained by referring to gradient histograms corresponding to the number of thresholds. In a case in which the feature amount is 8 bits (256 patterns), it is sufficient to perform processing (the number of pieces of learning data at the present node+ 256) times. The above case is a case in which the feature amount has one dimension, but even when the feature amount has two or more dimensions, the same processing can be calculated in parallel by obtaining the gradient histogram for each dimension of the feature amount. The following describes a configuration and an operation for calculating the gradient histogram and obtaining the branch condition data by the learning module 20 illustrated in FIG. 17 the configuration of which is illustrated in more detail based on FIG. 4 illustrating the configuration of the learning module 20 that performs learning by Feature Parallel in the first embodiment, and further describes a configuration and an operation in a case of using a Data Parallel configuration.

Figure 17:
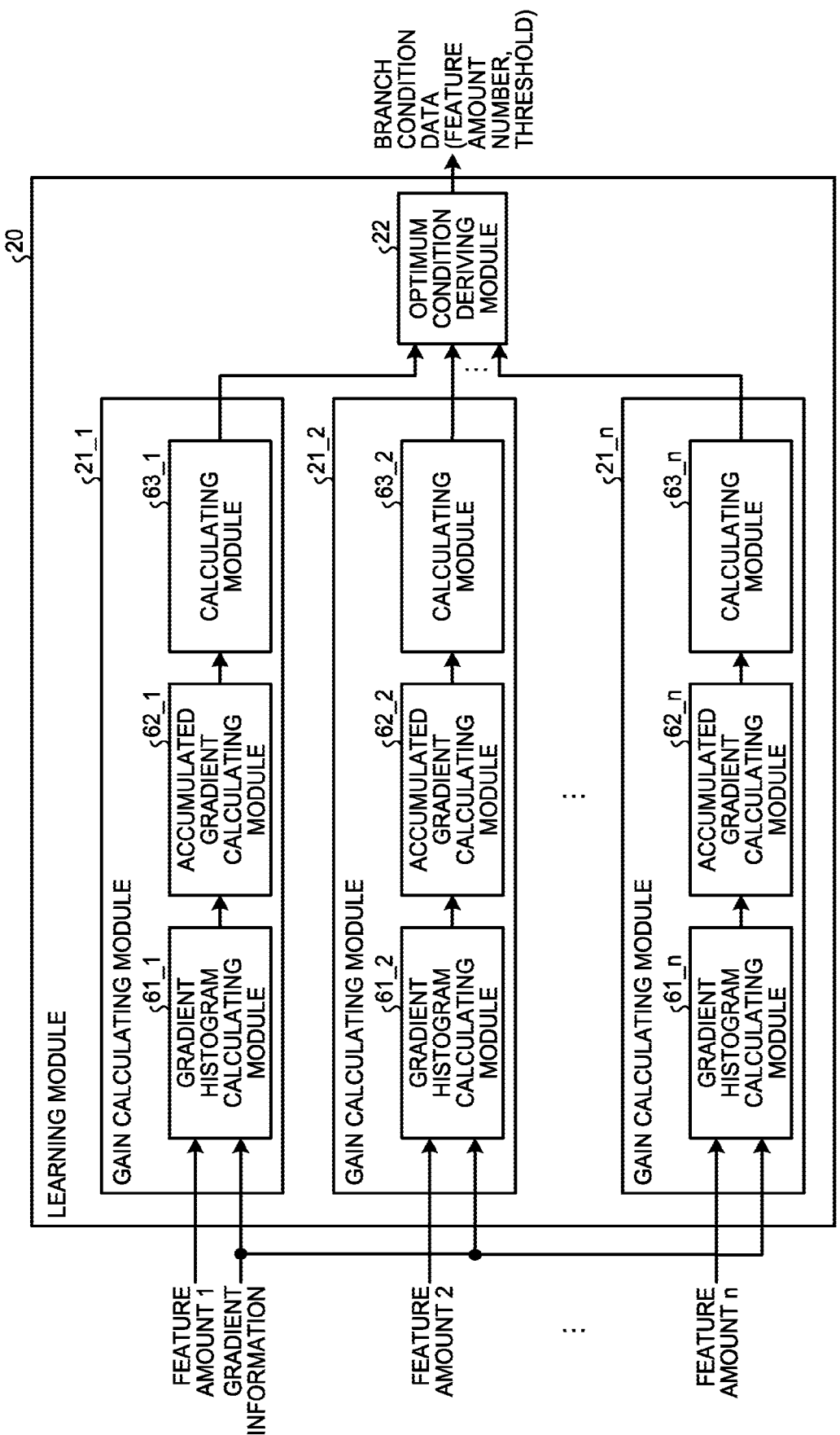
FIG. 17 is a diagram illustrating an example of a specific module configuration of a learning module.

Configuration Example of Learning Module for Obtaining Branch Condition Data Using Gradient Histogram FIG. 17 is a diagram illustrating an example of a specific module configuration of the learning module. With reference to FIG. 17, the following describes a configuration and an operation of the learning module 20 representing the configuration illustrated in FIG. 4 described above in more detail.

The learning module 20 illustrated in FIG. 17 includes the gain calculating modules 21_1, 21_2, . . . , and 21_n, and the optimum condition deriving module 22. In this case, n is a number at least equal to or larger than the number of types of the feature amounts of the sample data (in this case, the learning data). In a case of indicating an optional gain calculating module among the gain calculating modules 21_1, 21_2, . . . , and 21_n, or a case in which the gain calculating modules 21_1, 21_2, . . . , and 21_n are collectively called, they are simply referred to as the "gain calculating module 21".

Each of the gain calculating modules 21_1 to 21_1n is a module that calculates the branch score at each threshold using the expression (19) described above for a corresponding feature amount among the feature amounts included in the sample data to be input. The gain calculating module 21_1 includes a gradient histogram calculating module 61_1, an accumulated gradient calculating module 62_1, and a calculating module 63_1.

The gradient histogram calculating module 61_1 is a module that calculates, using each value of the feature amount of the input sample data as a bin of the histogram, the gradient histogram by integrating values of the gradient information corresponding to the sample data.

The accumulated gradient calculating module 62_1 is a module that calculates the sums of the gradient information ($G_L$, $G_R$, $H_L$, $H_R$) by obtaining the cumulative sum of the gradient histogram for each threshold of the feature amount.

The calculating module 63_1 is a module that calculates the branch score at each threshold using the expression (19) described above and using the sum of the gradient information calculated by the accumulated gradient calculating module 62_1.

Similarly, the gain calculating module 21_2 includes a gradient histogram calculating module 61_2, an accumulated gradient calculating module 62_2, and a calculating module 63_2, and the same applies to the gain calculating module 21_n. In a case of indicating an optional gradient histogram calculating module among the gradient histogram calculating modules 61_1, 61_2, . . . , and 61_n, or a case in which the gradient histogram calculating modules 61_1, 61_2, . . . , and 61_n are collectively called, they are simply referred to as a "gradient histogram calculating module 61". In a case of indicating an optional accumulated gradient calculating module among the accumulated gradient calculating modules 62_1, 62_2, and 62_n, or a case in which the accumulated gradient calculating modules 62_1, 62_2, . . . , and 62_n are collectively called, they are simply referred to as an "accumulated gradient calculating module 62". In a case of indicating an optional calculating module among the calculating modules 63_1, 63_2, . . . , and 63_n, or a case in which the calculating modules 63_1, 63_2, . . . , and 63_n are collectively called, they are simply referred to as a "calculating module 63".

The optimum condition deriving module 22 is a module that receives an input of the branch score corresponding to each threshold and each feature amount output from the respective gain calculating modules 21, and derives a threshold and a number of the feature amount (feature amount number) the branch score of which is the largest. The optimum condition deriving module 22 writes the derived feature amount number and threshold into the model memory 40 as the branch condition data (an example of data of the node) of a corresponding node.

Configuration and Operation of Gradient Histogram Calculating Module

Figure 18:
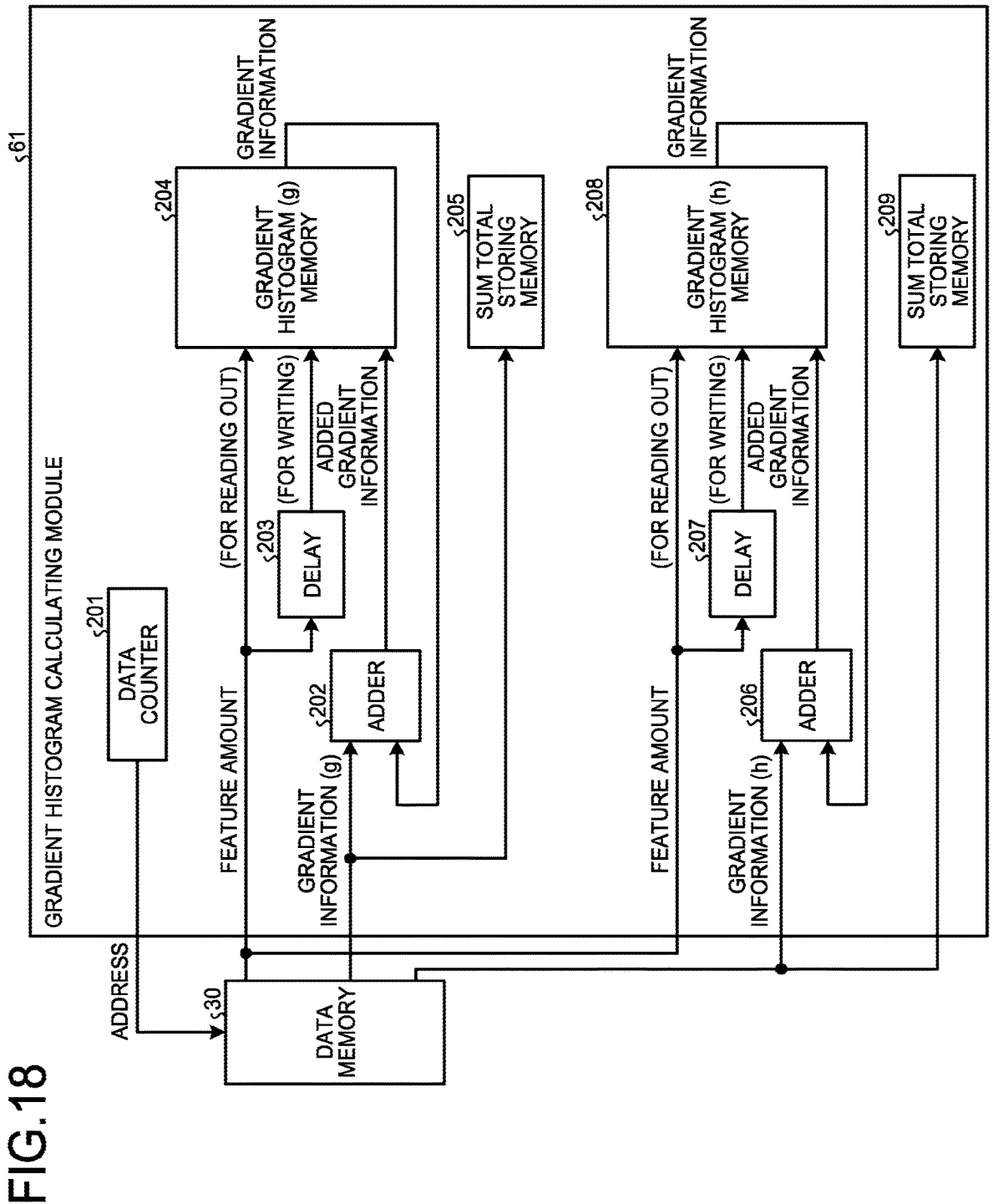
FIG. 18 is a diagram illustrating an example of a module configuration of a gradient histogram calculating module of the learning module.

FIG. 18 is a diagram illustrating an example of a module configuration of the gradient histogram calculating module of the learning module. With reference to FIG. 18, the following describes a configuration and an operation of the gradient histogram calculating module 61 in the learning module 20. FIG. 18 illustrates a case in which the feature amount is assumed to have one dimension, and the gradient information is assumed to include the first-order gradient g and the second-order gradient h, which may be simply referred to as gradient information g and gradient information h in some cases.

As illustrated in FIG. 18, the gradient histogram calculating module 61 includes a data counter 201, an adder 202, a delay 203, a gradient histogram memory 204, a sum total storing memory 205, an adder 206, a delay 207, a gradient histogram memory 208, and a sum total storing memory 209.

The data counter 201 outputs an address for reading out, from the data memory 30, the sample data (feature amount) to be subjected to learning processing and corresponding pieces of gradient information g and h.

The adder 202 adds added gradient information g read out from the gradient histogram memory 204 to the gradient information g that is newly read out from the data memory 30.

The delay 203 outputs the feature amount read out from the data memory 30 with delay to be matched with a timing of writing the gradient information g added by the adder 202 into the gradient histogram memory 204.

The gradient histogram memory 204 is a memory that successively stores the added gradient information g using the value of the feature amount as an address, and stores the gradient histogram for each value (bin) of the feature amount in the end.

The sum total storing memory 205 is a memory that stores the sum total of the gradient information g read out from the data memory 30.

The adder 206 adds the added gradient information h read out from the gradient histogram memory 208 to the gradient information h that is newly read out from the data memory 30.

The delay 207 outputs the feature amount read out from the data memory 30 with delay to be matched with a timing of writing the gradient information h added by the adder 206 into the gradient histogram memory 208.

The gradient histogram memory 208 is a memory that successively stores the added gradient information h using the value of the feature amount as an address, and stores the gradient histogram for each value (bin) of the feature amount in the end.

The sum total storing memory 209 is a memory that stores the sum total of the gradient information h read out from the data memory 30.

The following simply describes an operation procedure of calculating the gradient histogram of the gradient histogram calculating module 61. First, the gradient histogram calculating module 61 reads out a piece of learning data (the feature amount, the gradient information) of the present node stored in the data memory 30 using an address output from the data counter 201. The adder 202 reads out the gradient information g (added gradient information g) from the gradient histogram memory 204 using the feature amount read out from the data memory 30 as an address. The adder 202 then adds the gradient information g (added gradient information g) read out from the gradient histogram memory 204 to the gradient information g read out from the data memory 30, and writes (updates) the added gradient information g into the gradient histogram memory 204 using the feature amount read out from the data memory 30 as an address. The sum total storing memory 205 adds up pieces of the gradient information g each time the gradient information g is read out from the data memory 30, and stores the sum total of the gradient information g. The same applies to processing on the gradient information h performed by the adder 206, the delay 207, the gradient histogram memory 208, and the sum total storing memory 209. The above operation is repeatedly performed on all the pieces of learning data at the present node.

Configuration and Operation of Accumulated Gradient Calculating Module

Figure 19:
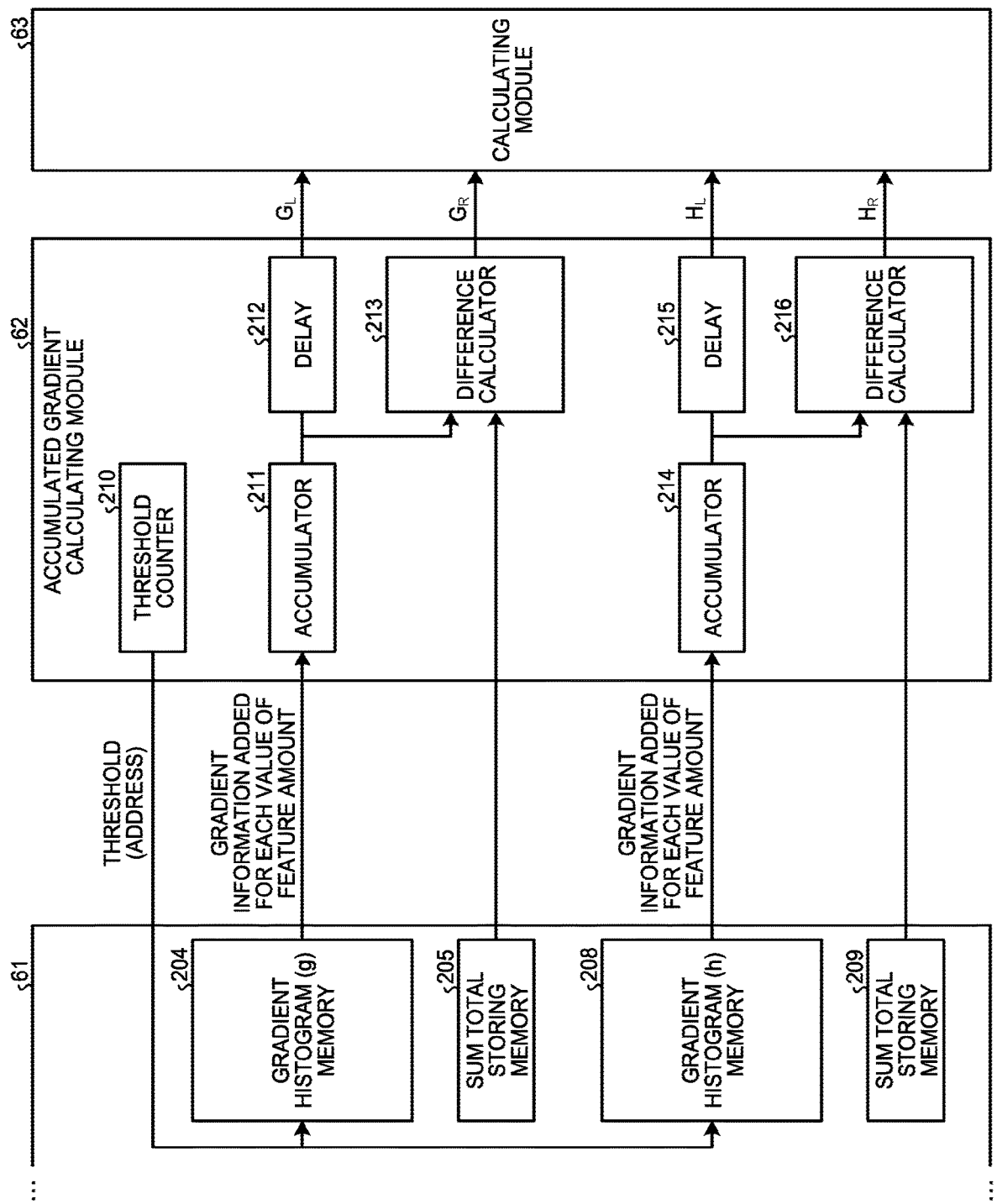
FIG. 19 is a diagram illustrating an example of a module configuration of an accumulated gradient calculating module of the learning module.

FIG. 19 is a diagram illustrating an example of a module configuration of the accumulated gradient calculating module of the learning module. With reference to FIG. 19, the following describes a configuration and an operation of the accumulated gradient calculating module 62 in the learning module 20. FIG. 19 illustrates a case in which the feature amount is assumed to have one dimension, and the gradient information is assumed to include the first-order gradient g and the second-order gradient h.

As illustrated in FIG. 19, the accumulated gradient calculating module 62 includes a threshold counter 210, an accumulator 211 (an example of an accumulative memory unit), a delay 212 (an example of a third output unit), a difference calculator 213 (an example of a fourth output unit), an accumulator 214 (an example of an accumulative memory unit), a delay 215 (an example of a third output unit), and a difference calculator 216 (an example of a fourth output unit).

The threshold counter 210 outputs a threshold to be an address for reading out, from the gradient histogram memories 204 and 208, the gradient information (g, h) added for each value of the feature amount, that is, the gradient histogram of each value of the feature amount.

The accumulator 211 reads out, from the gradient histogram memory 204, the gradient histogram of the gradient information g corresponding to the threshold (address) output from the threshold counter 210, further accumulates the gradient histogram on the cumulative sum of the gradient histogram that is presently stored, and hold it as a new cumulative sum of the gradient histogram.

The delay 212 outputs, as the sum $G_L$ of the gradient information g, the cumulative sum of the gradient histogram of the gradient information g read out from the accumulator 211 with delay to be matched with a timing at which the sum $G_R$ of the gradient information g is output from the difference calculator 213.

The difference calculator 213 calculates the sum $G_R$ of the gradient information g by subtracting, from the sum total of the gradient information g read out from the sum total storing memory 205, the cumulative sum of the gradient histogram of the gradient information g (that is, the sum $G_L$ of the gradient information g) read out from the accumulator 211.

The accumulator 214 reads out, from the gradient histogram memory 208, the gradient histogram of the gradient information h corresponding to the threshold (address) output from the threshold counter 210, further accumulates the gradient histogram on the cumulative sum of gradient histogram that is presently stored, and hold it as a new cumulative sum of the gradient histogram.

The delay 215 outputs, as the sum $H_L$ of the gradient information h, the cumulative sum of the gradient histogram of the gradient information h read out from the accumulator 214 with delay to be matched with a timing at which the sum $H_R$ of the gradient information h is output from the difference calculator 216.

The difference calculator 216 calculates the sum $H_R$ of the gradient information h by subtracting, from the sum total of the gradient information h read out from the sum total storing memory 209, the cumulative sum of the gradient histogram of the gradient information h (that is, the sum $H_L$ of the gradient information h) read out from the accumulator 214.

The following simply describes an operation procedure of calculating the sums ($G_L$, $G_R$, $H_L$, $H_R$) of the gradient information performed by the accumulated gradient calculating module 62. The accumulated gradient calculating module 62 starts calculation processing after the gradient histogram calculating module 61 ends an operation of calculation and storage processing for the gradient histogram of the gradient information. That is, after the gradient histogram calculating module 61 ends the calculation processing, each of the gradient histogram memories 204 and 208 holds the gradient histograms of the pieces of gradient information g and h calculated from all the pieces of learning data at the present node.

First, the accumulated gradient calculating module 62 reads out the gradient histogram of the gradient information g stored in the gradient histogram memory 204 using the threshold as an address output from the threshold counter 210. The accumulator 211 reads out, from the gradient histogram memory 204, the gradient histogram of the gradient information g corresponding to the threshold output from the threshold counter 210, accumulates the gradient histogram on the cumulative sum of the gradient histogram that is presently stored, and hold it as a new cumulative sum of the gradient histogram. The difference calculator 213 calculates the sum $G_R$ of the gradient information g by subtracting, from the sum total of the gradient information g read out from the sum total storing memory 205, the cumulative sum of the gradient histogram of the gradient information g (that is, the sum $G_L$ of the gradient information g) read out from the accumulator 211, and outputs the sum $G_R$ to the calculating module 63. The delay 212 outputs, to the calculating module 63, the cumulative sum of the gradient histogram of the gradient information g (that is, the sum $G_L$ of the gradient information g) read out from the accumulator 211 at a timing of output by the difference calculator 213. The same applies to processing on the gradient information h (processing of calculating the sums $H_L$ and $H_R$ of the gradient information h) performed by the accumulator 214, the delay 215, and the difference calculator 216. The above operation is repeatedly performed on all of the thresholds, and this is implemented when the threshold counter 210 sequentially counts up the thresholds to be output in a round.

Figure 20:
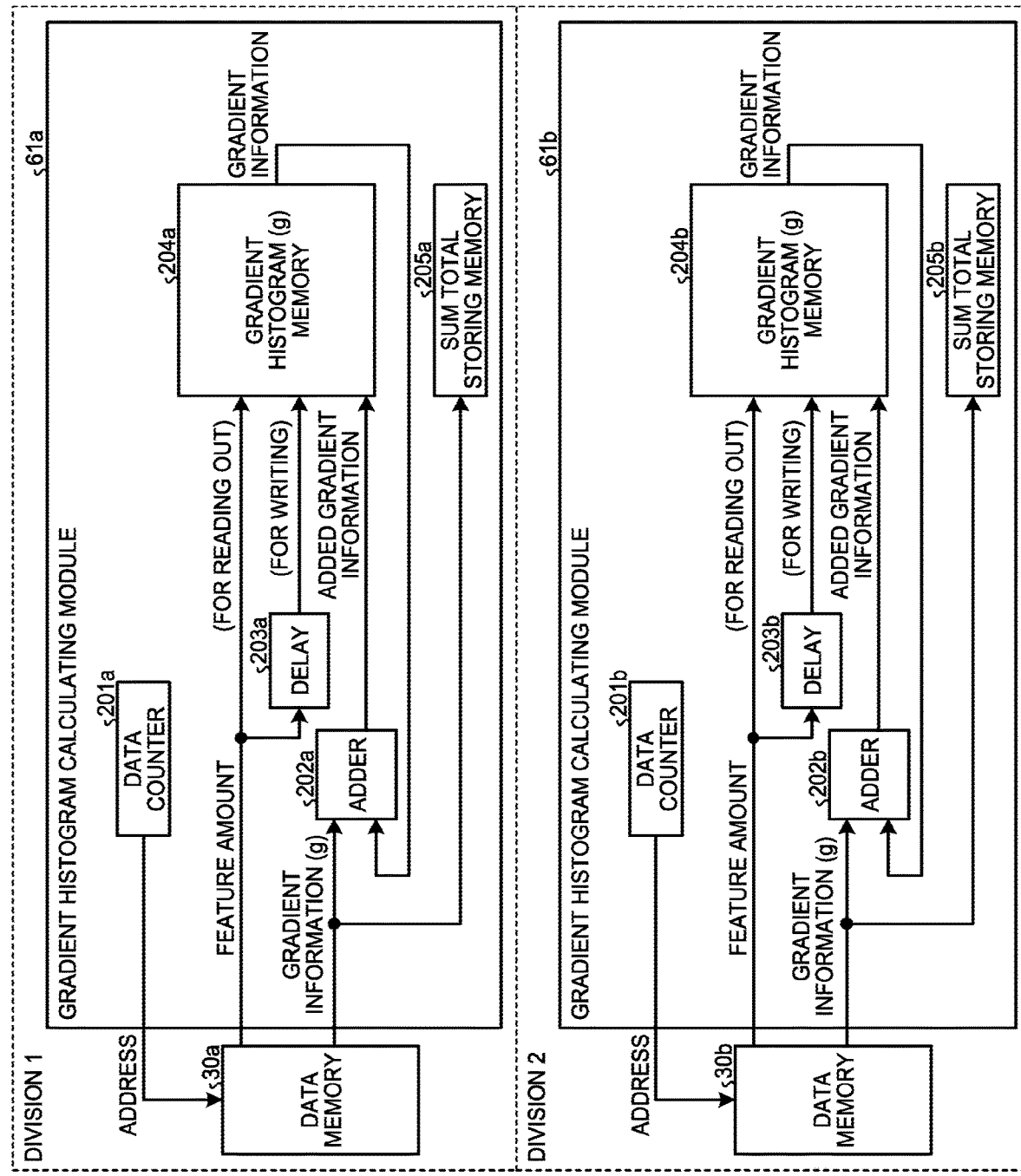
FIG. 20 is a diagram illustrating an example of a module configuration of the gradient histogram calculating module in a case in which Data Parallel is implemented.

Gradient Histogram Calculating Module in Case in which Data Parallel is Implemented FIG. 20 is a diagram illustrating an example of a module configuration of the gradient histogram calculating module in a case in which Data Parallel is implemented. With reference to FIG. 20, the following describes a configuration and an operation of the gradient histogram calculating module 61 in a case in which Data Parallel is implemented. FIG. 20 illustrates a case in which the number of division for Data Parallel is assumed to be 2, the feature amount is assumed to have one dimension, and the gradient information is assumed to include only the first-order gradient g.

As illustrated in FIG. 20, to implement Data Parallel the number of division of which is 2, the data memories 30a and 30b as divided memories are configured in place of the data memory 30 illustrated in FIG. 18, and gradient histogram calculating modules 61a and 61b are configured in place of the gradient histogram calculating module 61.

As illustrated in FIG. 20, the gradient histogram calculating module 61a includes a data counter 201a, an adder 202a, a delay 203a, a gradient histogram memory 204a, and a sum total storing memory 205a. The gradient histogram calculating module 61b includes a data counter 201b, an adder 202b, a delay 203b, a gradient histogram memory 204b, and a sum total storing memory 205b. Functions of the data counters 201a and 201b, the adders 202a and 202b, the delays 203a and 203b, the gradient histogram memories 204a and 204b, and the sum total storing memories 205a and 205b are the same as the respective functions described above with reference to FIG. 18.

In a case of simply configuring Data Parallel, as illustrated in FIG. 20, the number of the gradient histogram calculating modules 61 to be arranged may be the same as the number of division similarly to the data memories 30. In this case, the number of the gradient histogram memories is equal to (the dimensions of the feature amount×the number of division). In the example illustrated in FIG. 20, the feature amount has one dimension and the number of division is 2, so that the two gradient histogram memories 204a and 204b are arranged. Additionally, in a case of considering the respective gradient histogram memories for the first-order gradient g and the second-order gradient h as the gradient information, required total capacity of the gradient histogram memory is equal to (capacity of one memory (the number of bins×bit width)×2 (the first-order gradient g, the second-order gradient h)×the dimensions of the feature amount×the number of division). In a large-scale data set, the number of dimensions of the feature amount may be several hundreds to several thousands in many cases, and a large number of memories are required when the number of division is increased. Accordingly, the capacity of the memories becomes a bottleneck, and a circuit scale is increased. For example, in a case in which the feature amount is 8 bits (256 patterns) and has 2000 dimensions, the gradient information includes two gradients, that is, the first-order gradient g and the second-order gradient h, and the bit width of the gradient histogram is 12 bits, 12 [bits]×256=3072 [bits] is established, so that the memory capacity of one gradient histogram memory is required to satisfy 3072 bit. The memory is typically prepared based on a power of 2, so that, in this case, the memory capacity is 4096 bits (4 kbits). Thus, in a case of one division (no division), the total capacity of the gradient histogram memory is represented as follows.

4 [kbits]×2 (the first-order gradient $g$, the second-order gradient $h$)×2000 [dimensions]=16 [Mbits]

That is, the memory capacity of 16 Mbits is required per one division (no division), and in a case of dividing the memory, the memory capacity of (the number of division× 16 Mbits) is required.

For example, the following considers a case of a chip called virtex UltrScale+ VU9P manufactured by Xilinx Inc. as a high-end FPGA. Circuits that can be used for the gradient histogram memory include a distributed RAM and a block RAM. In VU9P, the distributed RAM is 36.1 Mbits at the maximum, and the block RAM is 75.9 Mbits at the maximum. Thus, two-division is a limit in a case of using the distributed RAM as the gradient histogram memory, and four-division is a limit in a case of using the block RAM. The distributed RAM and the block RAM need to be used for purposes other than a purpose of holding the gradient histogram, so that an upper limit of the number of division is smaller than the number described above. Accordingly, in a case in which the set of the feature amount and the gradient information is input in parallel, a configuration that can calculate and store the gradient histogram with a smaller-scale circuit is required as compared with the configuration of the learning module 20 described above with reference to FIG. 17 to FIG. 20. The following describes a configuration and an operation of the learning module according to the present embodiment with reference to FIG. 21 to FIG. 26.

Configuration of Learning Module According to Second Embodiment

Figure 21:
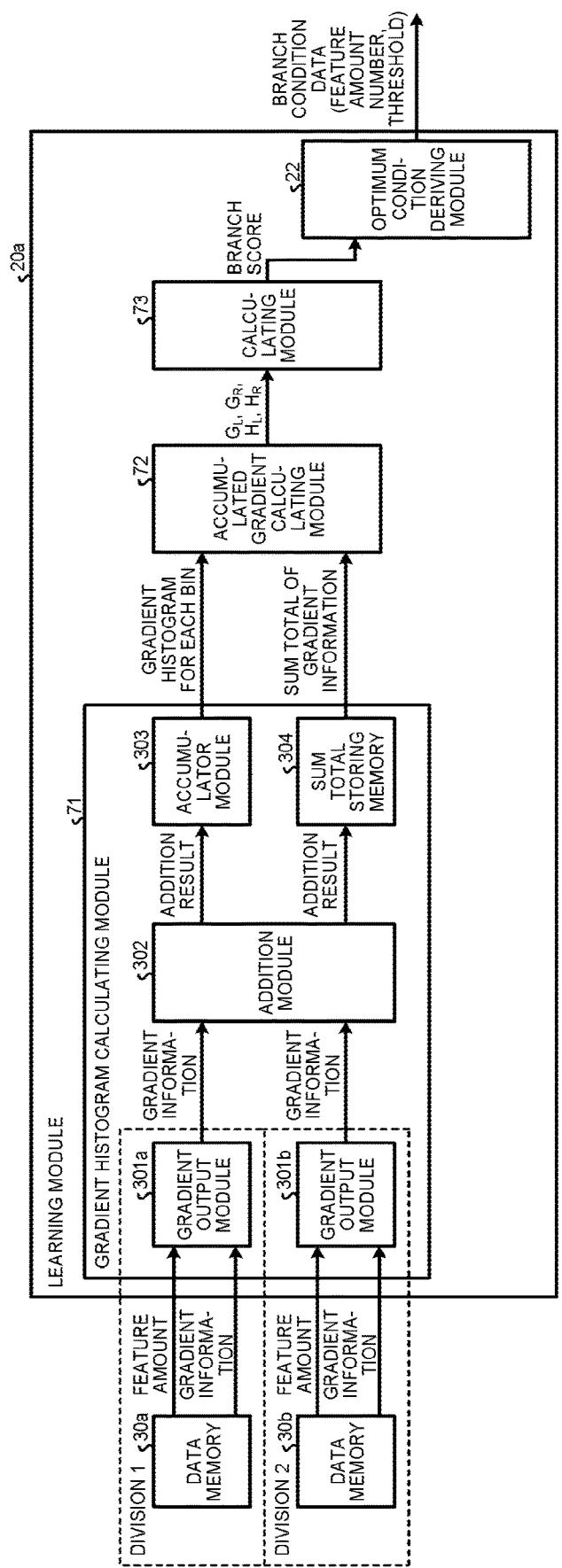
FIG. 21 is a diagram illustrating an example of a module configuration of a learning module of a learning and discrimination device according to a second embodiment.

FIG. 21 is a diagram illustrating an example of a module configuration of the learning module of the learning and discrimination device according to the second embodiment. With reference to FIG. 21, the following describes a configuration and an operation of a learning module 20a of the learning and discrimination device (an example of a learning device) according to the present embodiment. In FIG. 21, the number of division for Data Parallel is assumed to be 2, and the feature amount is assumed to have one dimension.

As illustrated in FIG. 21, the learning module 20a according to the present embodiment includes a gradient histogram calculating module 71, an accumulated gradient calculating module 72, a calculating module 73, and the optimum condition deriving module 22.

The gradient histogram calculating module 71 is a module that calculates, using each value of the feature amount of the input sample data as a bin of the histogram, the gradient histogram by integrating values of the gradient information corresponding to the sample data. The gradient histogram calculating module 71 includes gradient output modules 301a and 301b, an addition module 302, an accumulator module 303, and a sum total storing memory 304.

Each of the gradient output modules 301a and 301b is a module that includes an output port corresponding to each value of the feature amount, receives an input of the feature amount and the gradient information from the data memories 30a and 30b, and outputs the gradient information through the output port corresponding to a value of the input feature amount.

The addition module 302 is a module that adds up corresponding pieces of gradient information to be output for each value (bin) of the feature amount.

The accumulator module 303 is a module that adds the added gradient information input from the addition module 302 to the added gradient information that is presently held for each value (bin) of the feature amount, and holds the gradient histogram of the gradient information for each bin in the end.

The sum total storing memory 304 is a memory that stores the sum total of the gradient information calculated by the addition module 302.

The accumulated gradient calculating module 72 is a module that calculates the sums ($G_L$, $G_R$, $H_L$, $H_R$) of the gradient information by obtaining the cumulative sum of the gradient histogram for each threshold of the feature amount.

The calculating module 73 is a module that calculates the branch score at each threshold using the expression (19) described above and using the sum of the gradient information calculated by the accumulated gradient calculating module 72.

The optimum condition deriving module 22 is a module that receives an input of the branch score corresponding to each feature amount (in FIG. 21, one feature amount) and each threshold output from the calculating module 73, and derives a threshold and a number of the feature amount (feature amount number) the branch score of which is the largest. The optimum condition deriving module 22 writes the derived feature amount number and threshold into the model memory 40 as branch condition data of a corresponding node (an example of data of the node).

As illustrated in FIG. 21, to implement Data Parallel in a case in which the number of division is 2, the memory is divided into two memories, that is, the data memories 30a and 30b, and the gradient histogram calculating module 71 is divided into two modules, that is, the gradient output modules 301a and 301b at a preceding stage. In FIG. 21, a physical division unit is represented as "division 1" and "division 2".

Configuration and Operation of Gradient Histogram Calculating Module

Figure 22:
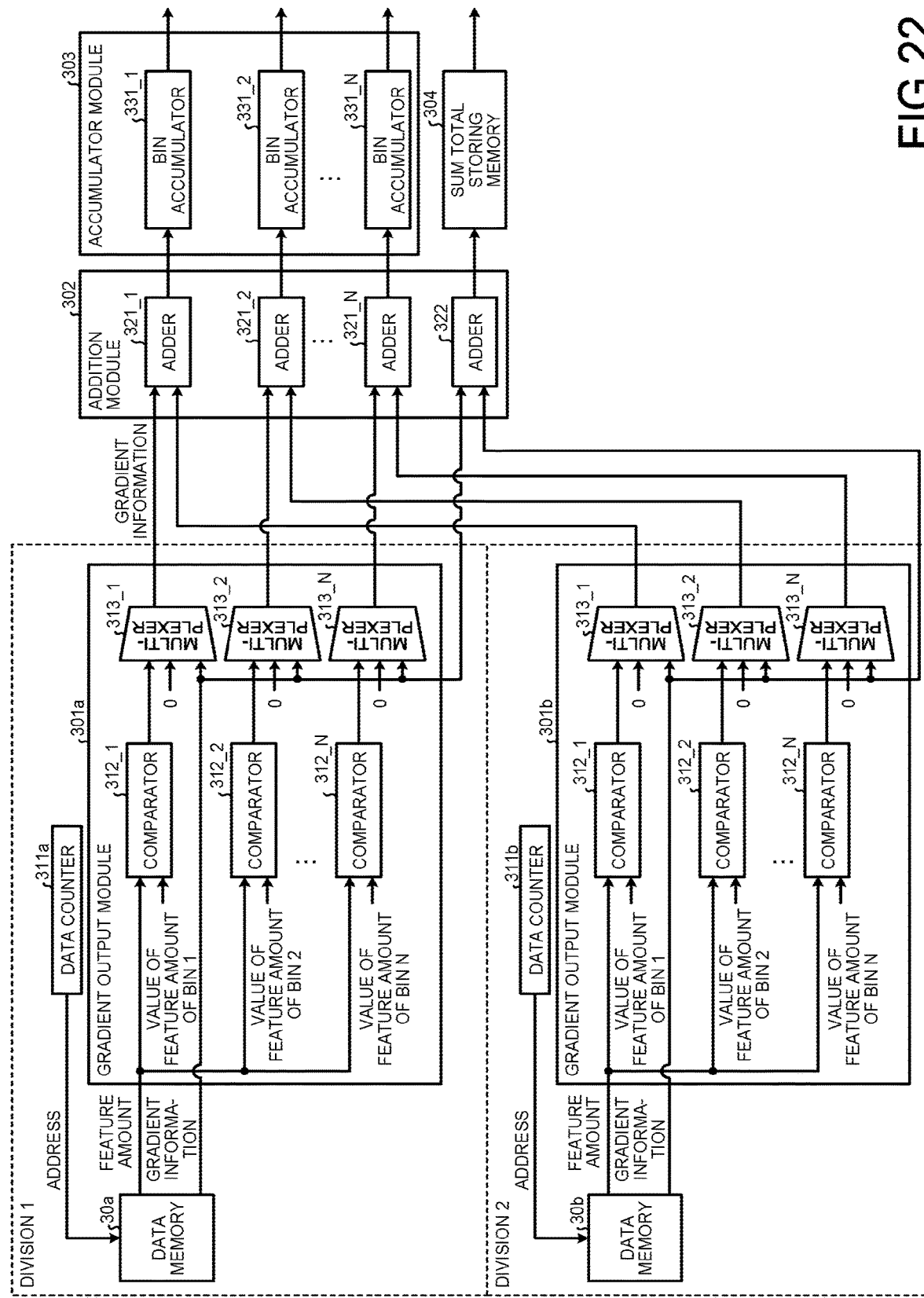
FIG. 22 is a diagram illustrating an example of a module configuration of a gradient histogram calculating module of the learning module according to the second embodiment.

FIG. 22 is a diagram illustrating an example of a module configuration of the gradient histogram calculating module of the learning module according to the second embodiment. With reference to FIG. 22, the following describes a configuration and an operation of the gradient histogram calculating module 71 in the learning module 20a according to the present embodiment. FIG. 22 illustrates a case in which the number of division for Data Parallel is assumed to be 2, the feature amount is assumed to have one dimension, and the gradient information is assumed to include only one piece of information (for example, the first-order gradient g).

As illustrated in FIG. 22, the gradient histogram calculating module 71 includes data counters 311a and 311b in addition to the configuration described above with reference to FIG. 21.

The data counter 311a outputs an address for reading out the sample data (feature amount) to be subjected to learning processing and corresponding gradient information from the data memory 30a.

As illustrated in FIG. 22, the gradient output module 301a includes comparators 312_1, 312_2, . . . , and 312_N (determining units) and multiplexers 313_1, 313_2, . . . , and 313_N. In this case, N is a number of a value that may be taken by the feature amount, and is the number of bins in the gradient histogram. In a case of indicating an optional comparator among the comparators 312_1, 312_2, . . . , and 312_N, or a case in which the comparators 312_1, 312_2, . . . , and 312_N are collectively called, they are simply referred to as a "comparator 312". In a case of indicating an optional multiplexer among the multiplexers 313_1, 313_2, . . . , and 313_N, or a case in which the multiplexers 313_1, 313_2, . . . , and 313_N are collectively called, they are simply referred to as a "multiplexer 313" (selector).

The comparator 312 receives an input of values of the feature amount read out from the data memory 30a and the feature amount of a specific bin, and compares the values with each other. If the values are identical to each other, the comparator 312 outputs the fact that the values are identical to each other (for example, an ON output of a voltage level) to the multiplexer 313. For example, in a case in which the feature amount read out from the data memory 30a is identical to the value of the feature amount of a bin 1, the comparator 312_1 outputs the fact that the values are identical to each other to the multiplexer 313_1.

The multiplexer 313 receives an input of 0 and the gradient information corresponding to the feature amount (learning data) that is read out from the data memory 30a by the comparator 312, and outputs the input gradient information or 0 in accordance with a comparison result output from the comparator 312. For example, the multiplexer 313_1 receives an input of 0 and the gradient information corresponding to the feature amount that is read out from the data memory 30a by the comparator 312_1, outputs the input gradient information as the gradient information corresponding to the bin 1 in a case in which the comparison result output from the comparator 312_1 indicates that the values are identical to each other, and outputs 0 in a case in which the comparison result indicates that the values are not identical to each other. That is, in this mechanism, the gradient information corresponding to the feature amount is output from the multiplexer 313 corresponding to the value of the feature amount read out from the data memory 30a, and 0 is output from the other multiplexer 313.

Functions of the data memory 30b, the data counter 311b, and the gradient output module 301b are the same as those of the data memory 30a, the data counter 311a, and the gradient output module 301a described above, respectively.

The addition module 302 adds up the gradient information input from the multiplexer 313 for each value of the feature amount, that is, for each bin, and outputs the added gradient information to the accumulator module 303. The addition module 302 includes adders 321_1, 321_2, . . . , and 321_N, and an adder 322.

Each of the adders 321_1, 321_2, . . . , and 321_N adds up the gradient information input from the multiplexer 313 for each of bins 1, 2, . . . , and N, and outputs the added gradient information to the accumulator module 303. For example, the adder 321_1 adds the gradient information as an output from the multiplexer 313_1 corresponding to the bin 1 in the gradient output module 301a to the gradient information as an output from the multiplexer 313_1 corresponding to the bin 1 in the gradient output module 301b, and outputs the added gradient information to the accumulator module 303 (in this case, a bin 1 accumulator 331_1 described later).

The adder 322 receives an input of the pieces of gradient information to be added up, the pieces of gradient information read out from the data memories 30a and 30b by the gradient output module 301a and the gradient output module 301b, respectively. The adder 322 then outputs the added gradient information to the sum total storing memory 304.

The accumulator module 303 adds the added gradient information input from the addition module 302 to the added gradient information that is presently held for each value (bin) of the feature amount, and holds the gradient histogram of the gradient information for each bin in the end. The accumulator module 303 includes the bin 1 accumulator 331_1, a bin 2 accumulator 331_2, . . . , and a bin N accumulator 331_N.

The bin 1 accumulator 331_1, the bin 2 accumulator 331_2, . . . , and the bin N accumulator 331_N adds the added gradient information input from the respective adders 321_1, 321_2, . . . , and 321_N to the added gradient information that is presently held for each of the bins 1, 2, . . . , and N. For example, the bin 1 accumulator 331_1 adds the added gradient information input from the adder 321_1 to the added gradient information that is presently held, and holds the gradient histogram of the gradient information of the bin 1.

The sum total storing memory 304 adds the added gradient information output from the adder 322 to the added gradient information that is presently held. That is, the sum total storing memory 304 stores the sum total of the gradient information corresponding to all the pieces of learning data.

The following simply describes an operation procedure of calculating the gradient histogram performed by the gradient histogram calculating module 71 according to the present embodiment. The data counter 311a (311b) outputs an address for reading out the sample data (feature amount) to be subjected to learning processing and corresponding gradient information from the data memory 30a. The comparator 312 of the gradient output module 301a (301b) receives an input of values of the feature amount read out from the data memory 30a (30b) and the feature amount of a specific bin, and compares the values with each other. If the values are identical to each other, the comparator 312 outputs the fact that the values are identical to each other to the multiplexer 313. The multiplexer 313 receives an input of 0 and the gradient information corresponding to the feature amount (learning data) that is read out from the data memory 30a (30b) by the comparator 312, and outputs 0 or the input gradient information in accordance with a comparison result output from the comparator 312. The respective adders 321_1, 321_2, . . . , and 321_N of the addition module 302 add up the gradient information input from the multiplexer 313 for each of the bins 1, 2, . . . , and N, and output the added gradient information to the accumulator module 303. The bin 1 accumulator 331_1, the bin 2 accumulator 331_2, . . . , and the bin N accumulator 331_N of the accumulator module 303 add the added gradient information input from the respective adders 321_1, 321_2, . . . , and 321_N to the added gradient information that is presently held for each of the bins 1, 2, . . . , and N, and holds the gradient histogram of the gradient information for each bin in the end. The above operation is repeatedly performed on all the pieces of learning data at the present node.

In the configuration of the gradient histogram calculating module 71 according to the present embodiment as described above, the gradient histogram is stored in a corresponding register (accumulator) for each bin of the feature amount instead of being stored in the memory as in the conventional configuration illustrated in FIG. 20. The configuration of the gradient histogram calculating module 71 illustrated in FIG. 22 can be implemented with registers the number of which is equal to (the number of bins of the feature amount×the dimensions of the feature amount (in FIG. 22, the number of dimensions is assumed to be one)). That is, the total capacity required for storing the gradient histogram is represented as (the number of bins×the bit width×2 (the first-order gradient g, the second-order gradient h)×the dimensions of the feature amount), which does not depend on the number of division. Thus, as compared with the conventional configuration illustrated in FIG. 20, circuit capacity for storing the gradient histogram can be greatly reduced. Additionally, in the configuration of the gradient histogram calculating module 71 according to the present embodiment, a circuit scale does not depend on the number of division, so that the number of division for Data Parallel can be increased so long as a circuit scale of other modules allows, and speed of learning processing can be improved.

For example, in a case in which the feature amount is 8 bits (256 patterns) and has 2000 dimensions, and the gradient information includes two gradients, that is, the first-order gradient g and the second-order gradient h, the number of required registers is represented as follows.

256 (the number of bins)×2 (the first-order gradient g,the second-order gradient h)×2000 [dimensions]=1024000 [registers]

In a case of a chip called VU9P described above, the maximum number of registers is 2364000, so that the number of registers required for holding the gradient histogram can be suppressed to be substantially half of the maximum number of registers in the configuration of the gradient histogram calculating module 71 according to the present embodiment.

Figure 23:
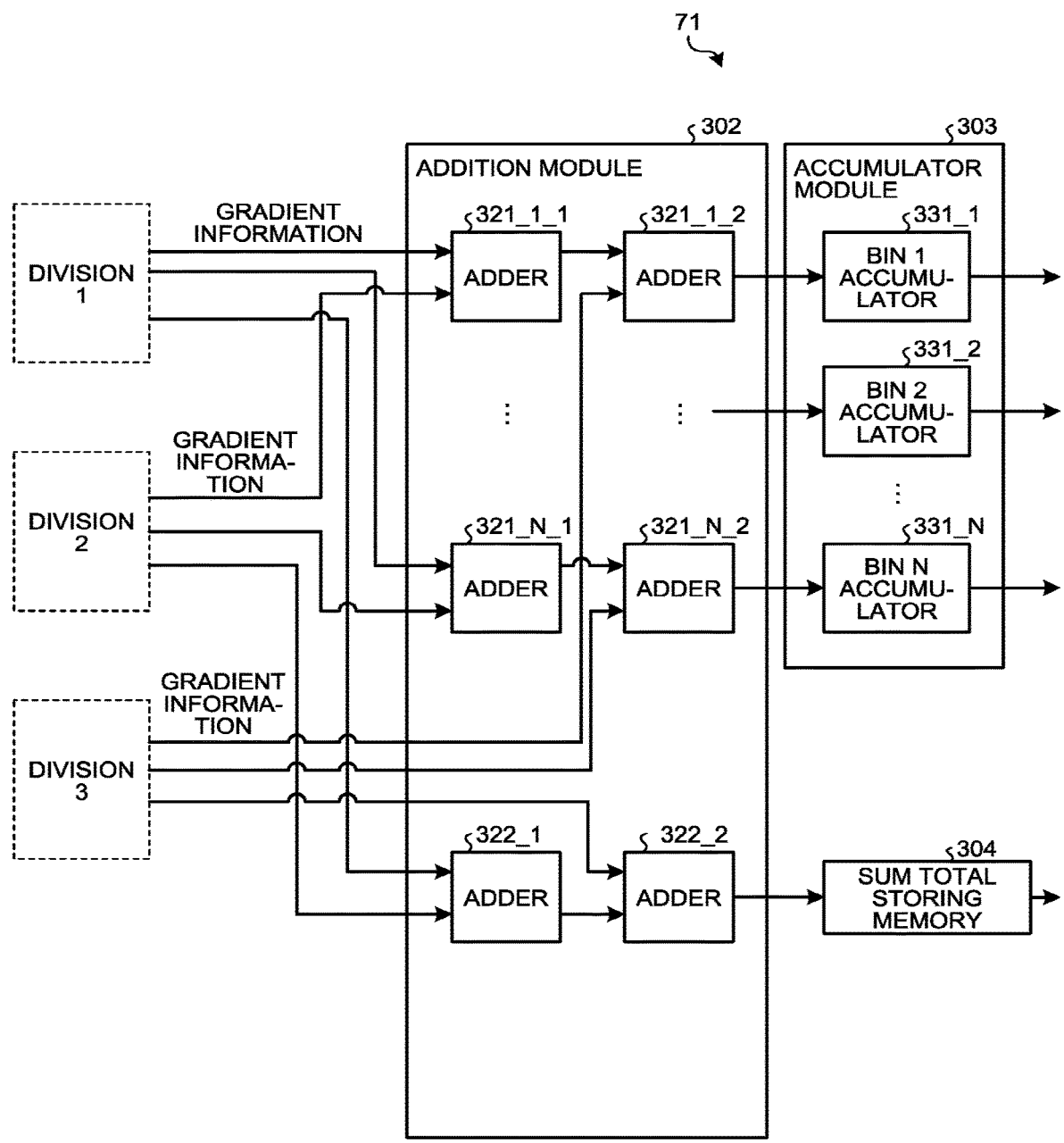
FIG. 23 is a diagram illustrating an example of a module configuration of the gradient histogram calculating module in a case in which the number of division is assumed to be 3 in the learning module according to the second embodiment.

FIG. 23 is a diagram illustrating an example of a module configuration of the gradient histogram calculating module in a case in which the number of division is assumed to be 3 in the learning module according to the second embodiment. With reference to FIG. 23, the following describes a configuration example of the gradient histogram calculating module 71 in a case in which the number of division for Data Parallel is assumed to be 3. FIG. 23 illustrates a case in which the feature amount is assumed to have one dimension, and the gradient information is assumed to include only one piece of information (for example, the first-order gradient g).

For example, in FIG. 23, the addition module 302 includes adders 321_1_1, . . . , and 321_N_1, adders 321_1_2, . . . , and 321_N_2, and adders 322_1 and 322_2. As in the gradient histogram calculating module 71 illustrated in FIG. 23, the addition module 302 may integrate (add up) the pieces of gradient information in a stepwise manner. For example, regarding the bin 1, the adder 321_1_1 adds the gradient information output from "division 1" to the gradient information output from "division 2" to be output to the adder 321_1_2. The adder 321_1_2 adds an added value output from the adder 321_1_1 to the gradient information output from "division 3" to be output to the bin 1 accumulator 331_1 of the accumulator module 303.

Configuration and Operation of Accumulated Gradient Calculating Module

Figure 24:
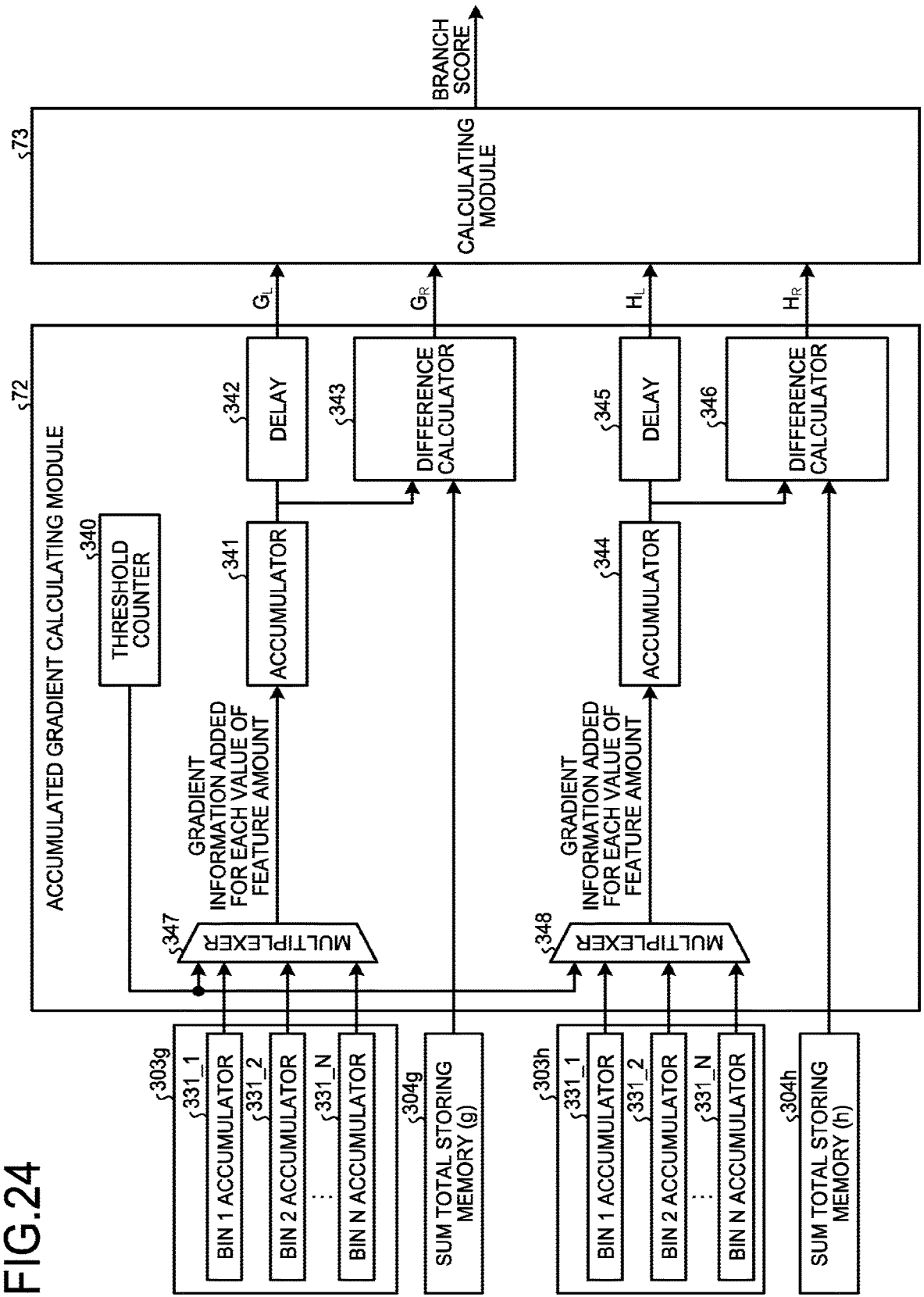
FIG. 24 is a diagram illustrating an example of a module configuration of an accumulated gradient calculating module of the learning module according to the second embodiment.

FIG. 24 is a diagram illustrating an example of a module configuration of the accumulated gradient calculating module of the learning module according to the second embodiment. With reference to FIG. 24, the following describes a configuration and an operation of the accumulated gradient calculating module 72 in the learning module 20a according to the present embodiment. FIG. 24 illustrates a case in which the number of division for Data Parallel is assumed to be 1, the feature amount is assumed to have one dimension, and the gradient information is assumed to include two piece of information (for example, the first-order gradient g and the second-order gradient h).

The conventional accumulated gradient calculating module 62 illustrated in FIG. 19 accesses the gradient histogram memory 204 (208) using the output (threshold) from the threshold counter 210 as an address. In FIG. 24, the gradient histogram is held by the register (accumulator) for each bin, so that only a value corresponding to the threshold of the threshold counter is extracted from every bin via the multiplexer.

As illustrated in FIG. 24, the accumulated gradient calculating module 72 includes a threshold counter 340, an accumulator 341, a delay 342, a difference calculator 343, an accumulator 344, a delay 345, a difference calculator 346, and multiplexers 347 and 348. In FIG. 24, the accumulator module 303 and the sum total storing memory 304 corresponding to the first-order gradient g are assumed to be an accumulator module 303g and a sum total storing memory 304g, respectively. The accumulator module 303 and the sum total storing memory 304 corresponding to the second-order gradient h are assumed to be an accumulator module 303h and a sum total storing memory 304h, respectively.

The threshold counter 340 outputs a threshold for reading out, from the accumulator modules 303g and 303h, the gradient information (g, h) added for each value (bin) of the feature amount, that is, the gradient histogram of each bin of the feature amount.

The multiplexer 347 receives an input of the threshold from the threshold counter 340, and an input of a storage value (gradient histogram) of each accumulator (the bin 1 accumulator 331_1, the bin 2 accumulator 331_2, . . . , and the bin N accumulator 331_N) of the accumulator module 303g. The multiplexer 347 then outputs, to the accumulator 341, the gradient histogram corresponding to the bin corresponding to the threshold from the threshold counter 340 among the input gradient histograms of the respective bins.

The multiplexer 348 receives an input of the threshold from the threshold counter 340, and an input of the storage value (gradient histogram) of each accumulator (the bin 1 accumulator 331_1, the bin 2 accumulator 331_2, . . . , and the bin N accumulator 331_N) of the accumulator module 303h. The multiplexer 348 then outputs, to the accumulator 344, the gradient histogram corresponding to the bin corresponding to the threshold from the threshold counter 340 among the input gradient histograms of the respective bins.

The accumulator 341 receives, from the multiplexer 347, an input of the gradient histogram of the gradient information g corresponding to the threshold output from the threshold counter 340, accumulates the input gradient histogram on the cumulative sum of the gradient histogram that is presently stored, and holds it as a new cumulative sum of the gradient histogram.

The delay 342 outputs, as the sum $G_L$ of the gradient information g, the cumulative sum of the gradient histogram of the gradient information g read out from the accumulator 341 with delay to be matched with a timing at which the sum $G_R$ of the gradient information g is output from the difference calculator 343.

The difference calculator 343 calculates the sum $G_R$ of the gradient information g by subtracting the cumulative sum of the gradient histogram of the gradient information g read out from the accumulator 341 (that is, the sum $G_L$ of the gradient information g) from the sum total of the gradient information g read out from the sum total storing memory 304g.

The accumulator 344 receives, from the multiplexer 348, an input of the gradient histogram of the gradient information h corresponding to the threshold output from the threshold counter 340, accumulates the input gradient histogram on the cumulative sum of the gradient histogram that is presently stored, and holds it as a new cumulative sum of the gradient histogram.

The delay 345 outputs, as the sum $H_L$ of the gradient information h, the cumulative sum of the gradient histogram of the gradient information h read out from the accumulator 344 with delay to be matched with a timing at which the sum $H_R$ of the gradient information h is output from the difference calculator 346.

The difference calculator 346 calculates the sum $H_R$ of the gradient information h by subtracting the cumulative sum of the gradient histogram of the gradient information h read out from the accumulator 344 (that is, the sum $H_L$ of the gradient information h) from the sum total of the gradient information h read out from the sum total storing memory 304h.

The following simply describes an operation procedure of calculating the sums ($G_L$, $G_R$, $H_L$, $H_R$) of the gradient information performed by the accumulated gradient calculating module 72. The accumulated gradient calculating module 72 starts calculation processing after the gradient histogram calculating module 71 ends the operation of calculation and storage processing for the gradient histogram of the gradient information. That is, after the gradient histogram calculating module 71 ends the calculation processing, the accumulator modules 303g and 303h hold the gradient histograms of the respective pieces of gradient information g and h calculated from all the pieces of learning data of the present node.

First, the multiplexer 347 receives an input of the threshold from the threshold counter 340, and an input of the storage value (gradient histogram) of each accumulator (the bin 1 accumulator 331_1, the bin 2 accumulator 331_2, . . . , and the bin N accumulator 331_N) of the accumulator module 303g. The multiplexer 347 outputs, to the accumulator 341, the gradient histogram corresponding to the bin corresponding to the threshold from the threshold counter 340 among the input gradient histograms of the respective bins. The accumulator 341 then receives, from the multiplexer 347, an input of the gradient histogram of the gradient information g corresponding to the threshold output from the threshold counter 340, accumulates the input gradient histogram on the cumulative sum of the gradient histogram that is presently stored, and holds it as a new cumulative sum of the gradient histogram. The delay 342 outputs, to the calculating module 73, the cumulative sum of the gradient histogram of the gradient information g read out from the accumulator 341 with delay to be matched with a timing at which the sum $G_R$ of the gradient information g is output from the difference calculator 343, as the sum $G_L$ of the gradient information g. The difference calculator 343 calculates the sum $G_R$ of the gradient information g by subtracting the cumulative sum of the gradient histogram of the gradient information g read out from the accumulator 341 (that is, the sum $G_L$ of the gradient information g) from the sum total of the gradient information g read out from the sum total storing memory 304g, and outputs the sum $G_R$ to the calculating module 73. The same applies to processing on the gradient information h (calculation processing for the sum $H_L$ and $H_R$ of the gradient information h) performed by the multiplexer 348, the accumulator 344, the delay 345, and the difference calculator 346. The above operation is repeatedly performed on all of the thresholds, and this is implemented when the threshold counter 340 sequentially counts up the thresholds to be output in a round.

In this way, the accumulated gradient calculating module 72 and the calculating module 73 performs the processing after the gradient histogram calculating module 71 performs the operation of calculation and storage processing for the gradient histogram of the gradient information in advance. Due to this, speed of calculation processing for the branch score (gain) performed by the learning module 20a can be increased.

Configuration of Learning Module in a Case in which Number of Dimensions is 2

Figure 25:
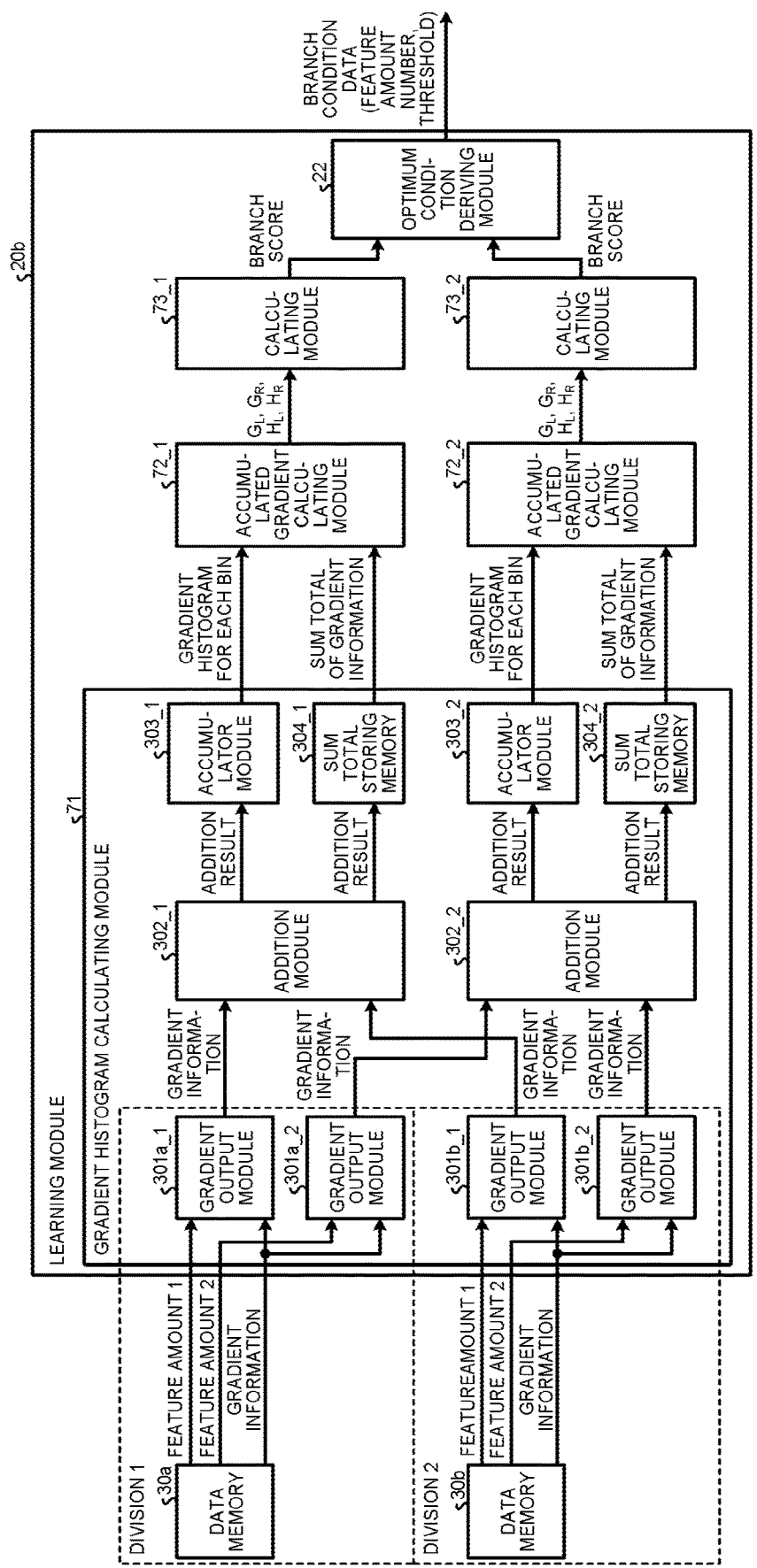
FIG. 25 is a diagram illustrating an example of a module configuration of the learning module in a case in which the number of types of feature amounts is assumed to be 2 in the learning and discrimination device according to the second embodiment.
Figure 26:
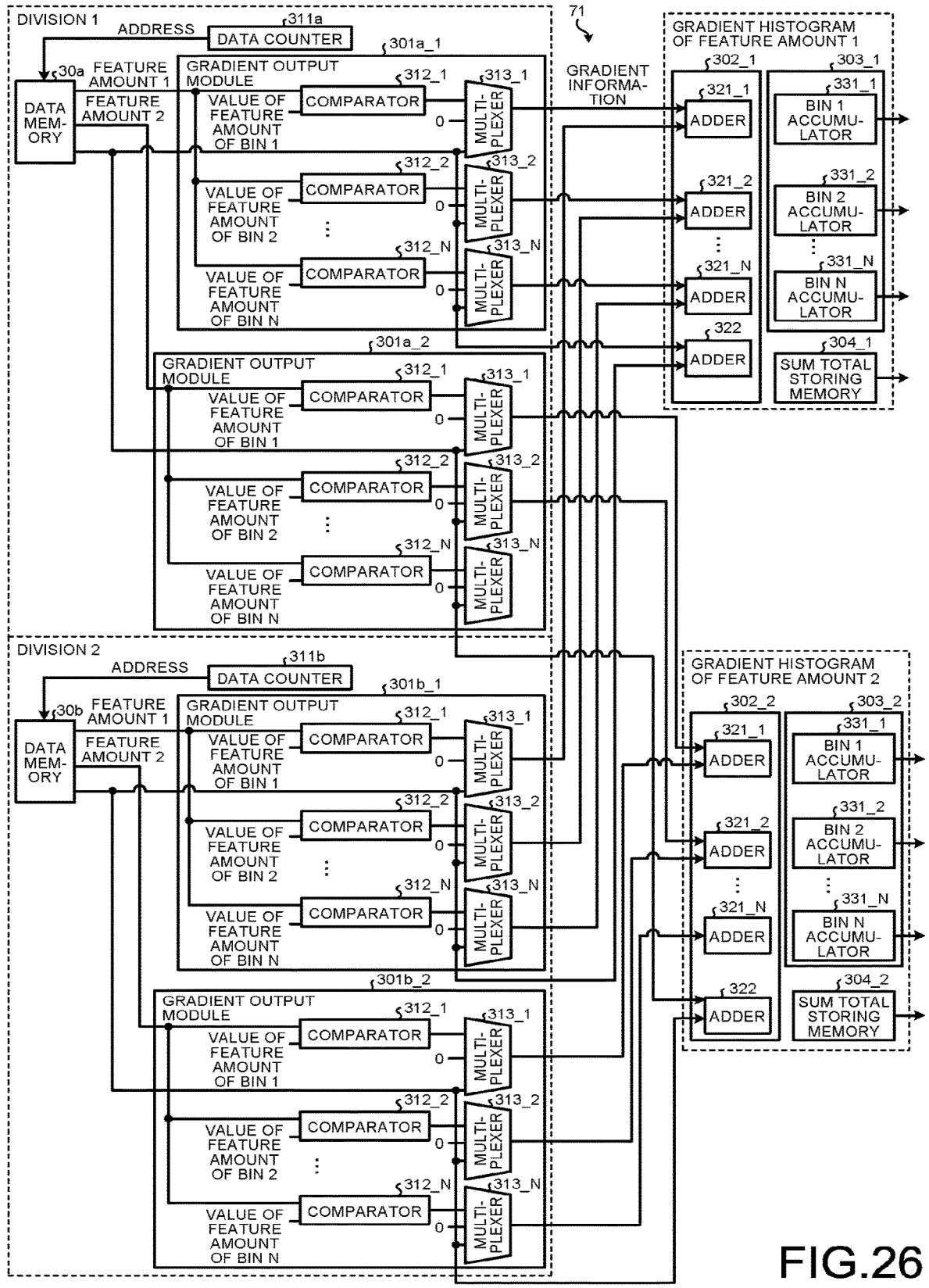
FIG. 26 is a diagram illustrating an example of a module configuration of the gradient histogram calculating module in a case in which the number of types of feature amounts is assumed to be 2 in the learning module according to the second embodiment.

FIG. 25 is a diagram illustrating an example of a module configuration of the learning module in a case in which the number of types of feature amounts is assumed to be 2 in the learning and discrimination device according to the second embodiment. FIG. 26 is a diagram illustrating an example of a module configuration of the gradient histogram calculating module in a case in which the number of types of feature amounts is assumed to be 2 in the learning module according to the second embodiment. With reference to FIG. 25 and FIG. 26, the following describes a configuration and an operation of a learning module 20b of the learning and discrimination device (an example of a learning device) according to the present embodiment. FIG. 25 illustrates a case in which the number of division for Data Parallel is assumed to be 2, and the feature amount is assumed to have two dimensions.

As illustrated in FIG. 25, the learning module 20b includes the gradient histogram calculating module 71, accumulated gradient calculating modules 72_1 and 72_2, calculating modules 73_1 and 73_2, and the optimum condition deriving module 22. The gradient histogram calculating module 71 includes gradient output modules 301a_1, 301a_2, 301b_1, and 301b_2, addition modules 302_1 and 302_2, accumulator modules 303_1 and 303_2, and sum total storing memories 304_1 and 304_2. As illustrated in FIG. 26, the gradient histogram calculating module 71 includes the data counters 311a and 311b in addition to the configuration illustrated in FIG. 25.

As illustrated in FIG. 26, each of the gradient output modules 301a_1, 301a_2, 301b_1, and 301b_2 includes the comparators 312_1, 312_2, . . . , and 312_N, and the multiplexers 313_1, 313_2, . . . , and 313_N. Each of the addition modules 302_1 and 302_2 includes the adders 321_1, 321_2, . . . , and 321_N, and the adder 322. Each of the accumulator modules 303_1 and 303_2 includes the bin 1 accumulator 331_1, the bin 2 accumulator 331_2, . . . , and the bin N accumulator 331_N.

In the configuration illustrated in FIG. 25 and FIG. 26, the gradient output modules 301a_1 and 301b_1, the addition module 302_1, the accumulator module 303_1, the sum total storing memory 304_1, the accumulated gradient calculating module 72_1, and the calculating module 73_1 are used for processing corresponding to "feature amount 1". On the other hand, the gradient output modules 301a_2 and 301b_2, the addition module 302_2, the accumulator module 303_2, the sum total storing memory 304_2, the accumulated gradient calculating module 72_2, and the calculating module 73_2 are used for processing corresponding to "feature amount 2". An operation of each of the modules is the same as the operation described above with reference to FIG. 22 and FIG. 24.

As described above, the capacity required for storing the gradient histogram is represented as (the number of bins×the bit width×2 (the first-order gradient g, the second-order gradient h)×the dimensions of the feature amount), so that the accumulator modules 303 the number of which corresponds to the dimensions of the feature amount are required (in FIG. 25, the accumulator modules 303_1 and 303_2). However, the capacity does not depend on the number of division, so that, although FIG. 25 and FIG. 26 exemplify the case in which the number of division is 2, it is sufficient to arrange the two accumulator modules 303 so long as the dimensions of the feature amount is two even when the number of division becomes equal to or larger than 3.

As described above, in the learning module 20a (20b) of the learning and discrimination device according to the present embodiment, the gradient histogram calculating module 71 stores the gradient histogram in a corresponding register (accumulator) for each bin of the feature amount instead of storing the gradient histogram in the memory as in the conventional configuration illustrated in FIG. 20. The configuration of the gradient histogram calculating module 71 can be implemented with registers the number of which is equal to (the number of bins of the feature amount×the dimensions of the feature amount). That is, the total capacity required for storing the gradient histogram is represented as (the number of bins×the bit width×2 (the first-order gradient g, the second-order gradient h)×the dimensions of the feature amount), which does not depend on the number of division. Thus, as compared with the conventional configuration illustrated in FIG. 20, it is possible to greatly reduce the circuit scale of the memory (the accumulator, the register) that holds the information of the gradient histogram created for the feature amount and the gradient information that are input in parallel. Additionally, in the configuration of the gradient histogram calculating module 71 according to the present embodiment, the circuit scale does not depend on the number of division, so that the number of division for Data Parallel can be increased so long as the circuit scale of the other modules allows, and speed of learning processing can be improved.

Third Embodiment

The following describes the learning and discrimination device according to a third embodiment, mainly about differences from the learning and discrimination device according to the second embodiment. In the first embodiment and the second embodiment, the feature amount included in the sample data is assumed to be a numerical value data the numerical value of which is meaningful. The present embodiment describes a configuration and an operation that can process, as a learning target, the feature amount (category feature amount) having meaning as an identifier indicating a specific category instead of the numerical value data.

Operation of Calculating Sum of Gradient Information Using One Hot Encoding

First, the following describes an operation of calculating the sums $G_L$, $G_R$, $H_L$, and $H_R$ of the gradient information by encoding the category feature amount by One Hot Encoding described above. For example, sample data including the category feature amount as represented by the following (Table 5) is considered.

TABLE 5

| Sample data amount | Category feature amount |
|---|---|
| 1 | A |
| 2 | B |
| 3 | C |
| 4 | B |

The sample data represented by (Table 5) is data including the category feature amount indicating any of three types of categories, that is, A to C. When the category feature amount is converted into a three-dimensional binary feature amount by encoding, that is, One Hot Encoding described above, a result of the following (Table 6) is obtained.

TABLE 6

| Sample data number | Feature amount a | Feature amount b | Feature amount c |
|---|---|---|---|
| 1 | 1 | 0 | 0 |
| 2 | 0 | 1 | 0 |
| 3 | 0 | 0 | 1 |
| 4 | 0 | 1 | 0 |

As represented by (Table 6), the one-dimensional feature amount (category feature amount) is converted into three-dimensional feature amounts (feature amounts of a, b, and c) by One Hot Encoding, and the number of types of feature amounts is increased. Values of the feature amounts a to c means as follows: the value of the feature amount a is "1" for the sample data of category A, and the value thereof is "0" for other categories; the value of the feature amount b is "1" for the sample data of category B, and the value thereof is "0" for other categories; and the value of the feature amount c is "1" for the sample data of category C, and the value thereof is "0" for other categories. For example, as represented by (Table 7), the gradient information (first-order gradient) g is assumed to correspond to the sample data represented by (Table 5).

TABLE 7

| Data number | Category feature amount | Gradient information (g) |
| --- | --- | --- |
| 1 | A | 0.5 |
| 2 | B | 0.1 |
| 3 | C | 0.1 |
| 4 | B | 0.1 |

The following describes an operation of calculating the sums $G_L$ and $G_R$ of the gradient information g for the category feature amount of the sample data represented by (Table 7). When the category feature amount of the sample data represented by (Table 7) is converted into three-dimensional binary feature amounts by encoding, that is, One Hot Encoding, a result of the following (Table 8) is obtained.

TABLE 8

| Sample data number | Feature amount a | Feature amount b | Feature amount c | Gradient information (g) |
| --- | --- | --- | --- | --- |
| 1 | 1 | 0 | 0 | 0.5 |
| 2 | 0 | 1 | 0 | 0.1 |
| 3 | 0 | 0 | 1 | 0.1 |
| 4 | 0 | 1 | 0 | 0.1 |

For the binary feature amounts a to c represented by (Table 8), there is only one type of branch to 0 and 1 at the node in the GBDT, so that the sums $G_L$ and $G_R$ of the gradient information g for each binary feature amount is represented by the following (Table 9).

TABLE 9

| | Feature amount a | Feature amount b | Feature amount c |
| --- | --- | --- | --- |
| $G_L$ | 0.3 | 0.6 | 0.7 |
| $G_R$ | 0.5 | 0.2 | 0.1 |

Operation of Calculating Sum of Gradient Information in a Case of Using Category Feature Amount as it is Next, the following considers a method of obtaining the sums $G_L$ and $G_R$ of the gradient information using the category feature amount as it is without encoding by One Hot Encoding. In this method, the sum of the gradient information g of each piece of sample data may be taken under a condition whether the category feature amount belongs to a certain category.

Focusing on the sample data represented by (Table 7) described above, first, under a condition whether the category is the category A, the sum of the gradient information g of the sample data belonging to the category A is "0.5", and the sum of the gradient information g of the sample data not belonging to the category A is "0.3". Under a condition whether the category is the category B, the sum of the gradient information g of the sample data belonging to the category B is "0.2", and the sum of the gradient information g of the sample data not belonging to the category B is "0.6". Under a condition whether the category is the category C, the sum of the gradient information g of the sample data belonging to the category C is "0.1" and the sum of the gradient information g of the sample data not belonging to the category C is "0.7". Thus, these results are the same as the results in (Table 9) described above representing the sums $G_L$ and $G_R$ of the gradient information g obtained by encoding the category feature amount by One Hot Encoding. That is, by performing processing of taking the sum of the gradient information g of the respective pieces of sample data for each category under the condition whether the category is a certain category, it is possible to obtain the sums $G_L$ and $G_R$ of the gradient information g that are the same as those obtained through processing in a case of performing encoding by One Hot Encoding. Additionally, $G_L+G_R$ is the sum total of the gradient information of all the pieces of sample data, and is always the same. Thus, when the sum $G_L$ (or $G_R$) of the gradient information g for a certain category is obtained, the sum $G_R$ (or $G_L$) can also be obtained. With the method of calculating the sums $G_L$ and $G_R$ of the gradient information g as described above, similarly, the sums $H_L$ and $H_R$ of the gradient information (second-order gradient) h can be calculated.

Figure 27:
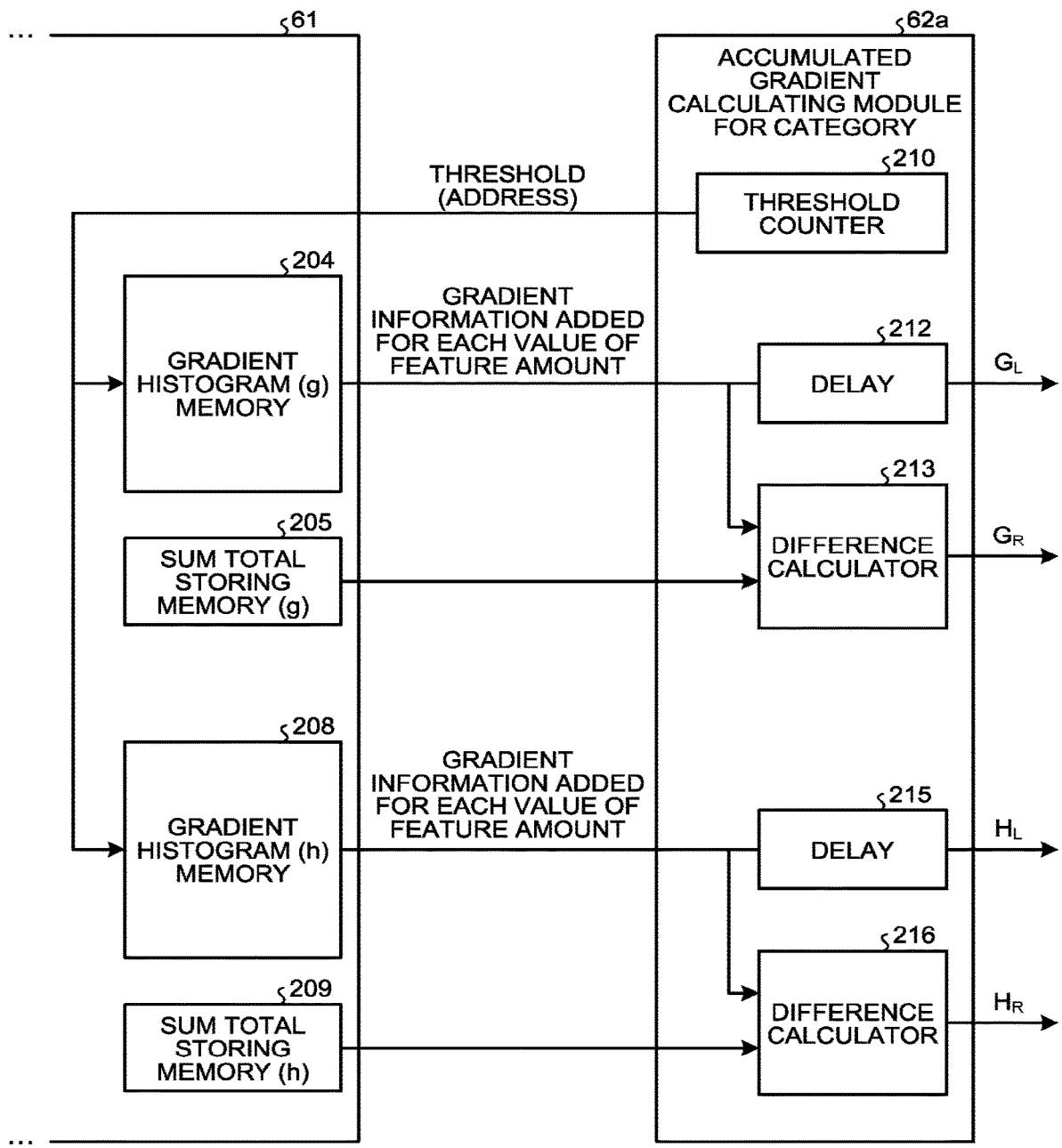
FIG. 27 is a diagram illustrating an example of a module configuration of an accumulated gradient calculating module for a category feature amount.

Configuration of Accumulated Gradient Calculating Module Supporting Category Feature Amount FIG. 27 is a diagram illustrating an example of a module configuration of the accumulated gradient calculating module for the category feature amount. With reference to FIG. 27, the following describes a configuration of the accumulated gradient calculating module supporting the category feature amount (an accumulated gradient calculating module 62a for a category). FIG. 27 illustrates a case in which a category feature amount is assumed have one dimension, and the gradient information is assumed to include the first-order gradient g and the second-order gradient h.

First, as sample data including the category feature amount, the category feature amounts of the sample data represented by (Table 7) described above are assumed to be stored in the data memory 30 in a format similar to that of a non-category feature amount as represented by the following (Table 10) by converting respective categories into appropriate numerical values (for example, continuous numerical values).

TABLE 10

| Sample data number | Category feature amount | Gradient information (g) |
| --- | --- | --- |
| 1 | 0 | 0.5 |
| 2 | 1 | 0.1 |
| 3 | 2 | 0.1 |
| 4 | 1 | 0.1 |

The gradient histograms (an example of a histogram) of the category feature amounts are stored in the gradient histogram memories 204 and 208 (an example of a histogram memory unit) by the gradient histogram calculating module 61 illustrated in FIG. 18 described above through the same operation as described above with reference to FIG. 18. That is, the added gradient information g is successively stored in the gradient histogram memory 204 using a value of the category feature amount as an address, and the gradient histogram memory 204 stores the gradient histogram for each value (bin) of the category feature amount in the end. The added gradient information h is successively stored in the gradient histogram memory 208 using a value of the category feature amount as an address, and the gradient histogram memory 208 stores the gradient histogram for each value (bin) of the category feature amount in the end. For example, the gradient histograms represented by the following (Table 11) are stored in the gradient histogram memory 204 for each value (bin) of the category feature amount.

TABLE 11

| Feature amount | Gradient histogram |
|---|---|
| 0 (A) | 0.5 |
| 1 (B) | 0.2 |
| 2 (C) | 0.1 |

As illustrated in FIG. 27, the accumulated gradient calculating module 62a for a category includes the threshold counter 210, the delay 212 (an example of a first output unit), the difference calculator 213 (an example of a second output unit), the delay 215 (an example of a first output unit), and the difference calculator 216 (an example of a second output unit). As compared with the accumulated gradient calculating module 62 illustrated in FIG. 19 described above, the accumulated gradient calculating module 62a for a category has a configuration excluding the accumulators 211 and 214.

The threshold counter 210 outputs a threshold (in this case, a value of the category feature amount) to be an address for reading out, from the gradient histogram memories 204 and 208, the gradient information (g, h) added for each value of the category feature amount, that is, the gradient histogram for each value of the category feature amount.

The delay 212 outputs, as the sum $G_L$ of the gradient information g, the gradient histogram of the gradient information g read out from the gradient histogram memory 204 with delay to be matched with a timing at which the sum $G_R$ of the gradient information g is output from the difference calculator 213.

The difference calculator 213 calculates the sum $G_R$ of the gradient information g by subtracting the gradient histogram of the gradient information g read out from the gradient histogram memory 204 (that is, the sum $G_L$ of the gradient information g) from the sum total of the gradient information g read out from the sum total storing memory 205 (an example of a sum total memory unit).

The delay 215 outputs, as the sum $H_L$ of the gradient information h, the gradient histogram of the gradient information h read out from the gradient histogram memory 208 with delay to be matched with a timing at which the sum $H_R$ of the gradient information h is output from the difference calculator 216.

The difference calculator 216 calculates the sum $H_R$ of the gradient information h by subtracting the gradient histogram of the gradient information h read out from the gradient histogram memory 208 (that is, the sum $H_L$ of the gradient information h) from the sum total of the gradient information h read out from the sum total storing memory 209 (an example of a sum total memory unit).

The following simply describes an operation procedure of calculating the sums ($G_L$, $G_R$, $H_L$, $H_R$) of the gradient information performed by the accumulated gradient calculating module 62a for a category. The accumulated gradient calculating module 62a for a category starts calculation processing after the gradient histogram calculating module 61 ends the operation of calculation and storage processing for the gradient histogram of the gradient information. That is, after the gradient histogram calculating module 61 ends the calculation processing, the respective gradient histogram memories 204 and 208 hold the gradient histograms of the pieces of gradient information g and h calculated from all the pieces of learning data at the present node (in this case, the feature amount is assumed to be the category feature amount).

First, the accumulated gradient calculating module 62a for a category reads out the gradient histogram of the gradient information g stored in the gradient histogram memory 204 using a threshold (value of the category feature amount) as an address output from the threshold counter 210. The delay 212 reads out, from the gradient histogram memory 204, the gradient histogram of the gradient information g corresponding to the threshold output from the threshold counter 210, and outputs, as the sum $G_L$ of the gradient information g, to the calculating module 63 (an example of a score calculator) with delay to be matched with a timing at which the sum $G_R$ of the gradient information g is output from the difference calculator 213. The difference calculator 213 calculates the sum $G_R$ of the gradient information g by subtracting the gradient histogram of the gradient information g read out from the gradient histogram memory 204 (that is, the sum $G_L$ of the gradient information g) from the sum total of the gradient information g read out from the sum total storing memory 205, and outputs the sum $G_R$ to the calculating module 63. The same applies to processing on the gradient information h (calculation processing for the sums $H_L$ and $H_R$ of the gradient information h) performed by the delay 215 and the difference calculator 216. The above operation is repeatedly performed on all of the thresholds, and this is implemented when the threshold counter 210 sequentially counts up the thresholds to be output in a round. Accordingly, the sums ($G_L$, $G_R$, $H_L$, $H_R$) of the gradient information for the category feature amount is calculated without performing encoding by One Hot Encoding.

The accumulated gradient calculating module 62a for a category illustrated in FIG. 27 described above is a module that calculates the sums ($G_L$, $G_R$, $H_L$, $H_R$) of the gradient information corresponding to the category feature amount. However, actually, whether the feature amount is a category feature amount or a non-category feature amount depends on target sample data, so that the accumulated gradient calculating module 62a for a category is required to have a configuration that operates for both of the category feature amount and the non-category feature amount in a case of hard logic. With reference to FIG. 28 to FIG. 31, the following describes the accumulated gradient calculating module according to the present embodiment that can calculate the sums ($G_L$, $G_R$, $H_L$, $H_R$) of the gradient information for both of the category feature amount and the non-category feature amount.

Figures 28, 29:
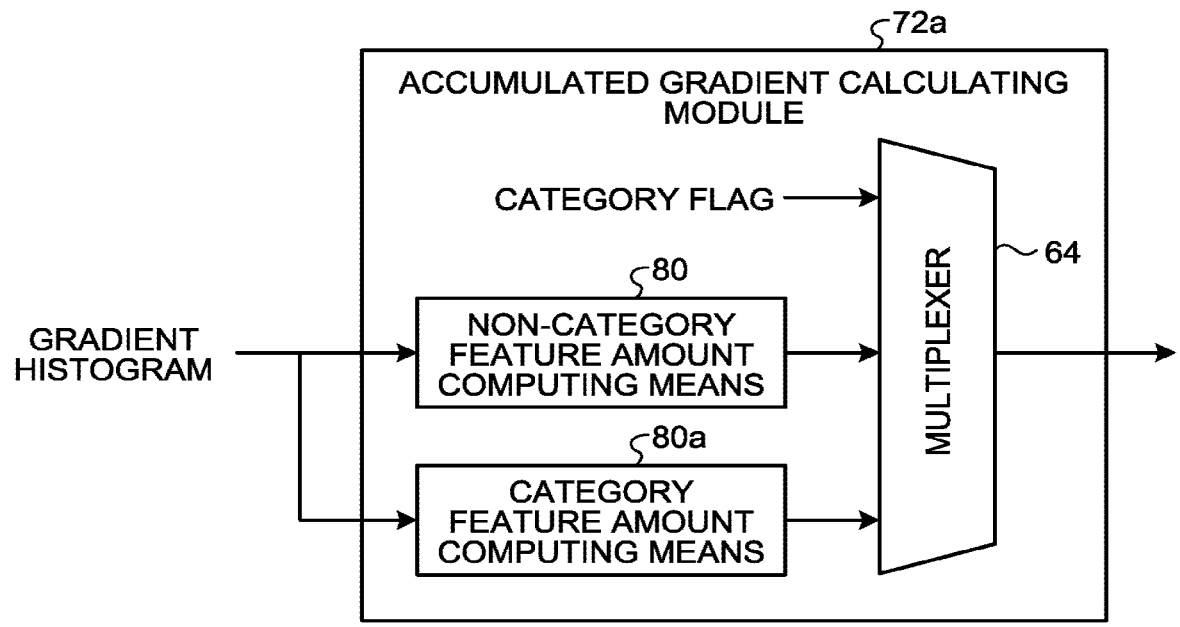
FIG. 28 is a diagram illustrating an example of category information for associating a feature amount number with a category flag.
FIG. 29 is a diagram illustrating an outline of a module configuration of an accumulated gradient calculating module of a learning module according to a third embodiment.

Configuration of Accumulated Gradient Calculating Module Supporting Both of Category Feature Amount and Non-Category Feature Amount FIG. 28 is a diagram illustrating an example of category information for associating the feature amount number with a category flag. FIG. 29 is a diagram illustrating an outline of a module configuration of the accumulated gradient calculating module of the learning module according to the third embodiment. With reference to FIG. 28 and FIG. 29, the following describes an outline of a configuration of an accumulated gradient calculating module 72a according to the present embodiment.

The sample data includes a plurality of feature amounts (feature amount having a plurality of dimensions), and both of the category feature amount and the non-category feature amount may be included as the feature amounts. Thus, as the category information associating the feature amount number of each feature amount of the sample data input to the learning module according to the present embodiment with the category flag indicating whether each of the feature amounts is the category feature amount, for example, it is assumed that the information as illustrated in FIG. 28 is stored in storage means (for example, the data memory 30). In the example of the category information illustrated in FIG. 28, the feature amount the category flag of which is "1" is the category feature amount, and the feature amount the category flag of which is "0" is the non-category feature amount. In a case of newly using a data set of sample data including a different configuration of the feature amount (whether the feature amount is the category feature amount or the non-category feature amount), category information corresponding to the data set may be used.

The following describes an outline of the configuration of the accumulated gradient calculating module 72a according to the present embodiment illustrated in FIG. 29. As illustrated in FIG. 29, the accumulated gradient calculating module 72a includes non-category feature amount computing means 80, category feature amount computing means 80a, and a multiplexer 64.

The non-category feature amount computing means 80 is means (module) for calculating the sums ($G_L$, $G_R$, $H_L$, $H_R$) of the gradient information assuming that the input gradient histogram is a gradient histogram corresponding to the non-category feature amount.

The category feature amount computing means 80a is means (module) for calculating the sums ($G_L$, $G_R$, $H_L$, $H_R$) of the gradient information assuming that the input gradient histogram is a gradient histogram corresponding to the category feature amount.

The multiplexer 64 successively receives an input of the category flag of the category information stored in the storage means described above, and also receives an input of the sums ($G_L$, $G_R$, $H_L$, $H_R$) of the gradient information calculated by both of the non-category feature amount computing means 80 and the category feature amount computing means 80a. In a case in which the input category flag is "1" (that is, indicates the category feature amount), the multiplexer 64 outputs the sums ($G_L$, $G_R$, $H_L$, $H_R$) of the gradient information input from the category feature amount computing means 80a to the calculating module (for example, the calculating module 73) at a succeeding stage. On the other hand, in a case in which the input category flag is "0" (that is, indicates the non-category feature amount), the multiplexer 64 outputs the sums ($G_L$, $G_R$, $H_L$, $H_R$) of the gradient information input from the non-category feature amount computing means 80 to the calculating module at a succeeding stage.

As described above, the accumulated gradient calculating module 72a refers to the category information to select any of the sums ($G_L$, $G_R$, $H_L$, $H_R$) of the gradient information calculated by the non-category feature amount computing means 80 or the category feature amount computing means 80a to be output depending on whether each feature amount included in the sample data as a present target of learning processing is the category feature amount or the non-category feature amount. That is, the respective non-category feature amount computing means 80 and the category feature amount computing means 80a calculate the sums ($G_L$, $G_R$, $H_L$, $H_R$) of the gradient information in parallel using the input gradient histograms, and the accumulated gradient calculating module 72a switches the sums ($G_L$, $G_R$, $H_L$, $H_R$) of the gradient information to be output based on the category flag. The following describes a specific configuration of the accumulated gradient calculating module 72a with reference to FIG. 30.

Figure 30:
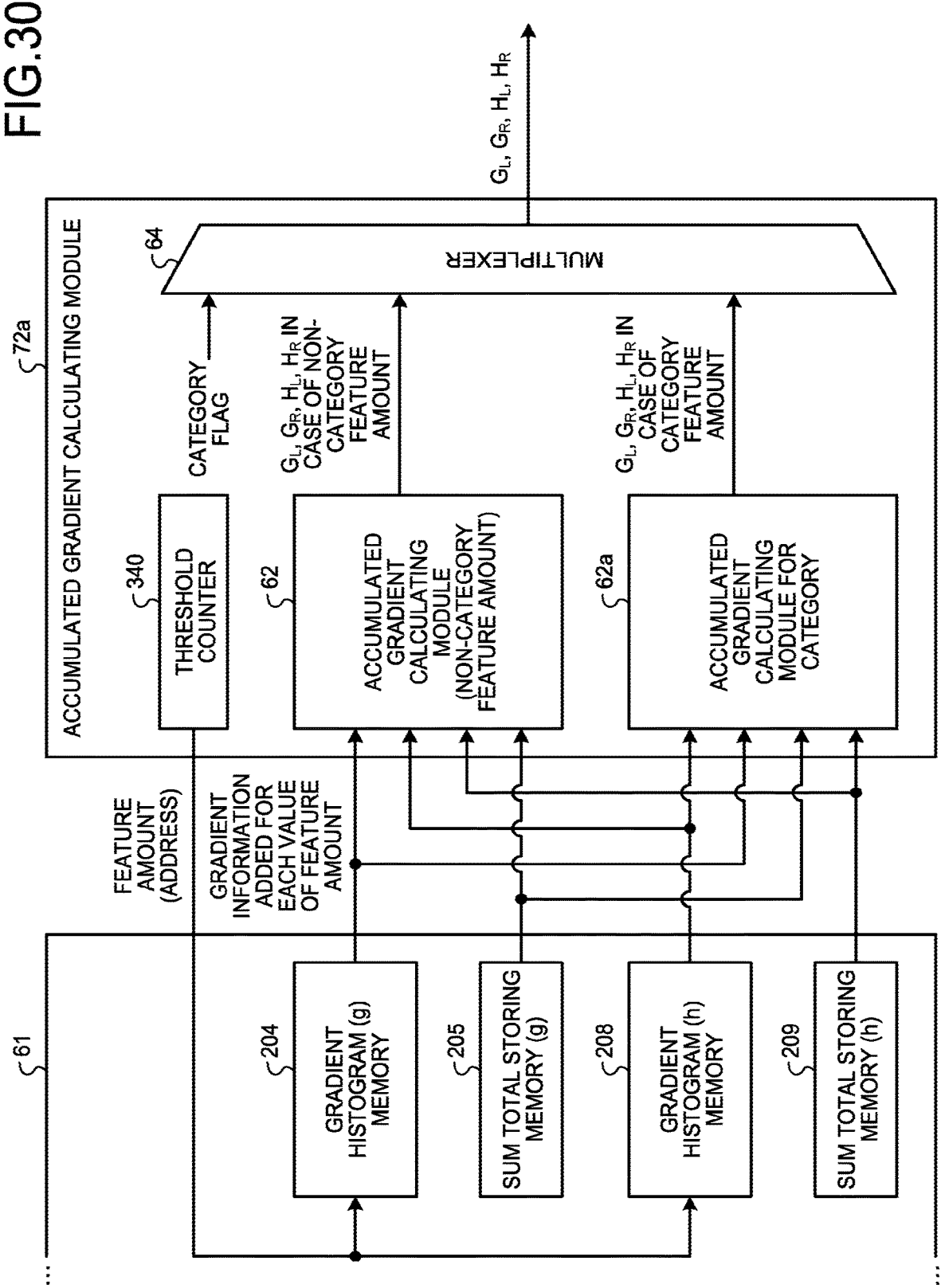
FIG. 30 is a diagram illustrating an example of details of a module configuration of the accumulated gradient calculating module of the learning module according to the third embodiment.

FIG. 30 is a diagram illustrating an example of details of a module configuration of the accumulated gradient calculating module of the learning module according to the third embodiment. With reference to FIG. 30, the following describes details of the configuration of the accumulated gradient calculating module 72a according to the present embodiment. FIG. 30 illustrates a case in which the feature amount is assumed to have one dimension, and the gradient information is assumed to include the first-order gradient g and the second-order gradient h.

As illustrated in FIG. 30, the accumulated gradient calculating module 72a includes the threshold counter 340, the accumulated gradient calculating module 62 (non-category accumulated gradient calculator), the accumulated gradient calculating module 62a for a category (category accumulated gradient calculator), and the multiplexer 64 (cumulative sum selector). The accumulated gradient calculating module 62 has the same configuration and function as those of the accumulated gradient calculating module 62 described above with reference to FIG. 19. In place of the threshold counter 210 included in each of the accumulated gradient calculating module 62 and the accumulated gradient calculating module 62a for a category, the accumulated gradient calculating module 72a includes the threshold counter 340.

The threshold counter 340 outputs a threshold (a value of the feature amount) to be an address for reading out, from the gradient histogram memories 204 and 208, the gradient information (g, h) added for each value of the feature amount, that is, the gradient histogram of each value of the feature amount.

The accumulated gradient calculating module 62 is a module that calculates the sums ($G_L$, $G_R$, $H_L$, $H_R$) of the gradient information assuming that the gradient histograms input from the gradient histogram memories 204 and 208 are gradient histograms corresponding to the non-category feature amount. In this case, the sum ($G_L$, $H_L$) of the gradient information corresponds to a "first cumulative sum", and the sum ($G_R$, $H_R$) of the gradient information corresponds to a "second cumulative sum". As described above, the accumulated gradient calculating module 62 has the same configuration and function as those of the accumulated gradient calculating module 62 described above with reference to FIG. 19, and corresponds to the non-category feature amount computing means 80 illustrated in FIG. 29.

The accumulated gradient calculating module 62a for a category is a module that calculates the sums ($G_L$, $G_R$, $H_L$, $H_R$) of the gradient information assuming that the gradient histograms input from the gradient histogram memories 204 and 208 are gradient histograms corresponding to the category feature amount. In this case, the sum ($G_L$, $H_L$) of the gradient information corresponds to the "first cumulative sum", and the sum ($G_R$, $H_R$) of the gradient information corresponds to the "second cumulative sum". As described above, the accumulated gradient calculating module 62a for a category has the same configuration and function as those of the accumulated gradient calculating module 62a for a category described above with reference to FIG. 27, and corresponds to the category feature amount computing means 80a illustrated in FIG. 29.

The following simply describes an operation procedure of calculating the sums ($G_L$, $G_R$, $H_L$, $H_R$) of the gradient information performed by the accumulated gradient calculating module 72a. The accumulated gradient calculating module 72a starts calculation processing after the gradient histogram calculating module 61 ends the operation of calculation and storage processing for the gradient histogram of the gradient information. That is, after the gradient histogram calculating module 61 ends the calculation processing, the respective gradient histogram memories 204 and 208 hold the gradient histograms of the pieces of gradient information g and h calculated from all the pieces of learning data at the present node.

First, the accumulated gradient calculating module 62 and the accumulated gradient calculating module 62*a* for a category reads out the gradient histograms of the pieces of gradient information g and h stored in the gradient histogram memories 204 and 208, respectively, using the threshold (the value of the feature amount) as an address output from the threshold counter 340. The accumulated gradient calculating module 62 and the accumulated gradient calculating module 62*a* for a category also reads out the sum totals of the pieces of gradient information g and h from the sum total storing memories 205 and 209, respectively.

Next, the accumulated gradient calculating module 62 calculates the sums ($G_L$, $G_R$, $H_L$, $H_R$) of the gradient information assuming that the gradient histograms input from the gradient histogram memories 204 and 208 are gradient histograms corresponding to the non-category feature amount. At the same time, the accumulated gradient calculating module 62*a* for a category calculates the sums ($G_L$, $G_R$, $H_L$, $H_R$) of the gradient information assuming that the gradient histograms input from the gradient histogram memories 204 and 208 are gradient histograms corresponding to the category feature amount.

In a case in which the input category flag is "1" (that is, indicates the category feature amount), the multiplexer 64 outputs, to the calculating module at a succeeding stage (for example, the calculating module 73) (an example of a score calculator), the sums ($G_L$, $G_R$, $H_L$, $H_R$) of the gradient information input from the accumulated gradient calculating module 62*a* for a category. On the other hand, in a case in which the input category flag is "0" (that is, indicates the non-category feature amount), the multiplexer 64 outputs, to the calculating module at a succeeding stage, the sums ($G_L$, $G_R$, $H_L$, $H_R$) of the gradient information input from the accumulated gradient calculating module 62.

The above operation is repeatedly performed on all of the thresholds, and this is implemented when the threshold counter 340 sequentially counts up the thresholds to be output in a round. In this way, referring to the category information, which of the sums ($G_L$, $G_R$, $H_L$, $H_R$) of the gradient information calculated by the accumulated gradient calculating module 62*a* for a category or the accumulated gradient calculating module 62 is to be output is switched depending on whether each feature amount included in the sample data as a present target of learning processing is the category feature amount or the non-category feature amount. Accordingly, the sums ($G_L$, $G_R$, $H_L$, $H_R$) of the gradient information can be calculated for both of the category feature amount and the non-category feature amount without performing encoding on the category feature amount by One Hot Encoding.

Figure 31:
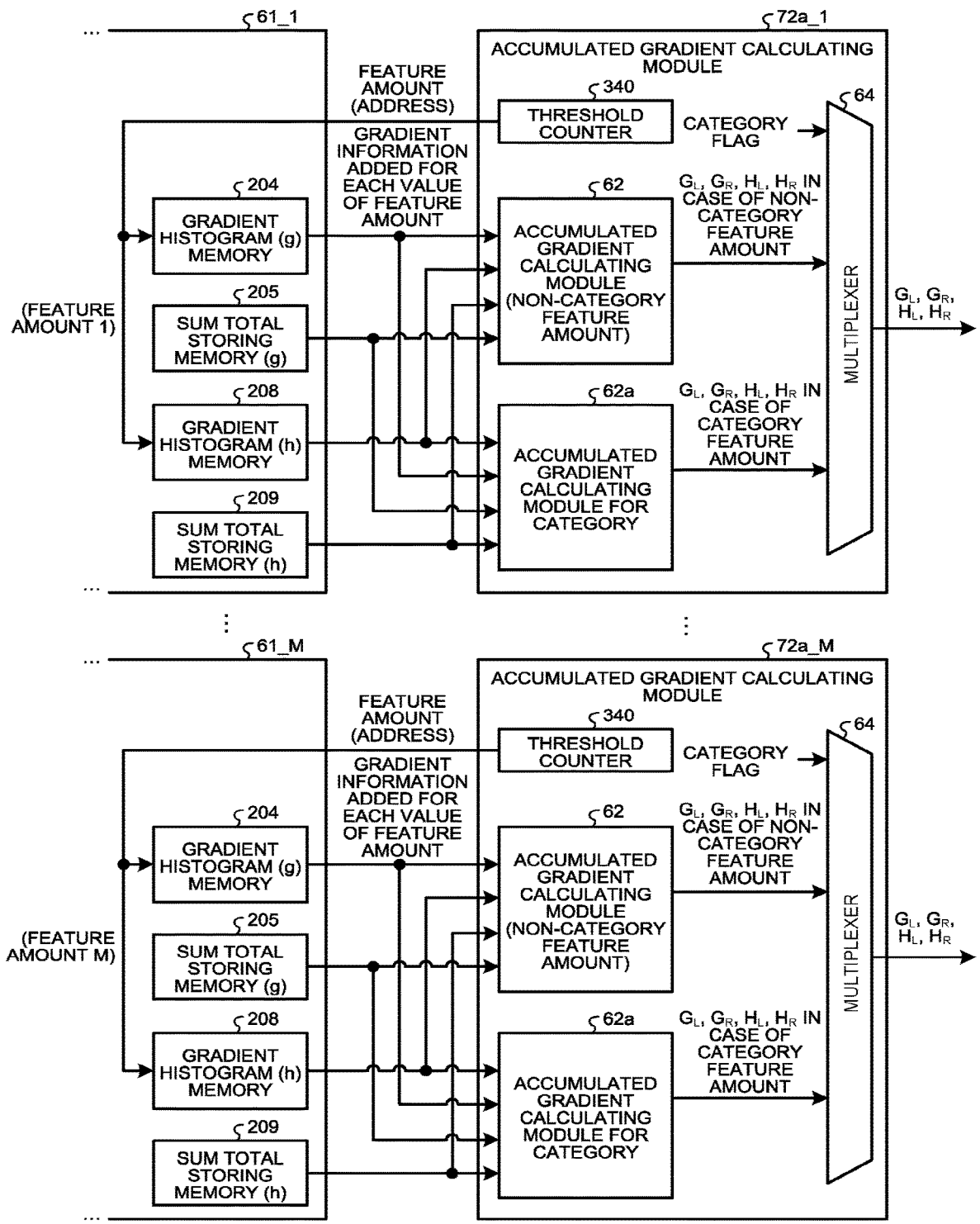
FIG. 31 is a diagram illustrating an example of a module configuration of the accumulated gradient calculating module supporting Feature Parallel in the learning module according to the third embodiment.

Configuration of Accumulated Gradient Calculating Module that Implements Feature Parallel FIG. 31 is a diagram illustrating an example of a module configuration of the accumulated gradient calculating module supporting Feature Parallel in the learning module according to the third embodiment. With reference to FIG. 31, the following describes a configuration of the accumulated gradient calculating module supporting Feature Parallel in the learning module according to the present embodiment. FIG. 31 assumes a case of Feature Parallel in which the feature amount has M dimensions.

As illustrated in FIG. 31, in a case in which the feature amount has two or more dimensions (in FIG. 31, M dimensions), the configuration may include, for each feature amount, the gradient histogram calculating module 61 including the gradient histogram memories 204 and 208 and the sum total storing memories 205 and 209, and the accumulated gradient calculating module 72*a* including the threshold counter 340, the accumulated gradient calculating module 62, the accumulated gradient calculating module 62*a* for a category, and the multiplexer 64. In the example illustrated in FIG. 31, the gradient histogram calculating module 61_1 and an accumulated gradient calculating module 72*a*_1 are provided as modules corresponding to "feature amount 1", and a gradient histogram calculating module 61_M and an accumulated gradient calculating module 72*a* M are provided as modules corresponding to "feature amount M".

With the configuration as described above, the sums ($G_L$, $G_R$, $H_L$, $H_R$) of the gradient information can be calculated for both of the category feature amount and the non-category feature amount, and Feature Parallel for the calculation can be implemented.

Configuration and Operation of Classification Module

Figure 32:
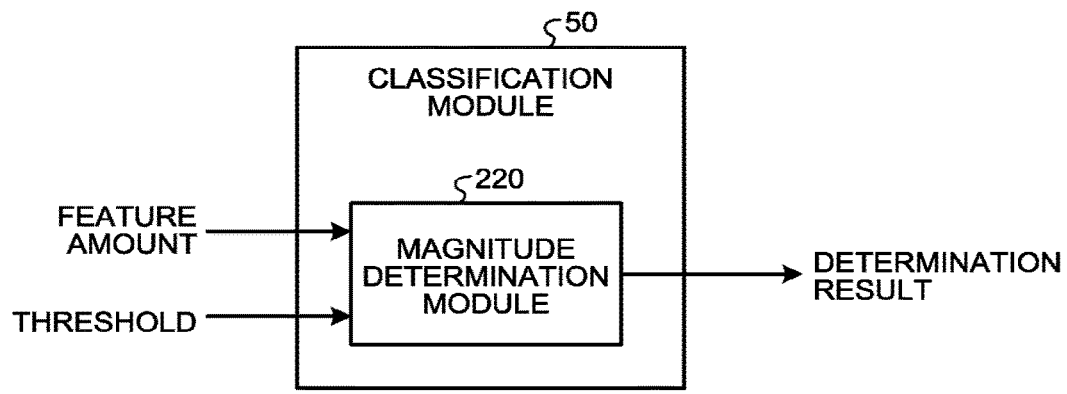
FIG. 32 is a diagram illustrating an outline of a module configuration of a classification module supporting a non-category feature amount.

FIG. 32 is a diagram illustrating an outline of a module configuration of the classification module supporting the non-category feature amount. First, with reference to FIG. 32, the following describes a conceptual configuration of the classification module 50 in a case of performing discrimination processing on the sample data (the learning data, the discrimination data) including the non-category feature amount.

As illustrated in FIG. 32, the classification module 50 includes a magnitude determination module 220.

The magnitude determination module 220 is a module corresponding to each of the node 0 discriminator 51_1, the node 1 discriminator 51_2, the node 2 discriminator 51_3, . . . included in the classification module 50 illustrated in FIG. 15 described above. That is, the magnitude determination module 220 reads out the node data of a corresponding node from the model memory 40, receives an input of the threshold included in the node data, and receives an input of the feature amount of the sample data to be subjected to discrimination processing. In this case, the feature amount input to the magnitude determination module 220 is a feature amount specified with the feature amount number included in the node data described above among the feature amounts included in the sample data. The magnitude determination module 220 then performs magnitude determination to determine whether the value of the input feature amount is equal to or larger than the input threshold or smaller than the threshold, and outputs a determination result thereof.

That is, the classification module 50 illustrated in FIG. 32 performs discrimination processing assuming that the feature amount of the sample data is the non-category feature amount. Thus, the classification module 50 illustrated in FIG. 32 cannot perform discrimination processing on the category feature amount, which is required to be subjected to discrimination processing using a branch condition whether the category is a specific category. Thus, the learning and discrimination device according to the present embodiment includes a classification module 50*c* illustrated in FIG. 33 described below.

Figure 33:
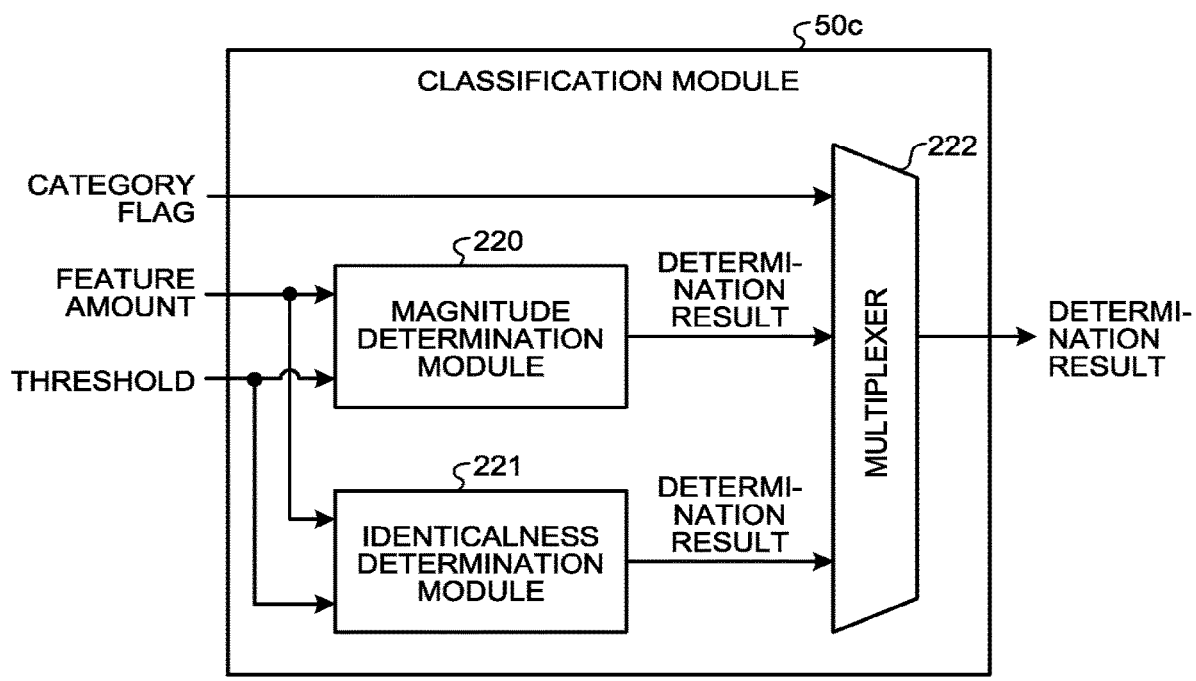
FIG. 33 is a diagram illustrating an outline of a module configuration of a classification module according to the third embodiment.

FIG. 33 is a diagram illustrating an outline of a module configuration of the classification module according to the third embodiment. With reference to FIG. 33, the following describes a conceptual configuration of the classification module 50*c* that enables discrimination processing to be performed on the sample data (the learning data, the discrimination data) including both of the category feature amount and the non-category feature amount.

As illustrated in FIG. 33, the classification module 50c includes the magnitude determination module 220 (first determining unit), an identicalness determination module 221 (second determining unit), and a multiplexer 222 (determination result selector).

The magnitude determination module 220 has the same function as that described above with reference to FIG. 32.

Similarly to the magnitude determination module 220, the identicalness determination module 221 reads out the node data of a corresponding node from the model memory 40, receives an input of the threshold included in the node data, and receives an input of the feature amount of the sample data to be subjected to discrimination processing assuming that the feature amount is the category feature amount. In this case, the feature amount input to the identicalness determination module 221 is a feature amount specified with the feature amount number included in the node data described above among the feature amounts included in the sample data. The identicalness determination module 221 then performs identicalness determination to determine whether the value of the input feature amount is identical to the input threshold (in this case, a value indicating the category), and outputs a determination result thereof.

The multiplexer 222 successively receives an input of the category flag of the category information stored in the storage means described above, and receives an input of the determination results obtained by both of the magnitude determination module 220 and the identicalness determination module 221. In a case in which the input category flag is "1" (that is, indicates the category feature amount), the multiplexer 222 outputs a determination result of identicalness determination input from the identicalness determination module 221. On the other hand, in a case in which the input category flag is "0" (that is, indicates the non-category feature amount), the multiplexer 222 outputs a determination result of magnitude determination input from the magnitude determination module 220.

The following simply describes a procedure of discrimination processing for the sample data (feature amount) performed by the classification module 50c.

First, the magnitude determination module 220 reads out the feature amount of the sample data input from the data memory 30, reads out the node data of a corresponding node from the model memory 40, performs magnitude determination to determine whether the read-out feature amount is equal to or larger than the threshold included in the node data or smaller than the threshold, and outputs a determination result thereof. At the same time, the identicalness determination module 221 reads out the feature amount of the sample data input from the data memory 30, reads out the node data of the corresponding node from the model memory 40, performs identicalness determination to determine whether the read-out feature amount is identical to the threshold (in this case, a value indicating the category) included in the node data, and outputs a determination result thereof.

In a case in which the input category flag is "1" (that is, indicates the category feature amount), the multiplexer 222 outputs the determination result of identicalness determination input from the identicalness determination module 221. On the other hand, in a case in which the input category flag is "0" (that is, indicates the non-category feature amount), the multiplexer 222 outputs the determination result of magnitude determination input from the magnitude determination module 220.

The above operation is performed on all the pieces of sample data input from the data memory 30. In this way, the classification module 50c refers to the category information to select any of the determination result of magnitude determination performed by the magnitude determination module 220 and the determination result of identicalness determination performed by the identicalness determination module 221 to be output depending on whether each feature amount included in the sample data as a target of discrimination processing is the category feature amount or the non-category feature amount.

As described above, the accumulated gradient calculating module 72a of the learning module according to the present embodiment includes the accumulated gradient calculating module 62 described above supporting the non-category feature amount in addition to the accumulated gradient calculating module 62a for a category that can calculate the sum of the gradient information for the category feature amount. The accumulated gradient calculating module 72a refers to the category information to select any of the sums of the gradients calculated by the accumulated gradient calculating module 62a for a category or the accumulated gradient calculating module 62 to be output depending on whether each feature amount included in the sample data as a present target of learning processing is the category feature amount or the non-category feature amount. Accordingly, the sums of the gradient information can be calculated for both of the category feature amount and the non-category feature amount without performing encoding on the category feature amount by One Hot Encoding. Thus, in a case of performing learning by gradient boosting using the learning data including the category feature amount, the circuit scale can be prevented from being increased.

The classification module 50c according to the present embodiment refers to the category information to select any of the determination result of magnitude determination performed by the magnitude determination module 220 and the determination result of identicalness determination performed by the identicalness determination module 221 to be output depending on whether each feature amount included in the sample data as a target of discrimination processing is the category feature amount or the non-category feature amount. Thus, discrimination processing can be performed on the sample data (the learning data, the discrimination data) including both of the category feature amount and the non-category feature amount.

Modification

Figure 34:
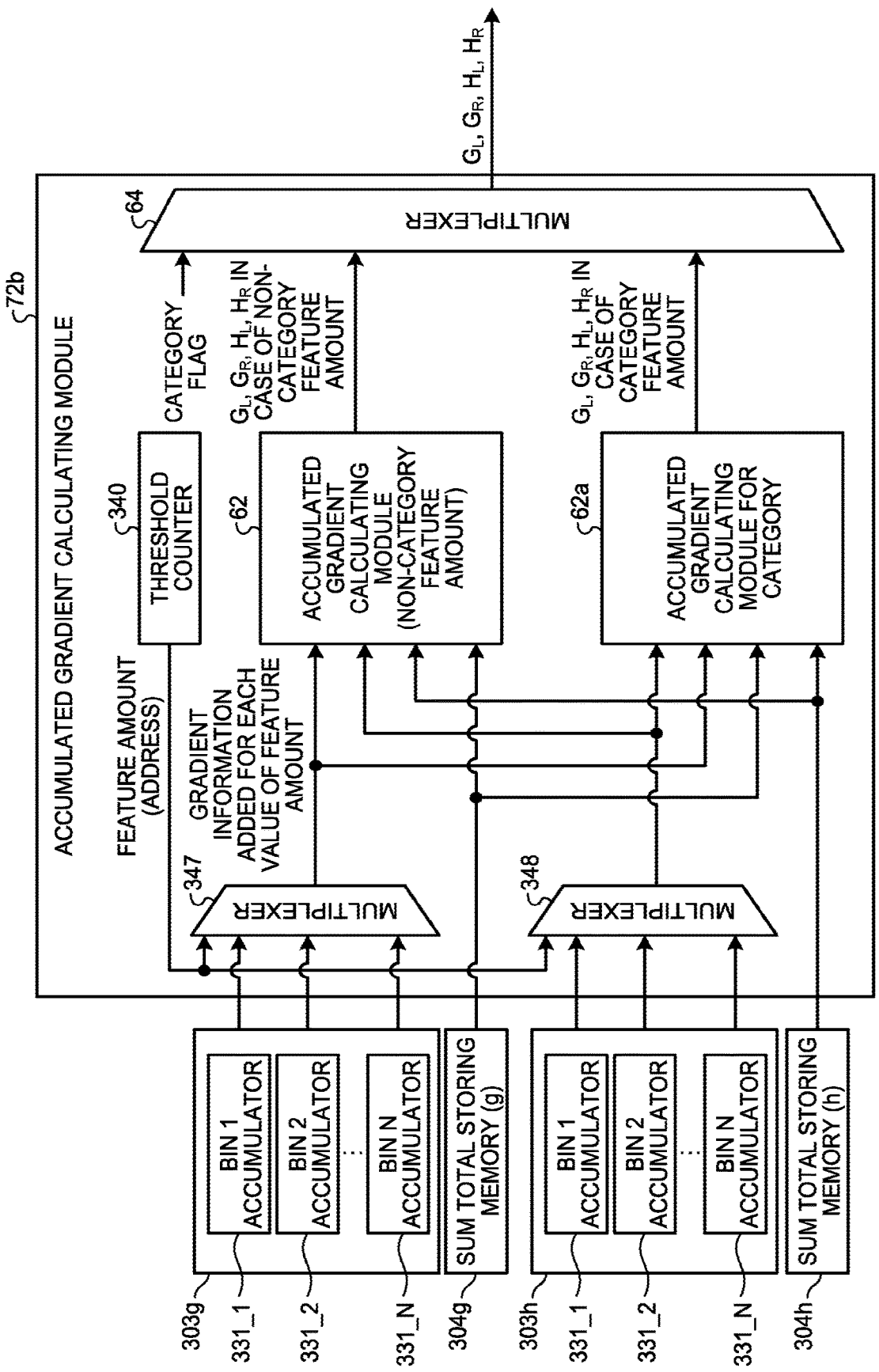
FIG. 34 is a diagram illustrating an example of a module configuration of an accumulated gradient calculating module supporting Data Parallel in a learning module according to a modification of the third embodiment.

FIG. 34 is a diagram illustrating an example of a module configuration of the accumulated gradient calculating module supporting Data Parallel in the learning module according to a modification of the third embodiment. With reference to FIG. 34, the following describes a configuration of the accumulated gradient calculating module supporting Data Parallel in the learning module according to the present modification. FIG. 34 illustrates a case in which the feature amount is assumed to have one dimension, and the gradient information is assumed to include two pieces of information (for example, the first-order gradient g, the second-order gradient h).

As illustrated in FIG. 34, in the present modification, to implement Data Parallel, the gradient histogram is stored in the accumulator modules 303g and 303h (an example of histogram memory units) illustrated in FIG. 24 described above in place of the gradient histogram memories 204 and 208 illustrated in FIG. 30, for example, as the storage means for storing the gradient histogram as described in the second embodiment. That is, in FIG. 34, the gradient histogram is held by the register (accumulator) for each bin, so that only values corresponding to the threshold of the threshold counter are extracted from all of the bins via the multiplexer. As described above with reference to FIG. 22, for example, in a case of storing the gradient histogram in the register (accumulator) corresponding to each bin of the feature amount, even if the number of division for Data Parallel is equal to or larger than 2, the total capacity required for storing the gradient histogram is represented as (the number of bins×the bit width×2 (the first-order gradient g, the second-order gradient h)×the dimensions of the feature amount), which does not depend on the number of division. Thus, as illustrated in FIG. 34, in a case in which the feature amount has one dimension, it is sufficient that a pair of the accumulator modules 303g and 303h is configured to store the gradient histogram.

As illustrated in FIG. 34, the accumulated gradient calculating module 72b according to the present modification includes the threshold counter 340, the accumulated gradient calculating module 62 (non-category accumulated gradient calculator), the accumulated gradient calculating module 62a for a category (category accumulated gradient calculator), the multiplexers 347 and 348 (histogram selectors), and the multiplexer 64 (cumulative sum selector). Similarly to the case of FIG. 24 described above, in FIG. 34, the accumulator module 303 and the sum total storing memory 304 corresponding to the first-order gradient g are assumed to be the accumulator module 303g and the sum total storing memory 304g (an example of sum total memory units), respectively. The accumulator module 303 and the sum total storing memory 304 corresponding to the second-order gradient h are assumed to be the accumulator module 303h and the sum total storing memory 304h (an example of sum total memory units).

The threshold counter 340 outputs a threshold (a value of the feature amount) for reading out, from the accumulator modules 303g and 303h, the gradient information (g, h) added for each value (bin) of the feature amount, that is, the gradient histogram of each bin of the feature amount.

The multiplexer 347 receives an input of the threshold from the threshold counter 340, and an input of a storage value (gradient histogram) of each accumulator (the bin 1 accumulator 331_1, the bin 2 accumulator 331_2, . . . , and the bin N accumulator 331_N) of the accumulator module 303g. The multiplexer 347 then outputs, to each of the accumulated gradient calculating module 62 and the accumulated gradient calculating module 62a for a category, the gradient histogram corresponding to the bin corresponding to the threshold from the threshold counter 340 among the input gradient histograms of the respective bins.

The multiplexer 348 receives an input of the threshold from the threshold counter 340, and an input of the storage value (gradient histogram) of each accumulator (the bin 1 accumulator 331_1, the bin 2 accumulator 331_2, . . . , and the bin N accumulator 331_N) of the accumulator module 303h. The multiplexer 348 then outputs, to each of the accumulated gradient calculating module 62 and the accumulated gradient calculating module 62a for a category, the gradient histogram corresponding to the bin corresponding to the threshold from the threshold counter 340 among the input gradient histograms of the respective bins.

The accumulated gradient calculating module 62 is a module that receives an input of the sum totals of the pieces of gradient information g and h from the respective sum total storing memories 304g and 304h, and calculates the sums $(G_L, G_R, H_L, H_R)$ of the gradient information assuming that the gradient histograms input from the multiplexers 347 and 348 are gradient histograms corresponding to the non-category feature amount. As described above, the accumulated gradient calculating module 62 has the same configuration and function as those of the accumulated gradient calculating module 62 described above with reference to FIG. 19.

The accumulated gradient calculating module 62a for a category is a module that receives an input of sum totals of the pieces of gradient information g and h from the respective sum total storing memories 304g and 304h, and calculates the sums $(G_L, G_R, H_L, H_R)$ of the gradient information assuming that the gradient histograms input from the multiplexers 347 and 348 are gradient histograms corresponding to the category feature amount. As described above, the accumulated gradient calculating module 62a for a category has the same configuration and function as those of the accumulated gradient calculating module 62a for a category described above with reference to FIG. 27.

The multiplexer 64 successively receives input of the category flag of the category information stored in the storage means described above, and receives an input of the sums $(G_L, G_R, H_L, H_R)$ of the gradient information calculated by both of the accumulated gradient calculating module 62 and the accumulated gradient calculating module 62a for a category. In a case in which the input category flag is "1" (that is, indicates the category feature amount), the multiplexer 64 outputs, to the calculating module at a succeeding stage (for example, the calculating module 73) (an example of a score calculator), the sums $(G_L, G_R, H_L, H_R)$ of the gradient information input from the accumulated gradient calculating module 62a for a category. On the other hand, in a case in which the input category flag is "0" (that is, indicates the non-category feature amount), the multiplexer 64 outputs, to the calculating module at a succeeding stage, the sums $(G_L, G_R, H_L, H_R)$ of the gradient information input from the accumulated gradient calculating module 62.

The following simply describes an operation procedure of calculating the sums $(G_L, G_R, H_L, H_R)$ of the gradient information performed by the accumulated gradient calculating module 72b. The accumulated gradient calculating module 72b starts calculation processing after the gradient histogram calculating module 71 ends the operation of calculation and storage processing for the gradient histogram of the gradient information. That is, after the gradient histogram calculating module 71 ends the calculation processing, the respective accumulator modules 303g and 303h hold the gradient histograms of the pieces of gradient information g and h calculated from all the pieces of learning data at the present node.

First, the multiplexer 347 receives an input of the threshold from the threshold counter 340, and an input of the storage value (gradient histogram) of each accumulator (the bin 1 accumulator 331_1, the bin 2 accumulator 331_2, . . . , and the bin N accumulator 331_N) of the accumulator module 303g. The multiplexer 347 outputs, to each of the accumulated gradient calculating module 62 and the accumulated gradient calculating module 62a for a category, the gradient histogram corresponding to the bin corresponding to the threshold from the threshold counter 340 among the input gradient histograms of the respective bins.

Next, the accumulated gradient calculating module 62 receives an input of each sum total of the gradient information g from the sum total storing memory 304g, and calculates the sums $(G_L, G_R)$ of the gradient information assuming that the gradient histograms input from the multiplexers 347 and 348 are gradient histograms corresponding to the non-category feature amount. At the same time, the accumulated gradient calculating module 62a for a category receives an input of each sum total of the gradient information g from the sum total storing memory 304g, and calculates the sums ($G_L$, $G_R$) of the gradient information assuming that the gradient histograms input from the multiplexers 347 and 348 are gradient histograms corresponding to the category feature amount.

In a case in which the input category flag is "1" (that is, indicates the category feature amount), the multiplexer 64 outputs, to the calculating module at a succeeding stage (for example, the calculating module 73), the sums ($G_L$, $G_R$) of the gradient information input from the accumulated gradient calculating module 62a for a category. On the other hand, in a case in which the input category flag is "0" (that is, indicates the non-category feature amount), the multiplexer 64 outputs, to the calculating module at a succeeding stage, the sums ($G_L$, $G_R$) of the gradient information input from the accumulated gradient calculating module 62.

The same applies to calculation processing for the sums $H_L$ and $H_R$ of the gradient information h using the gradient histogram from the accumulator module 303h and the sum total of the gradient information h from the sum total storing memory 304h. The above operation is repeatedly performed on all of the thresholds, and this is implemented when the threshold counter 340 sequentially counts up the thresholds to be output in a round.

With the configuration as described above, the sums ($G_L$, $G_R$, $H_L$, $H_R$) of the gradient information can be calculated for both of the category feature amount and the non-category feature amount, and Data Parallel for the calculation can be implemented.

EXAMPLE

The following describes a prediction result of speed of learning processing performed by the learning and discrimination device 1 according to the embodiment described above.

First, learning speed of XGBoost and LightGBM described above as a representative library of GBDT was evaluated for comparison. In December 2017, the learning speed of LightGBM using a GPU was high, and this speed was measured.

Processing time was calculated from a clock of a hardware configuration. In logic of hardware that is implemented in this case, the processing mainly includes three pieces of processing, that is, learning processing performed by the learning module 20, discrimination processing performed by the classification module 50 (in units of a node), and discrimination processing performed by the classification module 50 (in units of a tree).

Regarding Processing Performed by Learning Module

In this case, predominant processing is to calculate a branch score and create a gradient histogram from each feature amount of the sample data. In creating the gradient histogram from each feature amount of the sample data, all pieces of sample data need to be read for each depth (hierarchical level). Learning on some pieces of the sample data ends at a shallow depth of the tree, so that this estimation is a maximum value. To calculate the branch score, all the bins of the gradient histogram are referred to, so that clocks corresponding to the number of bins (dimensions of the feature amount) are required. Accordingly, the number of clocks $C_{learning}$ of the processing performed by the learning module 20 is represented by the following expression (23).

$$C_{learning}=(n_{sample\_train}*\text{maxdepth})+(n_{feature}*n_{node}) \quad (23)$$

In this case, $n_{sample\_train}$ is the number of pieces of sample data used for learning of the decision tree, which is typically a set subsampled from all the pieces of sample data. Additionally, maxdepth is a maximum depth of the decision tree, $n_{feature}$ is the number of bins (dimensions of the feature amount), and $n_{node}$ is the number of nodes.

Regarding Processing Performed by Classification Module (in Units of Node)

In this case, processing is performed to determine whether the sample data is assigned to a lower node on the left or the right using a result of a learned node. The total number of pieces of sample data processed for each depth is constant, so that the number of clocks $C_{Classification\_node}$ is represented by the following expression (24). Actually, learning of some nodes is ended in the middle of processing, so that the following estimation is a maximum value.

$$C_{Classification\_node}=n_{sample\_train}*\text{maxdepth} \quad (24)$$

Regarding Processing Performed by Classification Module (in Units of Tree)

In this case, after learning of one decision tree is ended, the gradient information is updated for each piece of the sample data for learning of the next decision tree. Thus, prediction needs to be made for all pieces of the sample data using the learned decision tree. In processing in units of a tree, a delay is caused corresponding to the depth. In this case, the number of clocks $C_{Classification\_tree}$ is represented by the following expression (25).

$$C_{Classification\_tree}+n_{sample\_all}+\text{maxdepth} \quad (25)$$

In this case, all pieces of the sample data means the total number of all pieces of learning sample data before subsampling and all pieces of validation sample data.

Accordingly, the number of clocks $C_{tree}$ (maximum value) for learning processing for one decision tree is represented by the following expression (26).

$$C_{tree}=C_{learning}+C_{Classification\_node}+C_{Classification\_tree} \quad (26)$$

GBDT includes a large number of decision trees, so that, assuming that the number of decision trees is $n_{tree}$, the number of clocks $C_{gbdt}$ of the entire GBDT model is represented by the following expression (27).

$$C_{gbdt}=C_{tree}*n_{tree} \quad (27)$$

Described above is a test calculation in the case of Feature Parallel described above. In what is called Data Parallel in a case of arranging a large number of modules in parallel and dividing the modules for each piece of data, the speed can be basically increased corresponding to the number of modules in a case in which the number of pieces of data at each node is balanced for each module. A degree of imbalance depends on the sample data and a method of dividing the sample data for each module, so that this overhead will be examined using real data hereinafter. According to prediction, efficiency is estimated to be improved 50% or more even if this overhead is taken into consideration.

Regarding Used Data

As the sample data for testing, learning data and discrimination data (data for evaluation) are randomly selected from about a hundred thousand of pieces of data. The following represents an outline of a data set.

Number of classes: 2
Dimensions of feature amount: 129
Number of pieces of learning data: 63415
Number of pieces of data for evaluation: 31707

A measurement condition for speed is represented by the following (Table 12). A clock frequency of FPGA in operation is assumed to be 100 [MHz] (actually, the clock frequency may be a higher value with high possibility).

TABLE 12

| Description | Parameter |
|---|---|
| Number of whole samples | 95122 |
| Number of arithmetic samples | 63415 |
| Number of feature amounts | 256 |
| Maximum depth of tree | 6 |
| Number of trees in boosting | 100 |
| Data subsampling rate | 0.5 |
| Feature subsampling rate | 1 |
| Clock frequency (logic) | 100 Mhz |

Test Calculation of Hardware Logic

The following (Table 13) represents a test calculation of the learning speed with the architecture described above using the expression for calculating the speed described above. However, this test calculation is a test calculation in a case in which all pieces of the sample data reach a branch at the end, and represents a worst value.

TABLE 13

| Clock | Time [msec] | Description |
|---|---|---|
| 206629 | 2.07 | Time for learning in units of node |
| 190245 | 1.90 | Time for discrimination in units of node |
| 95128 | 0.95 | Time for discrimination in units of tree |
| 492002 | 4.92 | Learning time in units of tree |
| 49200200 | 492.00 | Total learning time |

Comparison Result Including Actual Measurement by CPU and GPU

The following (Table 14) represents an actual measurement result by the CPU and the GPU. For comparison, a test calculation result of hard logic is also included therein. Up to this point, the test calculation has been performed only using Feature Parallel, so that a test calculation result in a case of using Data Parallel at the same time is added for reference.

TABLE 14

| Processing system | Learning speed [msec] | Maximum speed ratio with respect to PC | PC |
|---|---|---|---|
| CPU (XGBoost) | 7423 | 0.15 | *1 |
| CPU (LightGBM) | 1130 | 1.00 | *1 |
| GPU (LightGBM) | 4828 | 0.23 | *2 |
| FPGA (Feature Parallel) | 492 | 2.30 | — |
| FPGA (Feature + Data Parallel) *3 | 44 | 25.84 | — |
| FPGA (Feature + Data Parallel) *4 | 4 | 275.61 | — |

*1 core i7-5930K (6C12T 3.5 GHz)
*2 GPU GTX1080Ti/CPU core i7 intel core i7 7700 (4C8T 3.6 GHz)
*3 test calculation is performed under a condition that data parallel is 15-parallel and data parallel efficiency is 75% (KC705 substrate is assumed)
*4 test calculation is performed under a condition that data parallel is 240-parallel and data parallel efficiency is 50% (AWS f1.16 xlarge instance is assumed)

It can be found that the learning speed of the present data is reduced even in a case of using the GPU as compared with the case of using the CPU. Microsoft Corporation as a developer of LightGBM states that the learning speed is increased about 3 to 10 times in a case of using the GPU, but the learning speed largely depends on data. It can be found that the learning speed for the present data cannot be successfully increased by the GPU. This result also represents that the learning speed by the GPU is not easily increased with the algorithm of the GBDT as compared with the CNN. As a result of using the CPU, the learning speed with LightGBM as a latecomer is increased about 10 times as compared with XGBoost as the most basic library. With hard logic using only Feature Parallel, the learning speed is increased about 2.3 times as compared with the CPU (LightGBM) that is the fastest for a personal computer (PC). Based on the test calculation, in a case of also using Data Parallel of 15-parallel, the learning speed is increased 25 times or more even if efficiency of Data Parallel is assumed to be 75%, and increased 275 times or more if the efficiency is assumed to be 50% in a case of 240-parallel and considering AWS f1.16xlarge instance. However, this test calculation is a test calculation in a case in which a memory band reaches a limit.

From a viewpoint that power consumption is predicted to be several [W] for the FPGA, and is equal to or larger than 100 [W] for the CPU and the GPU, the power consumption is different therebetween by two digits in addition to the speed, so that power efficiency may be different therebetween by three or more digits.

According to an embodiment, the circuit scale can be prevented from being increased in a case in which learning is performed by gradient boosting using the learning data including the category feature amount.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A learning and discrimination device configured to perform learning by gradient boosting, comprising:
a histogram memory unit configured to store, for each value of a feature amount, a histogram obtained by integrating gradient information corresponding to the value of the feature amount in sample data;
a category accumulated gradient calculator configured to receive an input of a histogram corresponding to each value of the feature amount among histograms stored in the histogram memory unit, and calculate a histogram corresponding to a value of the feature amount corresponding to a threshold for the feature amount as a cumulative sum of the gradient information for the feature amount;
a non-category accumulated gradient calculator configured to receive an input of a histogram corresponding to each value of the feature amount among the histograms stored in the histogram memory unit, and calculate, as a cumulative sum of the gradient information for the feature amount, a sum of a histogram corresponding to a value of the feature amount that is classified using a classification method with the threshold for the feature amount, the classification method being different from a classification method by the category accumulated gradient calculator using the threshold; and
a cumulative sum selector configured to output the cumulative sum calculated by the category accumulated gradient calculator or the cumulative sum calculated by the non-category accumulated gradient calculator.

2. The learning and discrimination device according to claim 1, wherein
the category accumulated gradient calculator is configured to receive the input of a histogram corresponding to each value of the feature amount among the histograms stored in the histogram memory unit, calculate a histogram corresponding to a value of the feature amount that is identical to the threshold for the feature amount, as a first cumulative sum of the gradient information for the feature amount, and calculate a histogram corresponding to a value of the feature amount that is not identical to the threshold, as a second cumulative sum of the gradient information for the feature amount,
the non-category accumulated gradient calculator is configured to receive the input of a histogram corresponding to each value of the feature amount among the histograms stored in the histogram memory unit, calculate a sum of a histogram corresponding to a value of the feature amount that is classified to one side based on the threshold for the feature amount as a first cumulative sum of the gradient information for the feature amount, and calculate a sum of a histogram corresponding to a value of the feature amount that is classified to the other side based on the threshold as a second cumulative sum of the gradient information for the feature amount, and
the cumulative sum selector is configured to:
output the first cumulative sum and the second cumulative sum calculated by the category accumulated gradient calculator in a case in which category discrimination information indicates a category feature amount, the category discrimination information corresponding to the histograms input to the category accumulated gradient calculator and the non-category accumulated gradient calculator, and being indicated by category information that associates feature amount discrimination information indicating a type of the feature amount included in the sample data with category discrimination information indicating whether the feature amount is a category feature amount; and
output the first cumulative sum and the second cumulative sum calculated by the non-category accumulated gradient calculator in a case in which the category discrimination information indicates a non-category feature amount.

3. The learning and discrimination device according to claim 2, further comprising:
a sum total memory unit configured to store a sum total of the gradient information corresponding to the each sample data, wherein
the category accumulated gradient calculator comprises:
a first output unit configured to receive the input of a histogram corresponding to each value of the feature amount among the histograms stored in the histogram memory unit, and output the histogram as the first cumulative sum; and
a second output unit configured to output, as the second cumulative sum, a difference between the sum total input from the sum total memory unit and the first cumulative sum output from the first output unit, and
the non-category accumulated gradient calculator comprises:
an accumulative memory unit configured to receive the input of a histogram corresponding to each value of the feature amount among the histograms stored in the histogram memory unit, and accumulate the histogram corresponding to the value of the feature amount classified to the one side based on the threshold for the feature amount, and store the accumulated histogram;
a third output unit configured to output the accumulated histogram stored in the accumulative memory unit as the first cumulative sum; and
a fourth output unit configured to output, as the second cumulative sum, a difference between the sum total input from the sum total memory unit and the first cumulative sum output from the third output unit.

4. The learning and discrimination device according to claim 1, wherein
the histogram memory unit stores a histogram obtained by integrating gradient information corresponding to each value of the feature amount in the sample data for each bin in a case in which the each value is set as a bin, and
the learning and discrimination device further comprises a histogram selector configured to select a histogram corresponding to the threshold from among histograms for respective bins stored in the histogram memory unit, and input the histogram to each of the category accumulated gradient calculator and the non-category accumulated gradient calculator.

5. The learning and discrimination device according to claim 1, wherein the gradient information comprises a first-order gradient and a second-order gradient in the gradient boosting, the histogram memory unit is provided corresponding to each of the first-order gradient and the second-order gradient, and the category accumulated gradient calculator and the non-category accumulated gradient calculator are configured to calculate, as the cumulative sum, cumulative sums corresponding to the first-order gradient and the second-order gradient.

6. The learning and discrimination device according to claim 1, wherein learning is performed on decision trees including a plurality of nodes by the gradient boosting.

7. The learning and discrimination device according to claim 1, wherein learning is performed on a decision tree including a plurality of nodes, and learning is performed on a next decision tree by the gradient boosting based on a learning result of the decision tree on which the learning has been performed.

8. The learning and discrimination device according to claim 6, further comprising:

a model memory configured to store model data of one or more decision trees including data of a plurality of nodes;

a first determining unit configured to perform magnitude determination for a value of a feature amount in sample data and the threshold included in the data of the plurality of nodes stored in the model memory;

a second determining unit configured to perform identicalness determination for a value of a feature amount in sample data and the threshold included in the data of the plurality of nodes stored in the model memory; and a determination result selector configured to:

output a determination result obtained by the first determining unit in a case in which category information indicates that the feature amount determined by each of the first determining unit and the second determining unit is a non-category feature amount, the category information associating feature amount discrimination information indicating a type of the feature amount included in the sample data with category discrimination information indicating whether the feature amount is a category feature amount; and output a determination result obtained by the second determining unit in a case in which the category information indicates that the feature amount is a category feature amount.

9. The learning and discrimination device according to claim 1, wherein, in a case in which the feature amount in the sample data has two or more dimensions, the histogram memory unit, the category accumulated gradient calculator, the non-category accumulated gradient calculator, and the cumulative sum selector are provided for each type of the feature amount.

10. The learning and discrimination device according to claim 1, further comprising a score calculator configured to calculate a branch score for the threshold corresponding to the cumulative sum based on the cumulative sum output by the cumulative sum selector.

11. A learning and discrimination method for a learning and discrimination device configured to perform learning by gradient boosting, the method comprising:

calculating category accumulated gradient including inputting a histogram corresponding to each value of a feature amount among histograms stored in a histogram memory unit that stores, for each value of the feature amount, a histogram obtained by integrating gradient information corresponding to the value of feature amount of sample data, and calculating a histogram corresponding to a value of the feature amount corresponding to a threshold for the feature amount as a cumulative sum of the gradient information for the feature amount;

calculating non-category accumulated gradient including inputting a histogram corresponding to each value of the feature amount among the histograms stored in the histogram memory unit, and calculating, as a cumulative sum of the gradient information for the feature amount, a sum of a histogram corresponding to a value of the feature amount that is classified using a classification method with the threshold for the feature amount, the classification method being different from a classification method at the calculating category accumulated gradient using the threshold; and selecting cumulative sum including outputting the cumulative sum calculated at the calculating category accumulated gradient or the cumulative sum calculated at the calculating non-category accumulated gradient.

* * * * *